US008437385B1

(12) United States Patent
Dark

(10) Patent No.: US 8,437,385 B1
(45) Date of Patent: May 7, 2013

(54) MEASURING THE DC PROPERTIES OF A SIGNAL PATH BETWEEN TRANSMITTER AND RECEIVER

(75) Inventor: Stephen L. Dark, Austin, TX (US)

(73) Assignee: National Instruments Corporation, Austin, TX (US)

(*) Notice: Subject to any disclaimer, the term of this patent is extended or adjusted under 35 U.S.C. 154(b) by 0 days.

(21) Appl. No.: 13/442,523

(22) Filed: Apr. 9, 2012

Related U.S. Application Data

(63) Continuation of application No. 13/404,896, filed on Feb. 24, 2012.

(51) Int. Cl.
H04B 3/46 (2006.01)
H04B 17/00 (2006.01)
H04Q 1/20 (2006.01)

(52) U.S. Cl.
USPC .......................................... 375/224; 455/126

(58) Field of Classification Search .................. 375/224, 375/296–297, 349–350; 455/126
See application file for complete search history.

(56) References Cited

U.S. PATENT DOCUMENTS

| | | | |
|---|---|---|---|
| 7,151,917 B2 | 12/2006 | Paulus | |
| 7,203,466 B2 | 4/2007 | Muschallik et al. | |
| 7,706,475 B1 | 4/2010 | Kopikare et al. | |
| 7,822,147 B2 | 10/2010 | Huang et al. | |
| 7,831,220 B2 | 11/2010 | Hammerschmidt et al. | |
| 7,839,314 B2 | 11/2010 | Cetin et al. | |
| 7,856,065 B2 | 12/2010 | Jonsson | |
| 7,869,538 B2 | 1/2011 | Dubuc et al. | |
| 7,881,402 B2 | 2/2011 | Gao et al. | |
| 7,885,351 B2 | 2/2011 | Bitzer et al. | |
| 7,925,217 B2 | 4/2011 | Park et al. | |
| 7,962,113 B2 | 6/2011 | Gao et al. | |
| 7,974,593 B2 | 7/2011 | Cole et al. | |
| 8,010,076 B2 | 8/2011 | Mo et al. | |
| 8,018,990 B2 | 9/2011 | Lee et al. | |
| 8,027,376 B2 | 9/2011 | Yamanaka et al. | |
| 2002/0018531 A1* | 2/2002 | Ratto | 375/297 |
| 2003/0206603 A1 | 11/2003 | Husted | |
| 2004/0156450 A1 | 8/2004 | Auranen et al. | |
| 2004/0203472 A1 | 10/2004 | Chien | |
| 2005/0025255 A1* | 2/2005 | Francos et al. | 375/296 |
| 2007/0058755 A1 | 3/2007 | Husted | |
| 2007/0275674 A1 | 11/2007 | Chien | |
| 2008/0212711 A1 | 9/2008 | Auranen et al. | |

(Continued)

OTHER PUBLICATIONS

Cetin et al.; "Living and Dealing with RF Impairments in Communication Transceivers;" Proceedings of the IEEE International Symposium on Circuits and Systems, <http://www.wmin.ac.uk/westminsterresearch>, Jul. 2007; pp. 21-24.

(Continued)

*Primary Examiner* — Curtis Odom
(74) *Attorney, Agent, or Firm* — Meyertons Hood Kivlin Kowert & Goetzel, P.C.; Jeffrey C. Hood; Mark K. Brightwell

(57) ABSTRACT

Systems and methods for measuring transmitter and/or receiver I/Q impairments are disclosed, including iterative methods for measuring transmitter I/Q impairments using shared local oscillators, iterative methods for measuring transmitter I/Q impairments using intentionally-offset local oscillators, and methods for measuring receiver I/Q impairments. Also disclosed are methods for computing I/Q impairments from a sampled complex signal, methods for computing DC properties of a signal path between the transmitter and receiver, and methods for transforming I/Q impairments through a linear system.

20 Claims, 43 Drawing Sheets

U.S. PATENT DOCUMENTS

| | | |
|---|---|---|
| 2008/0232498 A1 | 9/2008 | Gupta |
| 2009/0036079 A1 | 2/2009 | Lindoff et al. |
| 2010/0215125 A1 | 8/2010 | Furman |
| 2010/0232493 A1 | 9/2010 | Thirumoorthy |
| 2010/0272208 A1 | 10/2010 | Feigin et al. |
| 2011/0069767 A1 | 3/2011 | Zhu |

* cited by examiner receive measurements of the I/Q impairments of the transmitter over a frequency range, wherein the transmitter includes a digital circuit, a pair of digital-to-analog converters (DACs) and an I/Q modulator, wherein the digital circuit is configured to filter a digital I signal and a digital Q signal to respectively obtain a filtered digital I signal and a filtered digital Q signal, wherein the pair of DACs is configured to convert the filtered digital I and Q signals to analog form in order to respectively obtain analog I and Q signals, wherein the I/Q modulator is configured to modulate a carrier signal with the analog I and Q signals to obtain a modulated carrier signal
610 compute a 2x2 matrix of digital filters for the digital circuit based on the measurements, wherein the 2x2 matrix of digital filters is computed to achieve at least partial pre-compensation for the I/Q impairments of the transmitter, wherein a frequency response of at least one of the diagonal components of the 2x2 matrix is computed based on the measurements as a function of frequency and the measurements as a function of the negative of frequency, wherein a frequency response of at least one of the non-diagonal components of the 2x2 matrix is computed based on the measurements as a function of frequency and the measurements as a function of the negative of frequency
615 program the digital circuit to implement the 2x2 matrix of digital filters, wherein the digital circuit, when so programmed, is configured to at least partially pre-compensate for the I/Q impairments of the transmitter
620

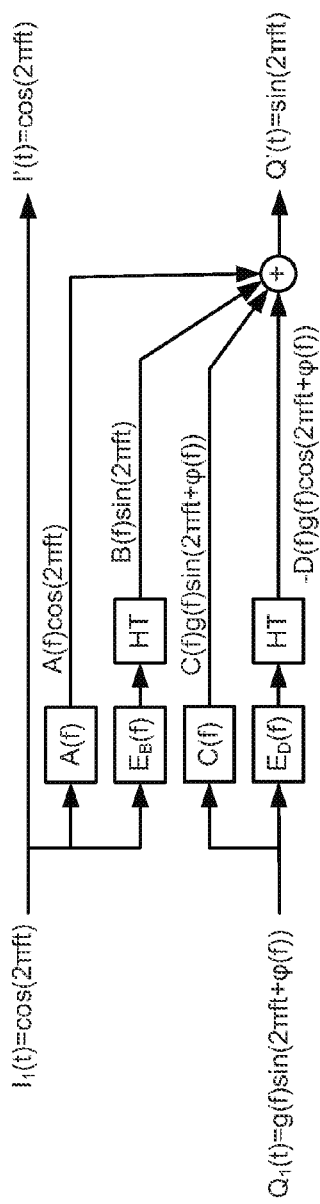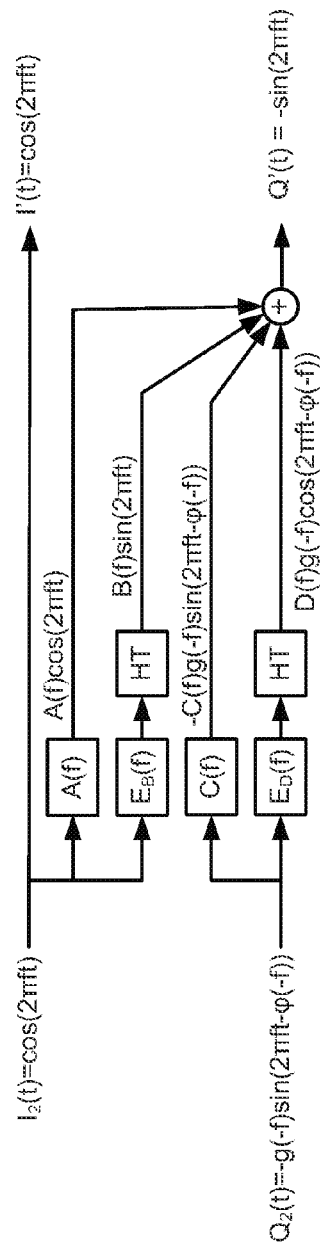
Fig. 24A
Fig. 24B $\sin(2\pi ft) = A(f)\cos(2\pi ft) + E_B(f)\sin(2\pi ft) + C(f)g_1(f)\sin(2\pi ft+\varphi_1(f)) - E_D(f)g_1(f)\cos(2\pi ft+\varphi_1(f))$ (1.1)

$-\sin(2\pi ft) = A(f)\cos(2\pi ft) + E_B(f)\sin(2\pi ft) - C(f)g_2(f)\sin(2\pi ft-\varphi_2(f)) + E_D(f)g_2(f)\cos(2\pi ft-\varphi_2(f))$ (1.2)

$$A(f) = \frac{-2g_1(f)g_2(f)\sin\{\varphi_1(f)+\varphi_2(f)\}}{g_1^2(f)+g_2^2(f)+2g_1(f)g_2(f)\cos\{\varphi_1(f)+\varphi_2(f)\}} \quad (1.20)$$

$$E_B(f) = \frac{g_2^2(f)-g_1^2(f)}{g_1^2(f)+g_2^2(f)+2g_1(f)g_2(f)\cos\{\varphi_1(f)+\varphi_2(f)\}} \quad (1.21)$$

$$C(f) = \frac{2\{g_1(f)\cos(\varphi_1(f))+g_2(f)\cos(\varphi_2(f))\}}{g_1^2(f)+g_2^2(f)+2g_1(f)g_2(f)\cos\{\varphi_1(f)+\varphi_2(f)\}} \quad (1.22)$$

$$E_D(f) = \frac{2\{g_1(f)\sin(\varphi_1(f))-g_2(f)\sin(\varphi_2(f))\}}{g_1^2(f)+g_2^2(f)+2g_1(f)g_2(f)\cos\{\varphi_1(f)+\varphi_2(f)\}} \quad (1.23)$$

Fig. 27

$$g(f)\sin(2\pi ft+\varphi(f)) = A(f)\cos(2\pi ft) + E_B(f)\sin(2\pi ft) + C(f)\sin(2\pi ft) - E_D(f)\cos(2\pi ft) \quad (1.48)$$

$$-g(-f)\sin(2\pi ft-\varphi(-f)) = A(f)\cos(2\pi ft) + E_B(f)\sin(2\pi ft) - C(f)\sin(2\pi ft) + E_D(f)\cos(2\pi ft) \quad (1.49)$$

$$\begin{bmatrix} g_1(f)\sin(\varphi_1(f)) \\ g_1(f)\cos(\varphi_1(f)) \\ g_2(f)\sin(\varphi_2(f)) \\ g_2(f)\cos(\varphi_2(f)) \end{bmatrix} = \begin{bmatrix} 1 & 0 & 0 & -1 \\ 0 & 1 & 1 & 0 \\ 1 & 0 & 0 & 1 \\ 0 & 1 & -1 & 0 \end{bmatrix} \begin{bmatrix} A(f) \\ E_B(f) \\ C(f) \\ E_D(f) \end{bmatrix} \quad (1.54)$$

Fig. 35

$$\begin{bmatrix} A(f) \\ E_B(f) \\ C(f) \\ E_D(f) \end{bmatrix} = (1/2) \begin{bmatrix} 1 & 0 & 1 & 0 \\ 0 & 1 & 0 & -1 \\ 0 & 1 & 0 & 1 \\ -1 & 0 & 1 & 0 \end{bmatrix} \begin{bmatrix} g_1(f)\sin(\varphi_1(f)) \\ g_1(f)\cos(\varphi_1(f)) \\ g_2(f)\sin(\varphi_2(f)) \\ g_2(f)\cos(\varphi_2(f)) \end{bmatrix} \quad (1.55)$$

Fig. 36

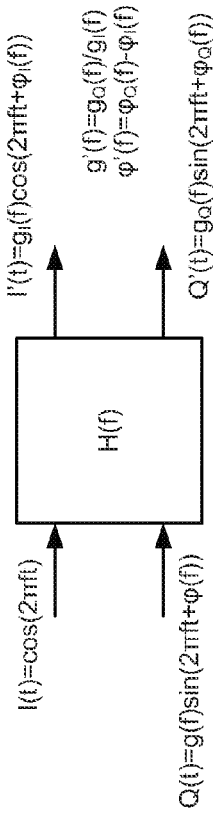

Fig. 41

$$s_{input}(f,t) = \cos(2\pi ft) + j\, g(f)\sin(2\pi ft + \varphi(f))$$
$$= \frac{1}{2}\left\{e^{j2\pi ft}\left(1 + g(f)e^{j\varphi(f)}\right) + e^{-j2\pi ft}\left(1 - g(f)e^{-j\varphi(f)}\right)\right\}$$  1.60

$$s_{output}(f,t) = g_I(f)\cos(2\pi ft + \varphi_I(f)) + j\, g_Q(f)\sin(2\pi ft + \varphi_Q(f))$$
$$= \frac{1}{2}\left\{e^{j2\pi ft}\left(g_I(f)e^{j\varphi_I(f)} + g_Q(f)e^{j\varphi_Q(f)}\right) + e^{-j2\pi ft}\left(g_I(f)e^{-j\varphi_I(f)} - g_Q(f)e^{-j\varphi_Q(f)}\right)\right\}$$  1.61

$$s_{output}(f,t) = \frac{1}{2}\left\{H(f)e^{j2\pi ft}\left(1 + g(f)e^{j\varphi(f)}\right) + H(-f)e^{-j2\pi ft}\left(1 - g(f)e^{-j\varphi(f)}\right)\right\}$$  1.62

Fig. 42 compute a spectrum A(f) according to the expression H(f){1+g(f)exp(jφ(f))}, where H(f) is a spectrum of a linear system model of the electrical system, where g(f) is a gain imbalance at the complex input, where φ(f) is a phase skew at the complex input 4310 compute a spectrum B(f) according to the expression H(-f){1-g(f)exp(-j(f))} 4315 compute a sum of the spectra A(f) and B(f), and a difference of the spectra A(f) and B(f) 4320 compute a gain imbalance and phase skew at the complex output based on real and imaginary parts of the sum, and real and imaginary parts of the difference 4325

| perform a set of operations 4410 |
|---|
| direct that a complex exponential tone at frequency f be supplied to the transmitter 4415 |
| supply a pre-compensation transformation to a pre-compensation circuit of the transmitter, wherein the pre-compensation circuit is configured to apply the pre-compensation transformation to the complex exponential tone to obtain an adjusted complex signal, wherein the pre-compensation transformation is configured to pre-compensate for a current estimate of the I/Q impairments of the transmitter, wherein the transmitter is configured to transmit a transmit signal based on the adjusted complex signal, wherein a receiver is configured to receive the transmit signal and capture a sampled complex signal representing the received transmit signal 4420 |
| compute raw I/Q impairments based on the sampled complex signal 4425 |
| transform the raw I/Q impairments to determine transformed I/Q impairments, wherein said transforming removes measured I/Q impairments of the receiver from the raw I/Q impairments 4430 |
| remove a current estimate of a signal path from the transformed I/Q impairments to obtain path-compensated I/Q impairments, wherein the signal path includes a path from an I/Q modulator of the transmitter to a demodulator of the receiver 4435 |
| update the current estimate of the I/Q impairments of the transmitter based on the path-compensated I/Q impairments 4440 |

```
┌─────────────────────────────────────────────────────────────────────┐
│ configure a local oscillator of the transmitter and a local oscillator (LO) of the │
│ receiver to be phase locked and so that a frequency of the receiver's LO minus a │
│ frequency of the transmitter's LO frequency is equal to an amount LO  4510 │
└─────────────────────────────────────────────────────────────────────┘
                                  ↓
┌─────────────────────────────────────────────────────────────────────┐
│ perform a set of operations  4520                                   │
│  ┌───────────────────────────────────────────────────────────────┐  │
│  │ direct that a complex exponential tone at frequency f be supplied to the │
│  │ transmitter  4525                                             │  │
│  ├───────────────────────────────────────────────────────────────┤  │
│  │ supply a pre-compensation transformation to a pre-compensation circuit of │
│  │ the transmitter, wherein the pre-compensation circuit is configured to apply │
│  │ the pre-compensation transformation to the complex exponential tone to │
│  │ obtain an adjusted complex signal, wherein the pre-compensation │
│  │ transformation is configured to pre-compensate for a current estimate of the │
│  │ I/Q impairments of the transmitter, wherein the transmitter is configured to │
│  │ transmit a transmit signal based on the adjusted complex signal, wherein a │
│  │ receiver is configured to receive the transmit signal and to capture a sampled │
│  │ complex signal representing the received transmit signal  4530 │
│  ├───────────────────────────────────────────────────────────────┤  │
│  │ frequency shift the sampled complex signal by the amount LO to obtain a │
│  │ frequency shifted signal  4535                                │  │
│  ├───────────────────────────────────────────────────────────────┤  │
│  │ compute raw I/Q impairments at frequency f based on the frequency shifted │
│  │ signal  4540                                                  │  │
│  ├───────────────────────────────────────────────────────────────┤  │
│  │ remove a current estimate of a signal path from the raw I/Q impairments at │
│  │ frequency f to obtain path-compensated I/Q impairments at frequency f, │
│  │ wherein the signal path includes a path from an I/Q modulator of the │
│  │ transmitter to a demodulator of the receiver  4545            │  │
│  ├───────────────────────────────────────────────────────────────┤  │
│  │ update the current estimate of the I/Q impairments of the transmitter at │
│  │ frequency f based on the path-compensated I/Q impairments at frequency f │
│  │ 4550                                                          │  │
│  └───────────────────────────────────────────────────────────────┘  │
└─────────────────────────────────────────────────────────────────────┘
```

4500

Fig. 45 direct that an input signal be supplied to the receiver, wherein the input signal includes an isolated tone at displacement frequency f and includes a void interval around displacement frequency −f, wherein the receiver is configured to demodulate the input signal in order to obtain a sampled complex signal, wherein displacement frequencies f and −f are displacements relative to a local oscillator frequency of the receiver  4610

compute the I/Q impairments of the receiver at frequency f based on the sampled complex signal  4615

repeat the actions of directing (4610) and computing (4615) for values of the frequency f spanning a specified frequency band  4620

store the I/Q impairments of the receiver for the values of the frequency f in a memory  4625

4600   Fig. 46 direct a device to stimulate the receiver with a stimulus signal having an isolated tone at displacement frequency f and a void interval at displacement frequency −f, wherein displacement frequencies f and −f are displacements with respect to a local oscillator frequency of the receiver, wherein the sampled complex signal is a baseband signal produced by the receiver  4710

compute a Discrete-Time Fourier transform value $C_I$ at frequency f of an I component of the sampled complex signal  4715

compute a Discrete-Time Fourier transform value $C_Q$ at frequency f of a Q component of the sampled complex signal  4720

compute a gain imbalance g of the sampled complex signal at frequency f based on magnitudes of the values $C_I$ and $C_Q$, wherein the gain imbalance g includes a gain imbalance of the receiver  4725

compute a phase skew of the sampled complex signal at frequency f based on phases of the values $C_I$ and $C_Q$, wherein the phase skew includes a phase skew of the receiver  4730

4700   Fig. 47

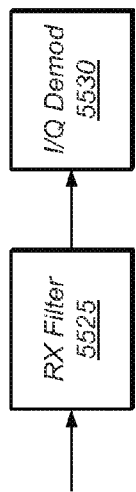
FIG. 54
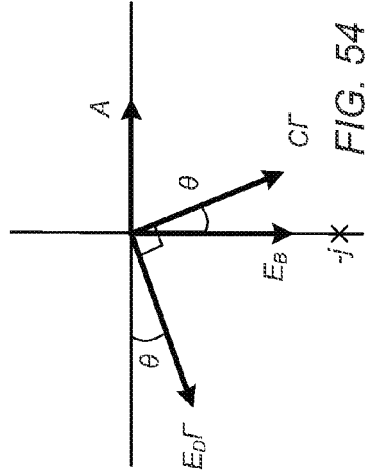
FIG. 55A
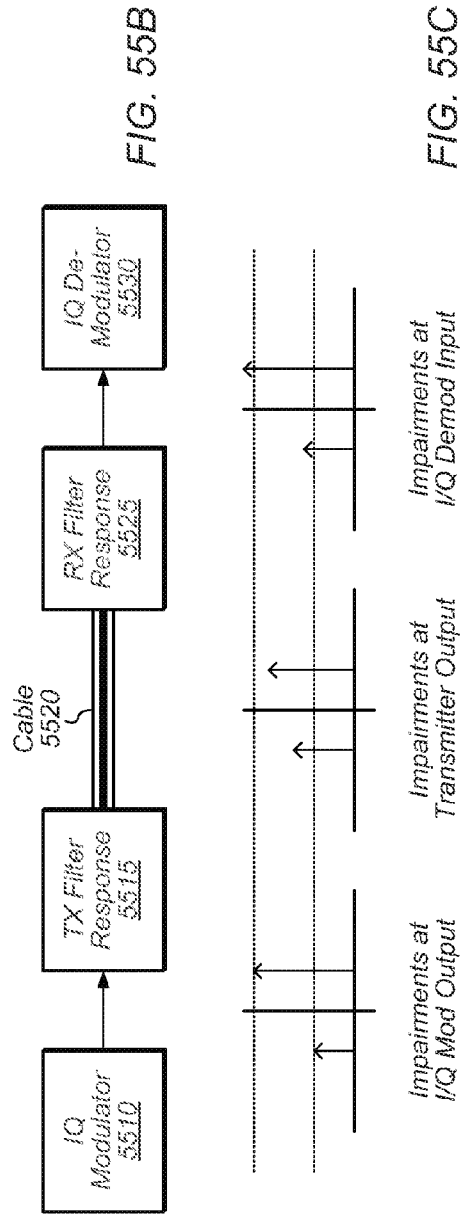
FIG. 55B
FIG. 55C

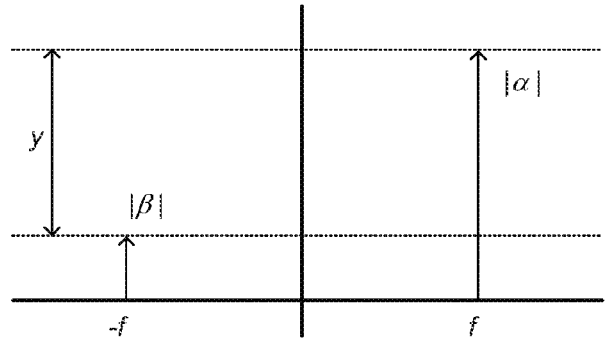

FIG. 57

$$s(f,t) = \cos(2\pi ft) + jg(f)\sin(2\pi ft + \varphi(f))$$
$$= (\tfrac{1}{2})\{\exp(j2\pi ft)[1+g(f)\exp(j\varphi(f))] + \exp(-j2\pi ft)[1-g(f)\exp(-j\varphi(f))]\} \quad (4.8)$$
$$= \alpha(f)\exp(j2\pi ft) + \beta\exp(-j2\pi ft)$$

$$\alpha(f) = (\tfrac{1}{2})\{1+g(f)\exp(j\varphi(f))\} \quad (4.9)$$

$$\beta(f) = (\tfrac{1}{2})\{1-g(f)\exp(-j\varphi(f))\} \quad (4.10)$$

$$|\alpha(f)| = \frac{1}{2}\sqrt{1+g^2(f)+2g(f)\cos(\varphi(f))} \quad (4.11)$$

$$phase\{\alpha(f)\} = \arctan\left(\frac{g(f)\sin(\varphi(f))}{1+g(f)\cos(\varphi(f))}\right) \quad (4.12)$$

$$|\beta(f)| = \frac{1}{2}\sqrt{1+g^2(f)-2g(f)\cos(\varphi(f))} \quad (4.13)$$

$$phase\{\beta(f)\} = \arctan\left(\frac{g(f)\sin(\varphi(f))}{1-g(f)\cos(\varphi(f))}\right) \quad (4.14)$$

$$imagerejection(f) = 20\log(\gamma(f))$$
$$= 20\log\left(\frac{|\beta(f)|}{|\alpha(f)|}\right) \quad (4.15)$$
$$10\log\left(\frac{1+g^2(f)-2g(f)\cos(\varphi(f))}{1+g^2(f)+2g(f)\cos(\varphi(f))}\right)$$

FIG. 58A $$InstantaneousPower(s(t,f)) = \sqrt{\cos^2(2\pi ft) + g(f)^2 \sin^2(2\pi ft + \Phi(f))} \quad 4.16$$

$$s(f,t) = fundamental(f,t) + image(f,t) \quad 4.17$$

$$fundamental(f,t) = \alpha(f)e^{j2\pi ft} = \frac{1}{2}e^{j2\pi ft}(1 + g(f)e^{j\Phi(f)}) \quad 4.18$$

$$image(f,t) = \beta(f)e^{-j2\pi ft} = \frac{1}{2}e^{-j2\pi ft}(1 - g(f)e^{-j\Phi(f)}) \quad 4.19$$

$$fundamental(f,t) = \frac{1}{2}[\cos(2\pi ft) + g*\cos(2\pi ft + \Phi)] + j*\frac{1}{2}[\sin(2\pi ft) + g*\sin(2\pi ft + \Phi)] \quad 4.20$$

$$image(f,t) = \frac{1}{2}[\cos(2\pi ft) - g*\cos(2\pi ft + \Phi)] + j*\frac{1}{2}[-\sin(2\pi ft) + g*\sin(2\pi ft + \Phi)] \quad 4.21$$

FIG. 58B

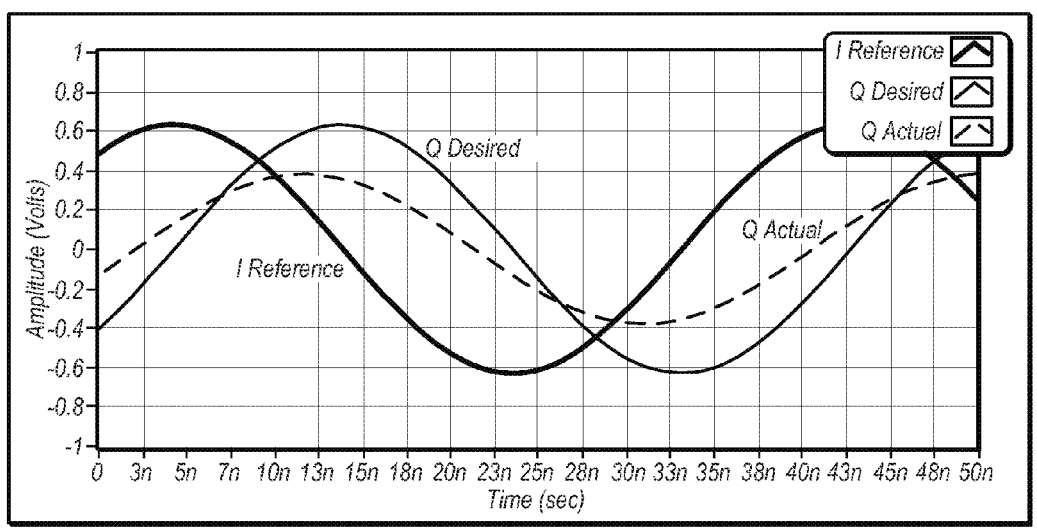

FIG. 59

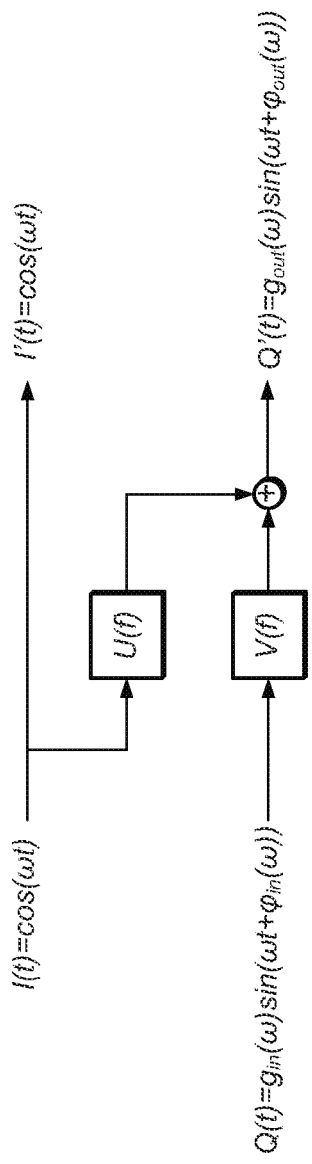

FIG. 66

$$U(\omega) = j\frac{g_{in}(\omega)g_{out}(-\omega)\exp\{j(\varphi_{in}(\omega)-\varphi_{out}(-\omega))\} - g_{in}(-\omega)g_{out}(\omega)\exp\{j(\varphi_{out}(\omega)-\varphi_{in}(-\omega))\}}{g_{in}(\omega)\exp\{j\varphi_{in}(\omega)\} + g_{in}(-\omega)\exp\{-j\varphi_{in}(-\omega)\}} \quad (7.9)$$

$$V(\omega) = \frac{g_{out}(\omega)\exp\{j\varphi_{out}(\omega)\} + g_{out}(-\omega)\exp\{-j\varphi_{out}(-\omega)\}}{g_{in}(\omega)\exp\{j\varphi_{in}(\omega)\} + g_{in}(-\omega)\exp\{-j\varphi_{in}(-\omega)\}} \quad (7.10)$$

MEASURING THE DC PROPERTIES OF A SIGNAL PATH BETWEEN TRANSMITTER AND RECEIVER

RELATED APPLICATION DATA

This application is a continuation of U.S. patent application Ser. No. 13/404,896, filed on Feb. 24, 2012, entitled "Techniques for the Measurement of I/Q Impairments and Associated Computational Tools", invented by Stephen Dark and Christopher Behnke application Ser. No. 13/404,896 is hereby incorporated by reference in its entirety.

FIELD OF THE INVENTION

The present invention relates to the field of signal processing, and more particularly to systems and methods for measurement and correction of I/Q impairments in a receiver device or a transmitter device.

DESCRIPTION OF THE RELATED ART

A transmitter receives a complex digital signal $I(n)+jQ(n)$, converts the complex digital signal into an analog signal $I(t)+jQ(t)$, and upconverts the analog signal using an I/Q modulator. The upconverted signal is transmitted onto a channel. Ideally, a pure complex exponential tone supplied to the I/Q modulator will result in a pure tone being transmitted. In reality, however, I/Q impairments in the transmitter will cause the I channel and Q channel to have different gains and different phase displacements. Such distortions imply among other things that the transmitted signal will have unwanted energy at a frequency equal to the negative of the tone frequency. Depending on the communication standard, this unwanted "image" results in potential skew on the constellation diagram or an artificial noise floor. Receivers have a similar problem. When a receiver is stimulated with a pure tone at frequency f, the complex signal appearing at the output of the receiver's I/Q demodulator will include unwanted signal energy at frequency −f in addition to energy at frequency f. In both case (transmitter and receiver), the difficulty arises due to imbalances in gain and phase between the I channel and the Q channel. Thus, there exists a need for mechanisms capable of correcting for I/Q impairments in a transmitter and/or receiver.

Furthermore, to achieve a high-quality correction for I/Q impairments, one needs to have access to a high-quality measurement of the I/Q impairments. However, quality measurements may be difficult to obtain. For example, to measure the I/Q impairments of a transmitter involves directing the transmitter to transmit a signal to a receiver. The receiver estimates the transmitter's I/Q impairments based on its received signal. However, the receiver's I/Q demodulator corrupts the estimates with its own I/Q impairments. Furthermore, the signal path between the transmitter's I/Q modulator and the receiver's I/Q demodulator also introduces distortion to the estimates. Thus, there exists a need for mechanisms capable of estimating or measuring the I/Q impairments of transmitters and/or receivers, for mechanisms capable of accurately measuring the I/Q impairments implicit in sampled signals, for mechanisms capable of determining the properties of the signal path, and for mechanisms capable of predicting how I/Q impairments are transformed by systems such as the signal path.

SUMMARY

Among other things, the present patent discloses mechanisms capable of compensating for I/Q impairments in a transmitter and/or a receiver. The parameters used to perform the compensation are computed based on measured or estimated values of the I/Q impairments. For example, the parameters used to compensate for the I/Q impairments of a transmitter (or receiver) are computed based on measured or estimated values of those impairments. Any known technique may be used to measure or estimate the I/Q impairments of the transmitter or the receiver or a series combination of the transmitter and receiver, including, but not limited to, the techniques disclosed herein.

In one embodiment, a system and method for compensating for I/Q impairments of a receiver may involve the following operations.

An analog input signal is received from a transmission medium. I/Q demodulation is performed on the analog input signal to produce an analog inphase (I) signal and an analog quadrature (Q) signal. The analog I signal and the analog Q signal are then digitized to produce respectively a digital I signal and a digital Q signal. The digital I signal and the digital Q signal are filtered in accordance with a 2×2 matrix of digital filters to produce a filtered digital I signal and a filtered digital Q signal. (The filtering may be performed on a programmable hardware element such as an FPGA, or in dedicated digital circuitry such as an ASIC, or in software on a processor, etc.) The 2×2 matrix of digital filters at least partially compensates for I/Q impairments of the receiver over a range of frequencies. The frequency response of at least one of the diagonal components of the 2×2 matrix is computed based on measurements of the I/Q impairments as a function of frequency and the measurements as a function of the negative of frequency. (The measurements of the receiver's I/Q impairments may be obtained by any known method. The present document describes a number of methods for obtaining such measurements.) Furthermore, the frequency response of at least one of the non-diagonal components of the 2×2 matrix is computed based on the measurements as a function of frequency and the measurements as a function of the negative of frequency.

In some embodiments, the receiver's I/Q impairments over positive frequencies and the receiver's I/Q impairments over negative frequencies may be assumed to be functionally related. (A) In one such embodiment, the frequency responses of the 2×2 matrix may be computed as follows. The frequency response of at least one of the diagonal components of the 2×2 matrix at the arbitrary frequency f may be computed based only on a measurement of the I/Q impairments at the frequency f (or alternatively, only on a measurement of the I/Q impairments at the frequency −f). Furthermore, the frequency response of at least one of the non-diagonal components of the 2×2 matrix at the frequency f may be computed based only on the measurement of the I/Q impairments at the frequency f (or alternatively, only on the measurement of the I/Q impairments at the frequency −f). (B) In another such embodiment, the gain imbalance is assumed to be even and the phase skew is assumed to be odd. Then both non-diagonal components of the 2×2 matrix may be set to zero; one of the diagonal components may correspond to a pure pass-through filter (i.e., unity frequency response); and a frequency response of the other diagonal component at the arbitrary frequency f may be computed based only on a measurement of the I/Q impairments at the frequency f (or alternatively, only on a measurement of the I/Q impairments at the frequency −f). (C) In another such embodiment, both diagonal components of the 2×2 matrix may correspond to pure pass-through filters; one of the non-diagonal components may be set to zero; and a frequency response of the other non-diagonal component at the arbitrary frequency f may be computed based only on a measurement of the I/Q impairments at the frequency f (or alternatively, only on a measurement of the I/Q impairments at the frequency −f).

In another embodiment, a system and method for configuring a receiver to at least partially compensate for I/Q impairments of the receiver may involve the following operations. Measurements of the I/Q impairments of the receiver over a frequency band are received (or accessed from memory). A 2×2 matrix of digital filters is computed based on the measurements. The 2×2 matrix of digital filters is computed to achieve at least partial compensation for the I/Q impairments of the receiver over the frequency band. The frequency response of at least one of the diagonal components of the 2×2 matrix is computed based on the measurements as a function of frequency and the measurements as a function of the negative of frequency. In addition, the frequency response of at least one of the non-diagonal components of the 2×2 matrix is computed based on the measurements as a function of frequency and the measurements as a function of the negative of frequency. A digital circuit is then programmed to implement the 2×2 matrix of digital filters. When so programmed, the digital circuit is configured to at least partially compensate for the I/Q impairments of the receiver over the frequency band. The digital circuit may be realized in any of a wide variety of forms. For example, the digital circuit may be realized by a programmable hardware element, or by dedicated digital circuitry such as an ASIC, or by a processor in response to the execution of program instructions. (The digital circuit may be incorporated as part of the receiver, or as part of another system, e.g., a host computer or controller board).

In another embodiment, a system and method for operating a transmitter so as to achieve I/Q impairment compensation may involve the following operations.

A digital inphase (I) signal and a digital quadrature (Q) signal are received. The digital I signal and the digital Q signal is filtered in accordance with a 2×2 matrix of digital filters to produce a filtered digital I signal and a filtered digital Q signal. The 2×2 matrix of digital filters at least partially pre-compensates for I/Q impairments of the transmitter over a range of frequencies. The frequency response of at least one of the diagonal components of the 2×2 matrix is computed based on measurements of the I/Q impairments as a function of frequency and the measurements as a function of the negative of frequency. (The measurements of the transmitter's I/Q impairments may be obtained by any known method. The present document describes a number of methods for obtaining such measurements.) Moreover, the frequency response of at least one of the non-diagonal components of the 2×2 matrix is computed based on the measurements as a function of frequency and the measurements as a function of the negative of frequency. The filtered digital I and Q signals may then be converted to analog form in order to obtain respective analog I and Q signals. I/Q modulation may be performed on the analog I and Q signals to produce a modulated analog signal.

In some embodiments, the transmitter's I/Q impairments over positive frequencies and the transmitter's I/Q impairments over negative frequencies may be assumed to be functionally related. (A) In one such embodiment, the computation of the 2×2 matrix of digital filters may be simplified as follows. The frequency response of at least one of the diagonal components of the 2×2 matrix at the arbitrary frequency f in the frequency range may be computed based only on a measurement of the I/Q impairments at the frequency f (or alternatively, only on a measurement of the I/Q impairments at the frequency −f). Furthermore, the frequency response of at least one of the non-diagonal components of the 2×2 matrix at the frequency f may be computed based only on the measurement of the I/Q impairments at the frequency f (or alternatively, only on the measurement of the I/Q impairments at the frequency −f). (B) In another such embodiment, the gain imbalance is assumed to be even and the phase skew is assumed to be odd. Then both non-diagonal components of the 2×2 matrix may be set to zero; one of the diagonal components may correspond to a pure pass-through filter (i.e., unity frequency response); and a frequency response of the other diagonal component at the arbitrary frequency f may be computed based only on a measurement of the I/Q impairments at the frequency f (or alternatively, only on a measurement of the I/Q impairments at the frequency −f). (C) In another such embodiment, both diagonal components of the 2×2 matrix may correspond to pure pass-through filters; one of the non-diagonal components may be set to zero; and a frequency response of the other non-diagonal component at the arbitrary frequency f may be computed based only on a measurement of the I/Q impairments at the frequency f (or alternatively, only on a measurement of the I/Q impairments at the frequency −f).

In another embodiment, a system and method for configuring a transmitter to at least partially compensate for I/Q impairments of the transmitter may involve the following operations.

Measurements of the I/Q impairments of the transmitter over a frequency range are received (or accessed from memory). A 2×2 matrix of digital filters is computed based on the measurements. The 2×2 matrix of digital filters is computed to achieve at least partial pre-compensation for the I/Q impairments of the transmitter. The frequency response of at least one of the diagonal components of the 2×2 matrix is computed based on the measurements as a function of frequency and the measurements as a function of the negative of frequency. Furthermore, the frequency response of at least one of the non-diagonal components of the 2×2 matrix is computed based on the measurements as a function of frequency and the measurements as a function of the negative of frequency. A digital circuit is then programmed to implement the 2×2 matrix of digital filters. When so programmed, the digital circuit is configured to at least partially pre-compensate for the I/Q impairments of the transmitter.

In another embodiment, a system and method for operating a transmitter so as to achieve at least partial compensation for I/Q impairments of the transmitter at a given frequency f may involve the following operations.

A digital inphase (I) signal and a digital quadrature (Q) signal are received. The digital I signal and the digital Q signal are transformed in accordance with a 2×2 matrix of constants to produce a resultant digital I signal and a resultant digital Q signal. (In other words, the vector signal comprising the digital I signal and digital Q signal is multiplied by the 2×2 matrix.) The resultant digital I and Q signals are converted to analog form in order to obtain respective analog I and Q signals. I/Q modulation is performed on the analog I and Q signals to produce a modulated analog signal. The 2×2 matrix is configured to at least partially pre-compensate for the I/Q impairments at frequency f. A first of the constants, corresponding a diagonal element of the 2×2 matrix, is computed based on a measurement of the I/Q impairments at frequency f and a measurement of the I/Q impairments at frequency −f. Furthermore, a second of the constants, corresponding to a non-diagonal element of the 2×2 matrix, is computed based on the measurement at frequency f and the measurement at frequency −f.

In another embodiment, a method for determining (i.e., measuring) I/Q impairments of a transmitter may involve the following actions.

The method involves performing a set of operations. The set of operations includes: (a) directing that a complex exponential tone at frequency f be supplied to the transmitter; (b) supplying a pre-compensation transformation to a pre-compensation circuit of the transmitter, where the pre-compensation circuit is configured to apply the pre-compensation transformation to the complex exponential tone to obtain an adjusted complex signal, where the pre-compensation transformation is configured to pre-compensate for a current estimate of the I/Q impairments of the transmitter, where the transmitter is configured to transmit a transmit signal based on the adjusted complex signal, where a receiver is configured to receive the transmit signal and capture a sampled complex signal representing the received transmit signal; (c) computing raw I/Q impairments based on the sampled complex signal; (d) transforming the raw I/Q impairments to determine transformed I/Q impairments, where said transforming removes measured I/Q impairments of the receiver from the raw I/Q impairments; (e) removing a current estimate of a signal path from the transformed I/Q impairments to obtain path-compensated I/Q impairments, where the signal path includes a path from an I/Q modulator of the transmitter to a demodulator of the receiver; and (f) updating the current estimate of the I/Q impairments of the transmitter based on the path-compensated I/Q impairments. (The demodulator may be an I/Q demodulator or not, depending the architecture of the receiver.)

In another embodiment, a method for determining I/Q impairments of a transmitter may involve the following actions.

The method may include configuring a local oscillator (LO) of the transmitter and a local oscillator (LO) of the receiver to be phase locked to a common reference and so that a frequency of the receiver's LO minus a frequency of the transmitter's LO is equal (e.g., exactly equal) to an amount ΔLO.

The method may also include performing a set of operations, where the set of operations includes: (a) directing that a complex exponential tone at frequency f be supplied to the transmitter; (b) supplying a pre-compensation transformation to a pre-compensation circuit of the transmitter, where the pre-compensation circuit is configured to apply the pre-compensation transformation to the complex exponential tone in order to obtain an adjusted complex signal, where the pre-compensation transformation is configured to pre-compensate for a current estimate of the I/Q impairments of the transmitter, where the transmitter is configured to transmit a transmit signal based on the adjusted complex signal, where a receiver is configured to receive the transmit signal and to capture a sampled complex signal representing the received transmit signal; (c) frequency shifting the sampled complex signal by the amount ΔLO to obtain a frequency-shifted signal; (d) computing raw I/Q impairments at frequency f based on the frequency-shifted signal; (e) removing a current estimate of a signal path from the raw I/Q impairments at frequency f to obtain path-compensated I/Q impairments at frequency f, where the signal path includes a path from an I/Q modulator of the transmitter to a demodulator of the receiver; and (f) updating the current estimate of the I/Q impairments of the transmitter at frequency f based on the path-compensated I/Q impairments at frequency f. (The demodulator may be an I/Q demodulator or not, depending the architecture of the receiver.)

In another embodiment, a method for determining (i.e., measuring) I/Q impairments of a receiver may involve the following actions.

The method may involve directing that an input signal be supplied to the receiver, where the input signal includes an isolated tone at displacement frequency f and includes a void interval around displacement frequency −f (In one embodiment, the receiver includes a calibration tone generator that is configured to generate the input signal.) The receiver is configured to demodulate the input signal in order to obtain a sampled complex signal. The displacement frequencies f and −f are displacements relative to a local oscillator frequency of the receiver.

The method may also involve computing the I/Q impairments of the receiver at frequency f based on the sampled complex signal.

The method may also involve repeating the actions of directing and computing for values of the frequency f spanning a specified frequency band.

The method may also involve storing the I/Q impairments of the receiver for the values of the frequency f in a memory.

In another embodiment, a method for estimating I/Q impairments associated with a sampled complex signal produced by a receiver may involve the following actions.

A device is directed to stimulate the receiver with a stimulus signal having an isolated tone at displacement frequency f and a void interval at displacement frequency −f (The displacement frequencies f and −f are displacements with respect to a local oscillator frequency of the receiver. The sampled complex signal may be a baseband signal produced by the receiver.) A Discrete-Time Fourier transform value $C_I$ at frequency f is computed for an I component of the sampled complex signal. A Discrete-Time Fourier transform value $C_Q$ at frequency f is computed for a Q component of the sampled complex signal. A gain imbalance g of the sampled complex signal at frequency f is computed based on magnitudes of the values $C_I$ and $C_Q$. The gain imbalance g includes at least a gain imbalance of the receiver. A phase skew $\phi$ of the sampled complex signal at frequency f is computed based on phases of the values $C_I$ and $C_Q$, where the phase skew $\phi$ includes at least a phase skew of the receiver.

In another embodiment, a method for estimating a DC scaling of a signal path between an I/Q modulator of a transmitter and an I/Q demodulator of a receiver may involve the following operations. To facilitate this estimation method, the output of the transmitter may be coupled to the input of the receiver, e.g., via a cable.

The transmitter is directed to supply a zero signal as input to the I/Q modulator. A first response signal that has been captured from the I/Q demodulator in response to said supplying the zero signal is received. The transmitter is directed to supply a constant signal equal to a non-zero complex constant as input to the I/Q modulator. A second response signal that has been captured from the I/Q demodulator in response to said supplying the constant signal is received. The first response signal is averaged to obtain a first average, and the second response signal is averaged to obtain a second average. A difference between the second average and the first average is computed. The DC scaling is computed based on the difference and the non-zero complex constant. Furthermore, a DC rotation of the signal path may be computed based on a phase of the difference and a phase of the non-zero complex constant. The DC scaling and DC rotation are usable to remove an effect of the signal path from measured I/Q impairments at the receiver in order to obtain estimates of the I/Q impairments of the transmitter.

In one alternative embodiment of the above-described method of DC scaling/rotation estimation, the transmitter has no (or negligible) local oscillator leakage. (Such might be the case, e.g., when the transmitter has an RF architecture other than a direct conversion architecture.) Thus, one may omit the transmission of the zero signal, the capture of the first response signal, the computation of the first average, and the computation of the difference. The DC scaling is then computed based on the second average and the non-zero complex constant. The DC rotation is computed based on a phase of the second average and the phase of the non-zero complex constant.

In another embodiment, a method for computing I/Q impairments at a complex output (i.e., an I/Q output pair) of an electrical system based on I/Q impairments at a complex input (i.e., an I/Q input pair) of the electrical system may include the following operations.

A spectrum A(f) is computed according to the expression $$H(f)(1+g(f)\exp(j\phi(f))),$$

where H(f) is a spectrum of a linear system model of the electrical system, where g(f) is a gain imbalance at the complex input, where $\phi(f)$ is a phase skew at the complex input. A spectrum B(f) is computed according to the expression $$H(-f)(1-g(f)\exp(-j\phi(f))).$$

A sum of the spectra A(f) and B(f) and a difference of the spectra A(f) and B(f) are computed. A gain imbalance and phase skew at the complex output are computed based on real and imaginary parts of the sum, and real and imaginary parts of the difference.

In some embodiments, the electrical system being modeled by the spectrum H(f) is the inverse of a signal path from an I/Q modulator of a transmitter to a demodulator of a receiver, e.g., as variously described herein. The gain imbalance and the phase skew at the complex input of the electrical system may represent a gain imbalance and a phase skew at the input (or alternatively, at the output) of the demodulator. The gain imbalance and the phase skew at the complex output of the electrical system may represent a gain imbalance and a phase skew at the output of the I/Q modulator.

Various embodiments of communication devices and associated methods for reducing I/Q impairments in signals used by the communication devices are described herein. According to one embodiment, a receiver device may receive a transmission signal over a communication medium, and may perform I/Q demodulation on the received transmission signal to produce a pair of analog I (in-phase) and Q (quadrature) signals. The receiver device may perform analog-to-digital conversion of each of the analog I and Q signals to produce respective digital I and Q signals. The resulting digital I and Q signals may have I/Q impairments caused by the I/Q demodulation and/or the analog-to-digital conversion and/or other processing. The receiver device may be configured to perform wideband I/Q impairment correction on the digital I and Q signals to correct the I/Q impairments. The wideband I/Q impairment correction may compensate for frequency-dependent variations of gain imbalance and phase imbalance in the digital I and Q signals, e.g., may compensate for gain imbalances and phase imbalances in the digital I and Q signals at a plurality of frequency offsets across an instantaneous bandwidth of the receiver device.

Performing the wideband I/Q impairment correction on the digital I and Q signals may comprise filtering one or more of the digital I signal or the digital Q signal to produce a resultant digital I signal and a resultant digital Q signal. The resultant digital I and Q signals represent corrected signals. In some embodiments, the resultant digital I signal is identical to the digital I signal, and the resultant digital Q signal is generated by filtering one or more of the digital I signal and the digital Q signal to obtain one or more respective filtered signals and by adding the one or more filtered signals. In other embodiments, the resultant digital Q signal is identical to the digital Q signal, and the resultant digital I signal is generated by filtering one or more of the digital I signal and the digital Q signal to obtain one or more respective filtered signals and by adding the one or more filtered signals. In yet other embodiments, the resultant digital I signal is generated by filtering one or more of the digital I signal and the digital Q signal to obtain respectively one or more filtered signals and by adding the one or more filtered signals; and the resultant digital Q signal is generated by filtering one or more of the digital I signal and the digital Q signal to obtain respectively one or more additional filtered signals and by adding the one or more additional filtered signals.

In further embodiments a calibration system (or the receiver device itself) may determine correction information by providing a plurality of known test signals to the receiver device and measuring I/Q impairments introduced by the receiver device in response to the known test signals. (In one embodiment, the receiver device may include a calibration tone generator to generate the known test signal.) The wideband I/Q impairment correction may utilize the correction information to compensate for the frequency-dependent variations of gain imbalance and phase imbalance in the digital I and Q signals.

In some embodiments the calibration system may operate in an offline calibration phase and an online operation phase. Performing the offline calibration phase may include providing a plurality of known test signals to the receiver device, measuring I/Q impairments introduced by the receiver device in response to the known test signals, and determining correction information based on the measured I/Q impairments. Performing the online operation phase may include receiving a transmission signal over a communication medium, performing I/Q demodulation on the received transmission signal to produce analog I and Q signals, performing analog-to-digital conversion of each of the analog I and Q signals to produce digital I and Q signals, and performing wideband I/Q impairment correction on the digital I and Q signals. The wideband I/Q impairment correction may use the correction information determined in the offline calibration phase to compensate for frequency-dependent variations of gain imbalance and phase imbalance in the digital I and Q signals.

In some embodiments the offline calibration phase may be performed in response to the receiver device being powered on. In some embodiments the receiver device may automatically enter the online operation phase in response to determining that the offline calibration phase is complete. In some embodiments the receiver device may automatically switch from the online operation phase to the offline calibration phase in response to determining that the receiver device is not busy processing received transmission signals in the online operation phase. In some embodiments the offline calibration phase may be initiated in response to user input.

According to other embodiments, a transmitter device may receive digital I (in-phase) and Q (quadrature) signals to be transmitted. The transmitter device may perform wideband I/Q impairment pre-correction on the digital I and Q signals. The action of performing the wideband I/Q impairment pre-correction may involve filtering one or more of the digital I and Q signals to produce a resultant digital I signal and a resultant digital Q signal to pre-compensate for frequency-dependent variations of gain imbalance and phase imbalance that will be subsequently introduced during synthesis of a transmission signal. The transmission signal may be synthesized using the resultant digital I signal and the resultant digital Q signal.

The action of synthesizing the transmission signal may include performing digital-to-analog conversion of the resultant digital I signal and the resultant digital Q signal to produce an analog I signal and an analog Q signal, and performing I/Q modulation to produce the transmission signal using the analog I signal and the analog Q signal. The resultant digital I signal and the resultant digital Q signal may pre-compensate for frequency-dependent variations of gain imbalance and phase imbalance caused by one or more of the digital to analog conversion and the I/Q modulation.

In some embodiments, the resultant digital I signal is identical to the digital I signal, and the resultant digital Q signal is generated by filtering one or more of the digital I signal and the digital Q signal to obtain one or more respective filtered signals and by adding the one or more filtered signals. In other embodiments, the resultant digital Q signal is identical to the digital Q signal, and the resultant digital I signal is generated by filtering one or more of the digital I signal and the digital Q signal to obtain one or more respective filtered signals and by adding the one or more filtered signals. In yet other embodiments, the resultant digital I signal is generated by filtering one or more of the digital I signal and the digital Q signal to obtain respectively one or more filtered signals and by adding the one or more filtered signals; and the resultant digital Q signal is generated by filtering one or more of the digital I signal and the digital Q signal to obtain respectively one or more additional filtered signals and by adding the one or more additional filtered signals.

In further embodiments, a calibration system may determine correction information by providing a plurality of known digital test signals to the transmitter device and measuring I/Q impairments introduced by the transmitter device in response to the known test signals. The wideband I/Q impairment pre-correction may utilize the correction information to produce the resultant digital signals.

In some embodiments the transmitter device may operate in an offline calibration phase and an online operation phase. The offline calibration phase may include providing a plurality of known test signals to the transmitter device, measuring I/Q impairments introduced by the transmitter device in response to the known test signals, and determining correction information based on the measured I/Q impairments.

In some embodiments the offline calibration phase may be performed in response to the transmitter device being powered on. In some embodiments the transmitter device may automatically enter the online operation phase in response to determining that the offline calibration phase is complete. In some embodiments the transmitter device may automatically switch from the online operation phase to the offline calibration phase in response to determining that the transmitter device is not busy transmitting signals in the online operation phase. In some embodiments the offline calibration phase may be initiated in response to user input.

The online operation phase may include receiving digital I and Q signals to be transmitted, and performing wideband I/Q impairment pre-correction on the digital I and Q signals. The action of performing the wideband I/Q impairment pre-correction may use the correction information determined in the offline calibration phase to filter one or more of the digital I and Q signals to produce a resultant digital I signal and a resultant digital Q signal to pre-compensate for frequency-dependent variations of gain imbalance and phase imbalance that will be subsequently introduced during synthesis of a transmission signal. The transmission signal may be synthesized using the resultant digital I signal and a resultant digital Q signal According to another embodiment, a measurement system may include a receiver device and a device under test. The receiver device may be configured to receive a transmission signal including measurement data acquired from the device under test, perform I/Q demodulation on the received transmission signal to produce analog I (in-phase) and Q (quadrature) signals, perform analog-to-digital conversion of each of the analog I and Q signals to produce digital I and Q signals, and perform wideband I/Q impairment correction on the digital I and Q signals. The wideband I/Q impairment correction may compensate for frequency-dependent variations of gain imbalance and phase imbalance in the digital I and Q signals.

In further embodiments, the measurement system may also include a transmitter device. The transmitter device may be configured to receive digital I and Q signals to be transmitted. The digital I and Q signals may specify information to be transmitted to the device under test. The transmitter device may be further configured to perform wideband I/Q impairment pre-correction on the digital I and Q signals. The action of performing the wideband I/Q impairment pre-correction may involve filtering one or more of the digital I and Q signals to produce a resultant digital I signal and a resultant digital Q signal to pre-compensate for frequency-dependent variations of gain imbalance and phase imbalance that will be subsequently introduced during synthesis of a transmission signal. The transmitter device may synthesize the transmission signal using the resultant digital I signal and a resultant digital Q signal, and transmit the transmission signal to the device under test.

BRIEF DESCRIPTION OF THE DRAWINGS

A better understanding of the present inventions can be obtained when the following detailed description is considered in conjunction with the following drawings.

FIG. 6 illustrates one embodiment of a method for configuring a transmitter to enable the transmitter to at least partially compensate for I/Q impairments.

FIGS. 24A and 24B illustrate the responses of the system FIG. 23 to two respective inputs.

FIG. 27 presents equations according to one embodiment that specify the compensation spectra A, $E_B$, C and $E_D$ in terms of the I/Q impairment information.

FIG. 35 presents a matrix equation derived from the phasor diagrams of FIGS. 34A and 34B.

FIG. 36 presents the solution to the matrix equation of FIG. 35.

FIG. 41 illustrates a system with frequency response H(f) being stimulated by an input signal $s_{input}(f,t)$ having gain imbalance g(f) and phase skew φ(f), and producing output signal $s_{output}(f,t)$ with gain imbalance g'(f) and phase skew φ'(f).

FIG. 42 presents equations derived from FIG. 41.

FIG. 43 illustrates one embodiment of a method for transforming I/Q impairments through a linear system H(f).

FIG. 44 illustrates one embodiment of a method for determining I/Q impairments of a transmitter.

FIG. 45 illustrates one embodiment of a method for determining I/Q impairments of a transmitter, using intentionally-displaced local oscillators.

FIG. 46 illustrates one embodiment of a method for determining the I/Q impairments of a receiver.

FIG. 47 illustrates one embodiment of a method for estimating I/Q impairments associated with a complex signal.

FIG. 54 illustrates a phasor diagram corresponding to the right-hand part of FIG. 53B (i.e., to the right of the dotted line).

FIG. 55A illustrates a receiver including a receiver filter 5525 and an I/Q demodulator 5530.

FIG. 55B illustrates a system including a transmitter and a receiver that are coupled together. The system may be used to determine the I/Q impairments of the transmitter and/or the receiver.

FIG. 55C illustrates the relative magnitude of the tone at frequency f and the image at −f at three points along the path from the transmitter's I/Q modulator to the receiver's I/Q demodulator.

FIG. 57 introduces notation for the complex amplitude a of a tone and the complex amplitude β of an image carried by complex signal that has been distorted by gain imbalance g(f) and phase skew φ(f).

FIGS. 58A and 58B derive equations that characterize the tone and image in terms of the gain imbalance g(f) and phase skew φ(f).

FIG. 59 illustrates the gain imbalance g(f) and phase skew φ(f) in terms of a distortion to the Q channel signal ("Q Actual") relative to the I channel signal ("I Reference").

FIG. 66 illustrates a system model whose complex input signal has I/Q impairments $g_{in}(\omega)$ and $\phi_{in}(\omega)$ and whose complex output signal has I/Q impairments $g_{out}(\omega)$ and $\phi_{out}(\omega)$.

FIG. 67 presents equations specifying the frequency response functions U(ω) and V(ω) of FIG. 66 in terms of the input I/Q impairments $g_{in}(\omega)$ and $\phi_{in}(\omega)$ and the output I/Q impairments $g_{out}(\omega)$ and $\phi_{out}(\omega)$.

Figure 1A:
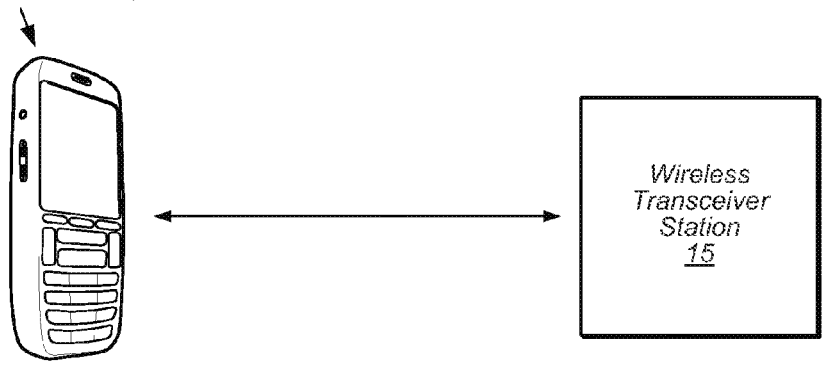
FIG. 1A illustrates one possible application of the compensation methods disclosed herein, where mobile device 10 and/or wireless transceiver station 15 apply digital pre-compensation to their transmitted signals and/or digital post-compensation to their received signals.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. Note that the various section headings in the following Detailed Description are for organizational purposes only and are not meant to be used to limit the claims.

DETAILED DESCRIPTION

Terminology

The following is a glossary of terms used in the present application:

Memory Medium—Any of various types of memory devices or storage devices. The term "memory medium" is intended to include an installation medium, e.g., a CD-ROM, floppy disks 105, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Local Oscillator (LO)—a circuit configured to generate a periodic signal at a specified frequency and amplitude. The periodic signal may be a pure sinusoid, and its frequency and/or amplitude may be programmable. The periodic signal may or may not be phase or frequency locked to another periodic signal."

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a tablet computer, a wearable computer, etc.

In some embodiments, a set of computers distributed across a network may be configured to partition the effort of executing a computational method (e.g., any of the method embodiments disclosed herein). In some embodiments, a first computer may be configured to receive an O-QPSK modulated signal and to capture samples of that signal. The first computer may send the samples to a second computer through the network. The second computer may operate on the samples according to any of the method embodiments described herein, or, any combination of the method embodiments described herein, or, any subset of any of the method embodiments described herein, or, any combination of such subsets.

FIG. 1A illustrates one possible application (among many) of the inventive ideas described herein. A mobile device 10 (e.g., mobile phone) communicates wirelessly with a wireless transceiver station 15. The mobile device 10 may include the digital pre-correction described herein to improve the quality of its transmitted signals, i.e., to correct for so-called "I/Q impairments" in its transmission hardware (e.g., in its I/Q modulator). Similarly, the wireless transceiver station 15 may apply digital post-correction to its received signal to correct for I/Q impairments in its reception hardware (e.g., in its I/Q demodulator). Furthermore, the wireless transceiver station and mobile device may apply the same pre-correction and post-correction with roles exchanged, i.e., for transmissions in the opposite direction.

Figure 1B:
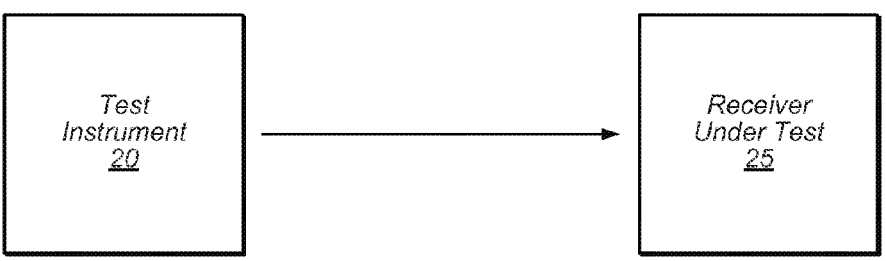
FIG. 1B illustrates another possible application of the compensation methods disclosed herein, where a test instrument 20 applies digital pre-compensation to remove the effect of its I/Q impairments on the signals it transmits to a receiver under test 25.

FIG. 1B illustrates another possible application of the inventive ideas described herein. A test transmitter 20 transmits signals to a receiver under test 25. The test transmitter 20 may perform the digital pre-correction described herein correct for its own I/Q impairments, and thus, improve the quality of its transmissions. For example, the test transmitter 20 may achieve a higher standard on image rejection due to use of the digital pre-correction. Thus, distortions (e.g., I/Q impairments) measured in the signals captured by the receiver may be ascribed to the receiver's imperfections.

Figure 1C:
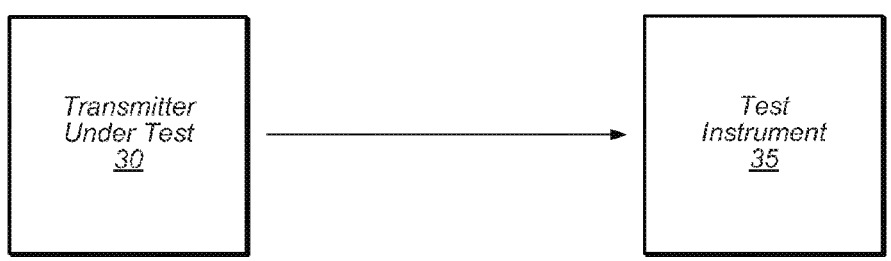
FIG. 1C illustrates yet another possible application of the compensation methods disclosed herein, where a test instrument 35 applies digital post-compensation to remove the effect of its I/Q impairments on the signals it receives from a transmitter under test.

FIG. 1C illustrates yet another possible application of the inventive ideas described herein. A test receiver 35 receives signals transmitted by a transmitter under test 30. The test receiver employs the digital post-correction described herein to correct for its own I/Q impairments. Thus, the receiver may meet a higher standard on image rejection than it would without the post-correction. Therefore, any distortions (e.g., I/Q impairments) measured in the signals captured by the receiver may be clearly assigned to the transmitter's imperfections.

Wideband Correction Method for Receiver

Figure 2A:
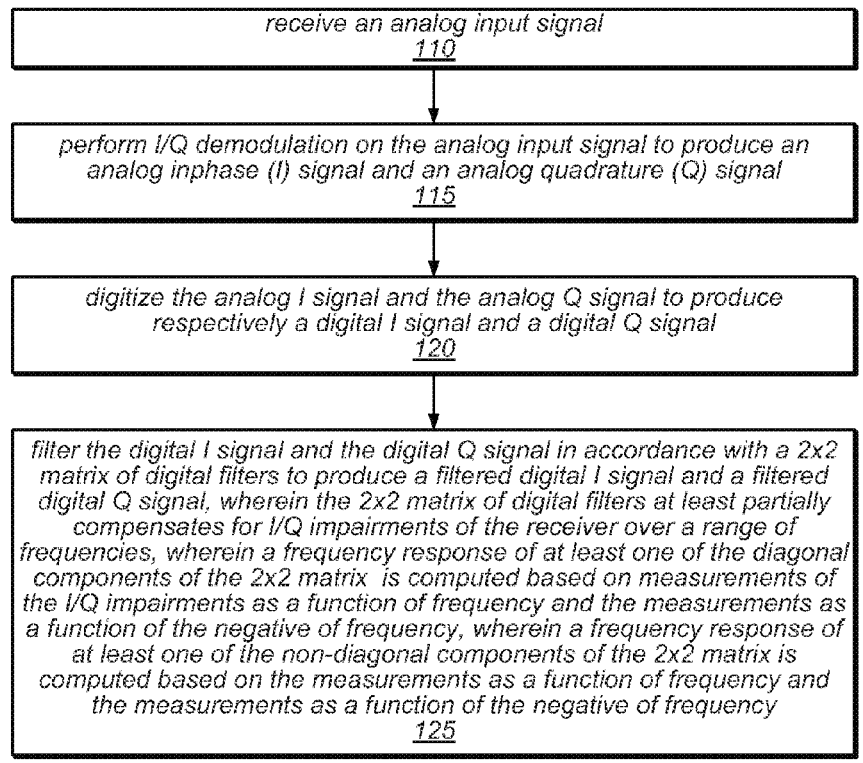
FIG. 2A illustrates one embodiment of a method for operating a receiver so as to achieve at least partial I/Q impairment compensation.

In one set of embodiments, a method 100 for compensating for I/Q impairments of a receiver over a range of frequencies may involve the operations shown in FIG. 2A.

At 110, the receiver may receive an analog input signal. The analog input signal may be received from a transmission medium. The transmission medium is a medium that permits the transmission of signal energy. For example, the transmission medium may be free space, the atmosphere, the earth or some portion of the earth's surface, an electrical cable, a fiber optic cable, a body of water such as an ocean.

At 115, the receiver may perform I/Q demodulation on the analog input signal to produce an analog inphase (I) signal and an analog quadrature (Q) signal. The process of I/Q demodulation is well understood in the field of communication. Typically, I/Q demodulation involves mixing the analog input signal with a pair of orthogonal carriers. For example, the mixing may be interpreted according to the following model:

$$I(t)=y(t)\cos(\omega t)$$

$$Q(t)=y(t)\sin(\omega t).$$

In some embodiments, the analog I signal and the analog Q signals may be interpreted as baseband signals, i.e., as the components of a complex baseband signal. In other embodiments, the analog I signal and the analog Q signals may be interpreted as intermediate frequency (IF) signals.

At 120, the receiver may digitize the analog I signal and the analog Q signal to produce, respectively, a digital I signal and a digital Q signal. (The term "digital signal" is meant to imply a sampled signal, not a two-state signal.) Thus, the receiver may include a pair of analog-to-digital converters (ADCs).

At 125, the digital I signal and the digital Q signal may be filtered in accordance with a 2×2 matrix of digital filters to produce a filtered digital I signal and a filtered digital Q signal. The filtering may involve applying the 2×2 matrix ($h_{ij}$) of digital filters according to the relations:

$$I_F(n)=h_{11}(n)*I(n)+h_{12}(n)*Q(n)$$

$$Q_F(n)=h_{21}(n)*I(n)+h_{22}(n)*Q(n),$$

where the symbol "*" represents convolution. (Note, elsewhere in this patent disclosure, the symbol "*" may mean convolution or multiplication, depending on the particular context. As a superscript, "*" denotes complex conjugation.)

The 2×2 matrix of digital filters may compensate (or, at least partially compensate) for I/Q impairments of the receiver over a range of frequencies, e.g., a range of frequencies wide enough to cover the bandwidth of transmitted communication signal or an instantaneous bandwidth of the receiver. (Processes for measuring I/Q impairments are discussed at length later in this patent disclosure.) In other words, the digital filters make the receiver's input-output behavior more closely approximate a perfect receiver that has no I/Q impairments. In response to the application of a pure sinusoidal tone at arbitrary frequency ω as input, a perfect receiver would produce signals I(n) and Q(n) that are equal in amplitude and 90 degrees apart in phase, i.e., no gain imbalance and no phase skew.

The 2×2 matrix of digital filters may have the following properties. The frequency response of at least one of the diagonal components of the 2×2 matrix may be computed based on measurements of the I/Q impairments as a function of frequency and the measurements of the I/Q impairments as a function of the negative of frequency. For example, if one characterizes the I/Q impairments with a gain imbalance function g(f) and a phase skew function ϕ(f), with f covering the range of frequencies, the frequency response of the component $h_{22}$ (or the component $h_{11}$, or each of the components $h_{11}$ and $h_{22}$) may be computed based on the functions g(f), ϕ(f) and ϕ(−f).

Furthermore, the frequency response of at least one of the non-diagonal components of the 2×2 matrix may be computed based on the measurements of the I/Q impairments as a function of frequency and the measurements of the I/Q impairments as a function of the negative of frequency.

By saying that the filtering of the digital I signal and the digital Q signal is performed "in accordance with a 2×2 matrix of digital filters" is not meant to suggest that the receiver (or whatever device is used to implement the filtering) must include a filter circuit to implement a trivial multiplication by zero when the corresponding element of the 2×2 matrix is identically zero, or an adder to implement a trivial addition by zero. As an example, if $h_{12}=0$, then $I_F(n)$ may be computed according to the simplified expression $$I_F(n)=h_{11}(n)*I(n)$$

with only one convolution circuit. Similarly, if one of the components of the 2×2 matrix is a unit impulse at time n=0, then the receiver need not include a multiplier to perform that trivial convolution. For example, if $h_{11}(n)$ is a unit impulse, then $I_F(n)$ may be simply computed according to the expression $$I_F(n)=I(n)+h_{12}(n)*Q(n)$$

with only one convolution unit and one adder. Thus, filtering "in accordance with a 2×2 matrix of digital filters" does not necessarily require a full 2×2 array of convolution circuits in all cases.

In some embodiments, the filtered digital I signal and the filtered digital Q signal are usable to recover a stream of information bits. The receiver (or another processing agent such as a host computer) may recover the stream of information bits by performing symbol demodulation on the filtered digital I signal and the filtered digital Q signal. In symbol demodulation, the vector signal ($I_F(n),Q_F(n)$) may be decimated to determine a sequence of complex symbols, and each of the complex symbols may be mapped to the closest constellation point in a given constellation (set of points in the complex plane). The sequence of resulting complex points determines a stream of information bits.

In some embodiments, the receiver includes a digitizer, where the digitizer performs the above-described actions of digitizing and filtering. The term "digitizer" is meant to imply an instrument that is calibrated to a known standard. For example, the relationship between the analog input and the digital output is calibrated to a known standard for both the I channel and the Q channel.

In some embodiments, the receiver is a test instrument such as a vector signal analyzer (VSA). (The term "vector signal" is a synonym for complex signal or I/Q signal.) The test instrument may receive the analog input signal from a transmitter, e.g., a transmitter under test. The analog input signal is received in response to the transmitter's action of transmitting a transmit signal onto the transmission medium. The test instrument may be configured to compensate for its own I/Q impairments, but to not compensate for the I/Q impairments of the transmitter. In the context of test and measurement, it is important to be able to accurately measure and report the impairments of a device under test rather than to compensate for the impairments of that device. Thus, for a test instrument, it may be preferable that the measurements of the receiver's I/Q impairments (on which the receiver's impairment compensation is based) do not include I/Q impairments of the transmitter. The present patent disclosure describes methods for measuring receiver-only impairments.

Test instruments are generally used to perform the testing of devices under test (DUTs) or systems under test (SUTs). Test instruments generally include one or more inputs and outputs for connecting to SUTs. The inputs and outputs may be analog, digital, radio frequency, etc., e.g., at various voltage levels and frequencies. Test instruments are generally able to perform one or more tests or features. For example, test instruments may be configured to capture and analyze waveforms, calculate measured power, generate a tone at a programmed frequency, etc. Test instruments are also typically calibrated in order to achieve a specified level of accuracy on its I/O. Finally, test instruments usually include a user interface in order to specify how the test instrument should behave.

In other contexts, the receiver may be expected to compensate for the transmitter's impairments and its own impairments. Thus, the 2×2 matrix of digital filters may be computed based on measurements of the I/Q impairments of the transmitter-and-receiver combination. The same principle regarding calculation of frequency responses based on the impairments as a function of f and the impairments as a function −f applies here.

In some embodiments, the filtering operation 125 may be performed on a programmable hardware element such as an FPGA, or in dedicated digital circuitry such as an application specific integrated circuit (ASIC). The programmable hardware element or dedicated digital circuitry may be supplied with the same sample clock that drives the ADC conversion.

In some embodiments, the filtering operation 125 may be performed by a processor in response to the execution of program instructions. The processor may be incorporated as part of the receiver, or as part of another system such as a host computer or controller board.

As described above, at least one of the diagonal components of the 2×2 matrix is computed based on the measurements of the I/Q impairments as a function of f and the measurements of the impairments as a function −f. In some embodiments, the "at least one diagonal" is to be interpreted as "exactly one diagonal", and the other diagonal component of the 2×2 matrix is a discrete-time unit impulse function (e.g., taking the value one at time zero, and zero elsewhere).

As described above, at least one of the non-diagonal components of the 2×2 matrix is computed based on the measurements of the I/Q impairments as a function of f and the measurements of the I/Q impairments as a function −f. In some embodiments, the "at least one non-diagonal" is to be interpreted as "exactly one non-diagonal", and the other non-diagonal component of the 2×2 matrix is the zero function.

Constraint Between Receiver Impairments at Frequency f and Frequency −f

In some embodiments, the receiver's I/Q impairments over positive frequencies and the receiver's I/Q impairments over negative frequencies may be assumed to be functionally related. In one such embodiment, the computation of the 2×2 matrix of digital filters may be simplified as follows. The frequency response of one of the diagonal components of the 2×2 matrix at the arbitrary frequency f in the frequency range may be computed based only on a measurement of the I/Q impairments at the frequency f (or alternatively, only on a measurement of the I/Q impairments at the frequency −f). For example, if the I/Q impairments are characterized by a gain imbalance function g(f) and a phase skew function ϕ(f), the frequency response $H_{22}(f)$ of the component $h_{22}$ may be computed based only on a measurement of g(f) and a measurement of φ(f), where f ranges over the frequencies at which measurements have been obtained. Furthermore, the frequency response of one of the non-diagonal components of the 2×2 matrix at the frequency f may be computed based only on the measurement of the I/Q impairments at the frequency f (or alternatively, only on the measurement of the I/Q impairments at the frequency −f).

In some embodiments, the I/Q impairments at the frequency f and the I/Q impairments at frequency −f are constrained such that the I/Q impairments at f are determined by the I/Q impairments at −f, or such that the I/Q impairments at frequency −f are determined by the I/Q impairments at f. For example, the gain imbalance at the frequency f and the gain imbalance at frequency −f may be constrained to be equal, and the phase skew at frequency f and the phase skew at frequency −f may be constrained to be equal (or negatives of each other).

In some embodiments, the gain imbalance is assumed to be even and the phase skew is assumed to be odd. In these embodiments, both non-diagonal components of the 2×2 matrix may be set to zero; one of the diagonal components may correspond to a pure pass-through filter (i.e., unity frequency response); and a frequency response of the other diagonal component at the arbitrary frequency f may be computed based only on a measurement of the I/Q impairments at the frequency f (or alternatively, only on a measurement of the I/Q impairments at the frequency −f).

In some embodiments, both diagonal components of the 2×2 matrix may correspond to pure pass-through filters; one of the non-diagonal components may be set to zero; and a frequency response of the other non-diagonal component at the arbitrary frequency f may be computed based only on a measurement of the I/Q impairments at the frequency f (or alternatively, only on a measurement of the I/Q impairments at the frequency −f).

Receiver Configured for Wideband Correction

Figure 2B:
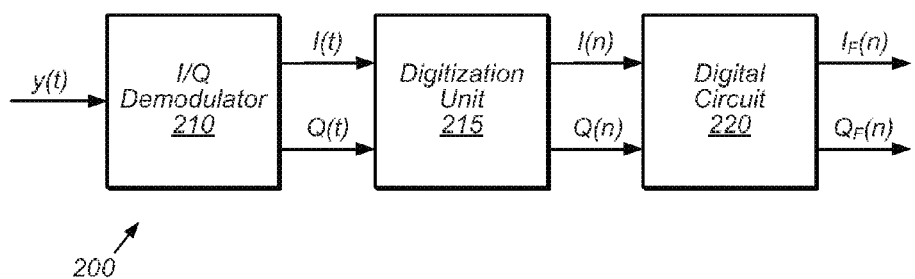
FIG. 2B illustrates one embodiment of a receiver configured to achieve at least partial I/Q impairment compensation.

In one set of embodiments, a receiver 200 may be configured as shown in FIG. 2B. (Receiver 200 may include any subset of the features described above in connection with method 100.) Receiver 200 may include an I/Q demodulator 210, a digitization unit 215 and a digital circuit 220.

The I/Q demodulator 210 may be configured to receive an analog input signal y(t) and perform I/Q demodulation on the analog input signal to produce an analog inphase (I) signal and an analog quadrature (Q) signal, denoted I(t) and Q(t). The I/Q demodulator may receive a pair of orthogonal carriers from a local oscillator circuit.

The digitization unit 215 may be configured to digitize the analog I signal and the analog Q signal to produce, respectively, a digital I signal and a digital Q signal, which are denoted I(n) and Q(n). The digitization unit 215 may receive a conversion clock from a clock generation circuit. The digitization unit includes an I-channel ADC and a Q-channel ADC, each being driven by the same conversion clock.

The digital circuit 220 may be configured to filter the digital I signal and the digital Q signal in accordance with a 2×2 matrix of digital filters (as described above) to produce a filtered digital I signal and a filtered digital Q signal. The 2×2 matrix of digital filters may be configured to compensate (or, at least partially compensate) for I/Q impairments of the receiver over a range of frequencies. The digital circuit, when programmed with the 2×2 matrix of digital filters, makes the receiver 200 behave more like a mathematically perfect receiver, i.e., one having a perfect I/Q demodulator and perfect digitization unit.

In some embodiments, the digital circuit 220 is realized by (or, as part of) a programmable hardware element, or dedicated digital circuitry such as an ASIC.

In some embodiments, the digital circuit 220 is (or includes, or is realized by) a processor that is configured to execute program instructions. In one embodiment, the processor is part of a computer system such as a host computer system or controller board.

In some embodiments, the receiver 200 may include a means for recovering a stream of information bits by performing symbol demodulation on the filtered digital I signal and the filtered digital Q signal. The recovering means may include any one or more of the following: a processor executing on the receiver, a processor executing on a host computer, a processor executing on a controller board (e.g., a controller board installed in an instrumentation chassis along with the receiver), a programmable hardware element, an ASIC.

In some embodiments, the receiver 200 is (or includes) a test instrument. See the above discussion of the notion of a test instrument.

Method for Configuring a Receiver to Perform Impairment Correction

Figure 3:
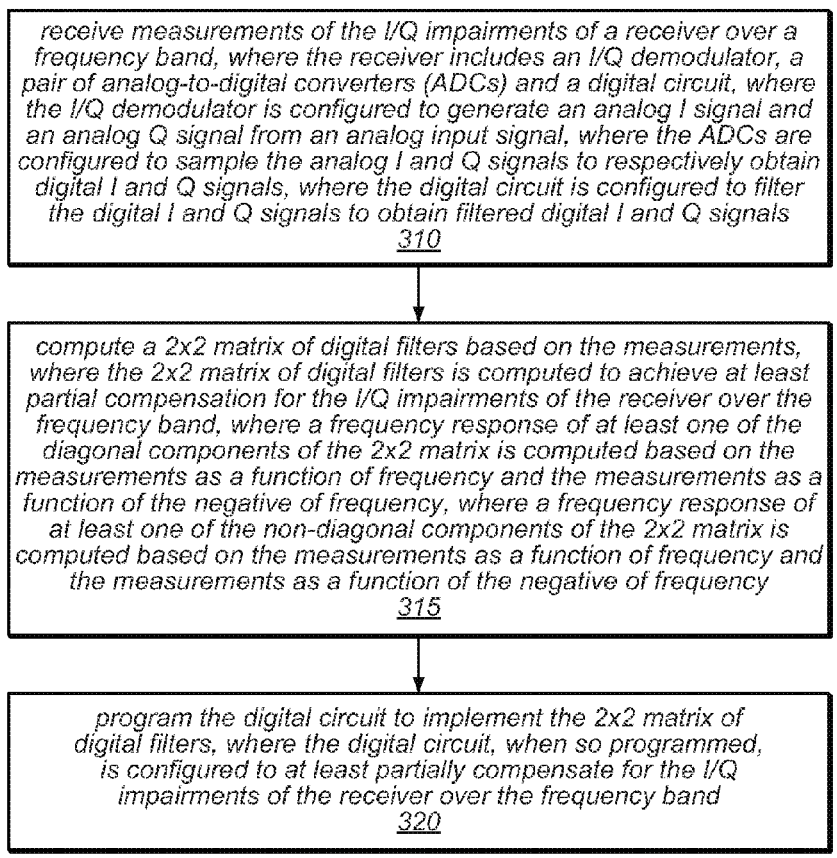
FIG. 3 illustrates one embodiment of a method for configuring a receiver to enable the receiver to at least partially compensate for I/Q impairments.

In one set of embodiments, a method 300 for configuring a receiver may involve the operations shown in FIG. 3. The method 300 may be used to configure the receiver to at least partially compensate for I/Q impairments of the receiver. The method 300 may be implemented by a computer system in response to the execution of program instructions. (The method 300 may include any subset of the features described above.)

At 310, the computer system may receive measurements of the I/Q impairments of the receiver over a frequency band. ("Over a frequency band" means that the measurements include measurements at a plurality of different frequencies within the frequency band, e.g., uniformly or non-uniformly covering the frequency band.) The receiver may include an I/Q demodulator, a pair of analog-to-digital converters (ADCs) and a digital circuit, e.g., as described above. The I/Q demodulator may be configured to generate an analog I signal and an analog Q signal from an analog input signal. The ADCs may be configured to sample the analog I signal and the analog Q signal to respectively obtain a digital I signal and a digital Q signal. The digital circuit may be configured to filter the digital I signal and the digital Q signal to obtain a filtered digital I signal and a filtered digital Q signal. (See the above discussion for various ways of realizing the digital circuit.)

At 315, the computer system may compute a 2×2 matrix of digital filters based on the measurements. The 2×2 matrix of digital filters may be computed to achieve at least partial compensation for the I/Q impairments of the receiver over the frequency band. A frequency response of at least one of the diagonal components of the 2×2 matrix may be computed based on the measurements as a function of frequency and the measurements as a function of the negative of frequency. Furthermore, a frequency response of at least one of the non-diagonal components of the 2×2 matrix may be computed based on the measurements as a function of frequency and the measurements as a function of the negative of frequency.

At 320, the computer system may program the digital circuit to implement the 2×2 matrix of digital filters, where the digital circuit, when so programmed, is configured to at least partially compensate for the I/Q impairments of the receiver over the frequency band. The action of programming the digital circuit involves transferring the 2×2 matrix of digital filters (or parameters specifying those filters) to the digital circuit or to a memory used by the digital circuit.

Wideband Correction Method for Transmitter

Figure 4:
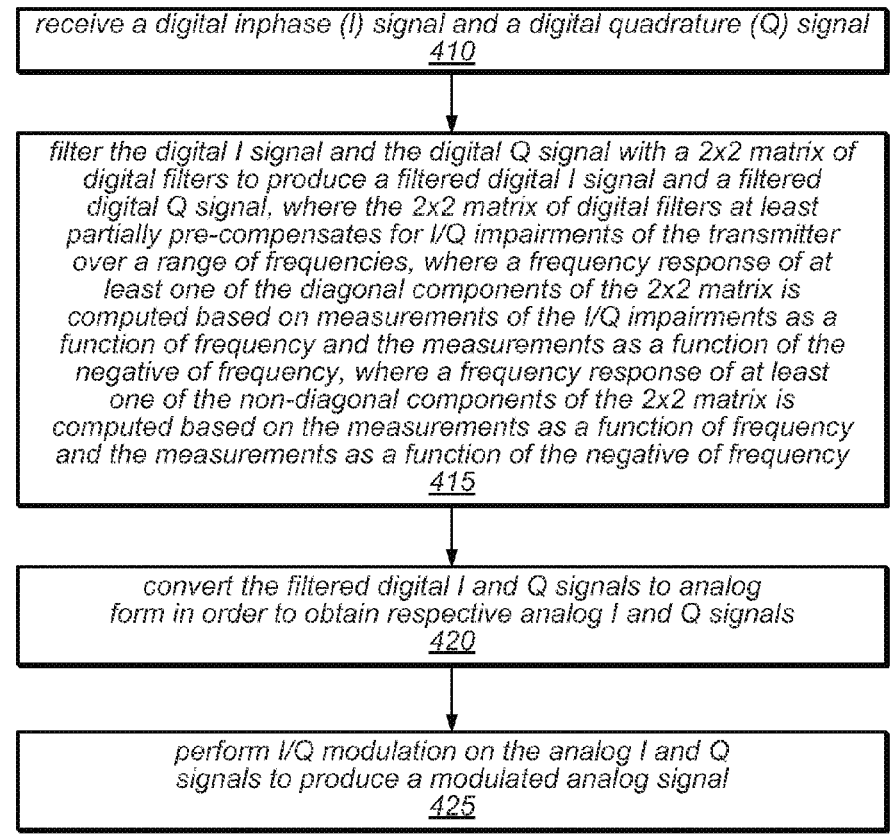
FIG. 4 illustrates one embodiment of a method for operating a transmitter so as to achieve at least partial I/Q impairment compensation.

In one set of embodiments, a method 400 for compensating for I/Q impairments of a transmitter may involve the operations shown in FIG. 4.

At 410, a digital inphase (I) signal and a digital quadrature (Q) signal may be received. The digital I signal and the digital Q signal may be interpreted as the components of a complex-valued signal I(n)+jQ(n). The digital I signal and the digital Q signal may carry one or more streams of information bits, e.g., as the result of symbol modulation according to a given constellation. In some embodiments, the digital I signal and the digital Q signal may be interpreted as the components of a complex-valued baseband signal or intermediate frequency (IF) signal.

At 415, the digital I signal and the digital Q signal may be filtered in accordance with a 2×2 matrix of digital filters to produce a filtered digital I signal and a filtered digital Q signal. (The filtering operation may be performed by the transmitter or some other agent.) The filtering operation may involve applying the 2×2 matrix ($h_{ij}$) of digital filters according to the relations:

$$I_F(n) = h_{11}(n)*I(n) + h_{12}(n)*Q(n),$$

$$Q_F(n) = h_{21}(n)*I(n) + h_{22}(n)*Q(n).$$

The 2×2 matrix of digital filters may pre-compensate (or, at least partially pre-compensate) for the I/Q impairments of the transmitter over a range of frequencies, e.g., over a frequency range broad enough to cover the bandwidth of a communication signal to be transmitted.

The 2×2 matrix of digital filters may have the following properties. The frequency response of at least one of the diagonal components of the 2×2 matrix may be computed based on measurements of the I/Q impairments as a function of frequency and the measurements of the I/Q impairments as a function of the negative of frequency. For example, if the I/Q impairments are characterized by a gain imbalance function g(f) and a phase skew function φ(f), with f covering the range of frequencies, the frequency response of the digital filter $h_{22}$ (or the digital filter $h_{11}$, or each of the digital filters $h_{11}$ and $h_{22}$) may be computed based on g(f), g(−f), φ(f) and φ(−f).

Furthermore, a frequency response of at least one of the non-diagonal components of the 2×2 matrix may be computed based on the measurements of the I/Q impairments as a function of frequency and the measurements of the I/Q impairments as a function of the negative of frequency.

In the description of the receiver 100, we were careful to qualify the meaning of filtering "in accordance with a 2×2 matrix of digital filters". Those same qualifications apply here for the transmitter compensation.

At 420, the transmitter may convert the filtered digital I signal and the filtered digital Q signal to analog form in order to respectively obtain an analog I signal and an analog Q signal.

At 425, the transmitter may perform I/Q modulation on the analog I and Q signals to produce a modulated analog signal. The modulated analog signal may be transmitted onto a transmission medium, e.g., a transmission medium as described above. A receiver may receive the modulated analog signal, likely in a noise-perturbed and channel-distorted form.

Above, we described the 2×2 matrix of digital filters as "pre-compensating" for I/Q impairments of the transmitter. That is because the I/Q impairments occur after the application of the digital filters, especially in the I/Q modulation stage. Thus, the 2×2 matrix may be interpreted as applying an inverse distortion that together with the following distortions will give an approximation to the identity map overall.

In some embodiments, the filtering operation 415 may be performed in a programmable hardware element (PHE) such as an FPGA, or in dedicated digital circuitry such as an application-specific integrated circuit (ASIC).

In some embodiments, the filtering operation 415 may be performed by a processor in response to the execution of program instructions, e.g., a processor of a host computer system or an instrumentation controller broad.

In some embodiments, the transmitter is a test instrument (e.g., an arbitrary waveform generator or a vector signal generator). The test instrument may transmit the modulated analog signal to a receiver, e.g., a receiver under test. In the context of test and measurement, it may be important for the test instrument to correct for its own impairments but to not correct for the impairments of the receiver. Thus, in this context, the above-described measurements of the transmitter's I/Q impairments (on which the transmitter's pre-compensation is based) preferably do not include I/Q impairments of the receiver. This patent disclosure describes methods for measuring transmitter-only impairments (cleanly separated from receiver impairments).

In some contexts, the transmitter may be expected to correct for the receiver's impairment and its own impairments. Thus, the 2×2 matrix of digital filters may be computed based on measurements of the I/Q impairments of the transmitter-and-receiver combination. The same principle regarding calculation of frequency responses based on the impairments as a function off and the impairments as a function −f applies here.

Constraint Between Transmitter Impairments at Frequency f and Frequency −f

In some embodiments, the transmitter's I/Q impairments over positive frequencies and the transmitter's I/Q impairments over negative frequencies may be assumed to be functionally related. In one such embodiment, the computation of the 2×2 matrix of digital filters may be simplified as follows. The frequency response of at least one of the diagonal components of the 2×2 matrix at the arbitrary frequency f in the frequency range may be computed based only on a measurement of the I/Q impairments at the frequency f (or alternatively, only on a measurement of the I/Q impairments at the frequency −f). For example, if the I/Q impairments are characterized by a gain imbalance function g(f) and a phase skew function φ(f), the frequency response value $H_{22}(f)$ of the component $h_{22}$ may be computed based only on the a measurement of g(f) and a measurement of φ(f), where f ranges over the frequencies at which measurements have been obtained. Furthermore, the frequency response of at least one of the non-diagonal components of the 2×2 matrix at the frequency f may be computed based only on the measurement of the I/Q impairments at the frequency f (or alternatively, only on the measurement of the I/Q impairments at the frequency −f).

In some embodiments, the I/Q impairments at the frequency f and the I/Q impairments at frequency −f are constrained such that the I/Q impairments at f are determined by the I/Q impairments at −f, or such that the I/Q impairments at frequency −f are determined by the I/Q impairments at f. For example, the gain imbalance at the frequency f and the gain imbalance at frequency −f may be constrained to be equal, and the phase skew at frequency f and the phase skew at frequency −f may be constrained to be equal (or alternatively, negatives of each other).

In some embodiments, the gain imbalance is assumed to be even and the phase skew is assumed to be odd. Then both non-diagonal components of the 2×2 matrix may be set to zero; one of the diagonal components may correspond to a pure pass-through filter (i.e., unity frequency response); and a frequency response of the other diagonal component at the arbitrary frequency f may be computed based only on a measurement of the I/Q impairments at the frequency f (or alternatively, only on a measurement of the I/Q impairments at the frequency −f).

In some embodiments, both diagonal components of the 2×2 matrix may correspond to pure pass-through filters; one of the non-diagonal components may be set to zero; and a frequency response of the other non-diagonal component at the arbitrary frequency f may be computed based only on a measurement of the I/Q impairments at the frequency f (or alternatively, only on a measurement of the I/Q impairments at the frequency −f).

Transmitter Configured for Wideband Correction

Figure 5:
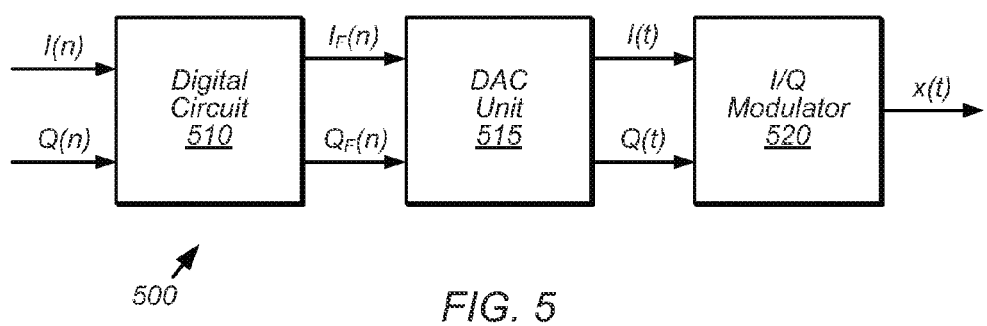
FIG. 5 illustrates one embodiment of a transmitter configured to achieve at least partial I/Q impairment compensation.

In one set of embodiments, a transmitter 500 may be configured as shown in FIG. 5. (Transmitter 500 may incorporate any subset of the features described above in connection with method 400.) Transmitter 500 may include a digital circuit 510, a digital-to-analog conversion (DAC) unit 515 and an I/Q modulator 520.

The digital circuit 510 may be configured to receive a digital inphase (I) signal and a digital quadrature (Q) signal, and filter the digital I signal and the digital Q signal with a 2×2 matrix of digital filters to produce a filtered digital I signal and a filtered digital Q signal. (The filtering may be performed as variously described above.) The digital I signal and the digital Q signal may carry one or more streams of information bits.

The 2×2 matrix of digital filters may be computed to pre-compensate (or, at least partially pre-compensate) for I/Q impairments of the transmitter over a range of frequencies. A frequency response of at least one of the diagonal components of the 2×2 matrix may be computed based on measurements of the I/Q impairments as a function of frequency and the measurements of the I/Q impairments as a function of the negative of frequency. Furthermore, a frequency response of at least one of the non-diagonal components of the 2×2 matrix may be computed based on the measurements of the I/Q impairments as a function of frequency and the measurements of the I/Q impairments as a function of the negative of frequency.

The digital circuit 510 is said to "pre-compensate" for the I/Q impairment of the transmitter because the I/Q impairments occur in transmitter stages after the digital circuit, especially in the I/Q modulator 520. Thus, the digital circuit (by applying the 2×2 matrix of digital filters) introduces a pre-distortion to the complex signal I(n)+jQ(n) so that the net effect of the pre-distortion followed by the subsequent impairments will approximate an ideal transmitter having no I/Q impairments. In other words, the digital circuit applies an inverse distortion that in combination with the subject distortion approximates the identity map (i.e., frequency response function identically equal to unity).

The DAC unit 515 may be configured to convert the filtered digital I and Q signals to analog form in order to obtain respective analog I and Q signals. The DAC unit 515 may receive a conversion clock from a clock generation unit. The digital circuit 510 may receive the same conversion clock so that it generates the complex samples $(I_F(n), Q_F(n))$ at the same rate that the DAC unit converts the samples into analog form (I(t),Q(t)).

The I/Q modulator 520 may be configured to perform I/Q modulation on the analog I and Q signals to produce a modulated analog signal. The modulated analog signal may be transmitted to a receiver through a transmission medium. The notion of I/Q modulation is well understood in the field of communication. For example, the I/Q modulation may be modeled by the expressions:

$$x(t) = I(t)\cos(\omega t) - Q(t)\sin(\omega t) = \text{Re}\{(I(t) + jQ(t))\exp(j\omega t)\},$$

where ω is the carrier frequency.

In some embodiments, the digital circuit 510 is realized by (or, as part of) a programmable hardware element, or dedicated digital circuitry such as an ASIC.

In some embodiments, the digital circuit 510 is (or includes, or is realized by) a processor that is configured to execute program instructions. In one embodiment, the processor is part of a computer system such as a host computer system or controller board.

In some embodiments, the transmitter 500 may be a test instrument. See the above discussion of test instrument in the context of method 400.

Method for Configuring a Transmitter for Impairment Correction

In one set of embodiments, a method 600 for configuring a transmitter may involve the operations shown in FIG. 6. The method 600 may be used to configure the transmitter to at least partially compensate for I/Q impairments of (or introduced by) the transmitter. The method 600 may be performed by a computer system in response to the execution of program instructions.

At 610, the computer system may receive measurements of the I/Q impairments of the transmitter over a frequency range. ("Over a frequency range" implies that the measurements of the I/Q impairments are obtained at a plurality of frequencies within the frequency range, e.g., frequencies covering the frequency range uniformly or non-uniformly.) The transmitter may include a digital circuit, a pair of digital-to-analog converters (DACs) and an I/Q modulator. The digital circuit may be configured to filter a digital I signal and a digital Q signal to respectively obtain a filtered digital I signal and a filtered digital Q signal. The pair of DACs may be configured to convert the filtered digital I signal and the filtered digital Q signal to analog form in order to respectively obtain an analog I signal and an analog Q signal. The I/Q modulator may be configured to modulate a carrier signal with the analog I and Q signals to obtain a modulated carrier signal. The modulated carrier signal may be transmitted to a receiver through a transmission channel.

At 615, the computer system may compute a 2×2 matrix of digital filters for the digital circuit based on the measurements. The 2×2 matrix of digital filters may be computed to achieve pre-compensation (or, at least partial pre-compensation) for the I/Q impairments of the transmitter over the frequency range. The frequency response of at least one of the diagonal components of the 2×2 matrix may be computed based on the measurements as a function of frequency and the measurements as a function of the negative of frequency. Furthermore, the frequency response of at least one of the non-diagonal components of the 2×2 matrix may be computed based on the measurements as a function of frequency and the measurements as a function of the negative of frequency.

At 620, the computer system may program the digital circuit to implement the 2×2 matrix of digital filters, where the digital circuit, when so programmed, is configured to at least partially pre-compensate for the I/Q impairments over the frequency range. The action of programming the digital circuit involves transferring the digital filters (or parameters specifying the filters) to the digital circuit or to parameter memory used by the digital circuit.

In various embodiments, the digital circuit may be a programmable hardware element, an application specific integrated circuit (ASIC), a processor executing under the control of program instructions, or any combination thereof.

Derivation of Digital Filters for Wideband Impairment Compensation

As described above, a 2×2 matrix of digital filters may be used to compensate for I/Q impairments at a receiver or a transmitter. (Indeed, both the transmitter and the receiver may employ the matrix compensation, each using its own 2×2 compensation matrix. The transmitter's compensation matrix may be computed based on the transmitter's I/Q impairments, while the receiver's compensation matrix may be computed based on the receiver's I/Q impairments.) This section derives the frequency responses for the digital filters in the special case where the 2×2 matrix has the special form shown in FIG. 7.

Figure 7:
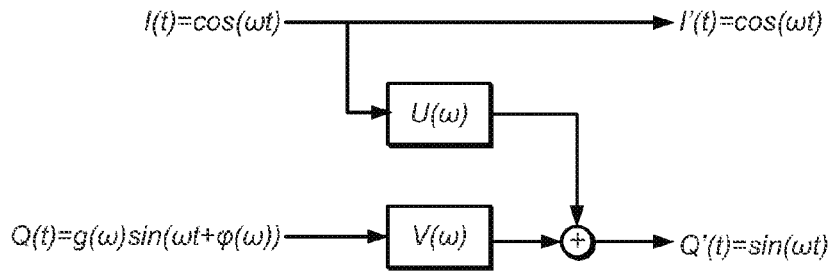
FIG. 7 illustrates one embodiment of a system configured to provide I/Q impairment compensation. The I/Q impairments are modeled as appearing entirely on the Q channel.
Figure 8:
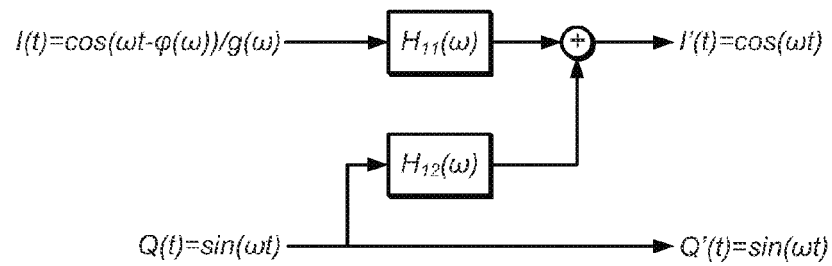
FIG. 8 illustrates another embodiment of a system configured to provide I/Q impairment compensation. The I/Q impairments are modeled as appearing entirely on the I channel.
Figure 9:
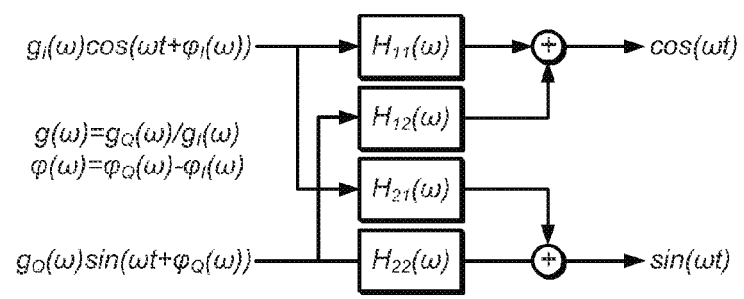
FIG. 9 illustrates yet another embodiment of a system configured to provide I/Q impairment compensation. The I/Q impairments are modeled as appearing partially on both channels.

Since gain imbalance g and phase skew φ are relative measurements, we have the freedom to model the gain imbalance and phase skew as being due to distortions on only one channel (I or Q), the other channel being ideal. FIG. 7 represents the choice of modeling both the gain imbalance and the phase skew as being due to distortions on the Q channel only. FIG. 8 illustrates the opposite choice. (Thus, frequency responses $H_{11}$ and $H_{12}$ are used to effect the compensation, while $H_{22}=1$ and $H_{21}=0$.) One might also model the gain imbalance as being due to amplitude distortion on one channel only, and the phase skew as being due to phase distortion on the opposite channel only. As yet another alternative, one might model the gain imbalance and/or phase skew as being due to partial distortions on both channel, e.g., as suggested by FIG. 9. Thus, the digital compensation may be performed using all four frequency responses $H_{11}$, $H_{12}$, $H_{21}$ and $H_{22}$. After appreciating the following derivation based on FIG. 7, one of ordinary skill in the art will find it straightforward to apply the same mathematical principles to all other cases.

FIG. 7 may be interpreted as the filtering operation performed by the receiver's digital circuit 220 or the filtering operation performed by the transmitter's digital circuit 510. Thus, the following derivation applies both to the transmitter's compensation matrix and to the receiver's compensation matrix.

While the compensation is applied digitally, for the sake of simplicity, the following derivation will be expressed in terms of continuous time t. To achieve compensation, we seek frequency responses U(ω) and V(ω) so that the distorted signal $$\cos(\omega t) + jg(\omega)\sin(\omega t + \phi(\omega))$$

gets transformed to corrected signal $\cos(\omega t)+j\sin(\omega t)$ for all frequencies ω in a frequency band (e.g., a frequency band that is symmetric about zero), or at least at selected frequencies where measurements of the impairments g(ω) and φ(ω) are available. g(ω) is the gain imbalance corresponding to frequency ω, and φ(ω) is the phase skew corresponding to frequency ω. Thus, we obtain the equation:

$$u(t)*\cos(\omega t)+v(t)*g(\omega)\sin(\omega t+\phi(\omega))=\sin(\omega t),$$

where "*" denotes convolution, where u(t) and v(t) are the impulse responses corresponding respectively to the frequency responses U(ω) and V(ω).

By making the substitutions $$\cos(\theta)=(1/2)\{\exp(j\theta)+\exp(-j\theta)\}$$

$$\sin(\theta)=(-j/2)\{\exp(j\theta)-\exp(-j\theta)\},$$

we obtain the equation $$(1/2)U(\omega)\exp(j\omega t) + (1/2)U(-\omega)\exp(-j\omega t) +$$
$$(-j/2)V(\omega)g(\omega)\exp(j\phi(\omega))\exp(j\omega t) +$$
$$(j/2)V(-\omega)g(\omega)\exp(-j\phi(\omega))\exp(-j\omega t) =$$
$$(-j/2)[\exp(j\omega t) - \exp(-j\omega t)].$$

Due to the linear independence of exp(jωt) and exp(-jωt), we obtain the following two equations:

$$jU(\omega)+V(\omega)g(\omega)\exp(j\phi(\omega))=1 \qquad (a):$$

$$jU(-\omega)-V(-\omega)g(\omega)\exp(-j\phi(\omega))=-1. \qquad (b):$$

Because equation (b) holds for all ω, we can replace ω with -ω, thus obtaining equation (b') below.

$$jU(\omega)-V(\omega)g(-\omega)\exp(-j\phi(-\omega))=-1. \qquad (b'):$$

Equations (a) and (b') specify a matrix equation in vector unknown $[U(\omega),V(\omega)]^T$, whose solution is given by:

$$U(\omega) = j\frac{g(\omega)\exp\{j\varphi(\omega)\} - g(-\omega)\exp\{-j\varphi(-\omega)\}}{g(\omega)\exp\{j\varphi(\omega)\} + g(-\omega)\exp\{-j\varphi(-\omega)\}},$$

$$V(\omega) = \frac{2}{g(\omega)\exp\{j\varphi(\omega)\} + g(-\omega)\exp\{-j\varphi(-\omega)\}}.$$

Observe that U(ω) and V(ω) each depend on g(ω), g(-ω), φ(ω) and φ(-ω). This property of the frequency responses (of the digital filters) depending on impairment information at ω and -ω applies more generally than to the special matrix form of FIG. 7. Indeed, it applies to any form of the compensation matrix. Also observe that U and V are conjugate symmetric with respect to frequency: $U(-\omega)=U(\omega)^*$ and $V(-\omega)=V(\omega)^*$, as expected for filters whose impulses responses are entirely real.

To simplify the process of designing digital filters (impulse responses) corresponding to the frequency responses U(ω) and V(ω), it may be useful to express those frequency responses in terms of their even and odd parts:

$$U(\omega)=A(\omega)+B(\omega)$$

$$A(\omega)=(1/2)\{U(\omega)+U(-\omega)\}$$

$$B(\omega)=(1/2)\{U(\omega)-U(-\omega)\}$$

$$V(\omega)=C(\omega)+D(\omega)$$

$$C(\omega)=(1/2)\{V(\omega)+V(-\omega)\}$$

$$D(\omega)=(1/2)\{V(\omega)-V(-\omega)\}.$$

In the time domain, the corresponding expressions are:

$$u(t)=a(t)+b(t)$$

$$a(t)=(1/2)\{u(t)+u(-t)\}$$

$$b(t)=(1/2)\{u(t)-u(-t)\}$$

$$v(t)=c(t)+d(t)$$

$$c(t)=(1/2)\{v(t)+v(-t)\}$$

$$d(t)=(1/2)\{v(t)-v(-t)\},$$

where u, a, b, v, c, and d are the impulse responses corresponding respectively to frequency responses U, A, B, V, C and D.

Using the above-derived expressions for $U(\omega)$ and $V(\omega)$, it follows that:

$$A(\omega) = \frac{-2g(\omega)g(-\omega)\sin\{\varphi(\omega) + \varphi(-\omega)\}}{g^2(\omega) + g^2(-\omega) + 2g(\omega)g(-\omega)\cos\{\varphi(\omega) + \varphi(-\omega)\}}$$

$$B(\omega) = \frac{j\{g^2(\omega) - g^2(-\omega)\}}{g^2(\omega) + g^2(-\omega) + 2g(\omega)g(-\omega)\cos\{\varphi(\omega) + \varphi(-\omega)\}}$$

$$C(\omega) = \frac{2g(\omega)\cos\{\varphi(\omega)\} + 2g(-\omega)\cos\{\varphi(-\omega)\}}{g^2(\omega) + g^2(-\omega) + 2g(\omega)g(-\omega)\cos\{\varphi(\omega) + \varphi(-\omega)\}}$$

$$D(\omega) = \frac{2j\{-g(\omega)\sin(\varphi(\omega)) + g(-\omega)\sin(\varphi(-\omega))\}}{g^2(\omega) + g^2(-\omega) + 2g(\omega)g(-\omega)\cos\{\varphi(\omega) + \varphi(-\omega)\}}.$$

The above expressions may be used to compute frequency responses U and V based on measured or estimated impairment functions g and φ. These expressions apply equally to post-compensation at the receiver or pre-compensation at the transmitter. In other words, the frequency responses $U(\omega)$ and $V(\omega)$ for pre-correcting I/Q impairments g(f) and φ(f) are the same as the frequency responses for post-correction those same I/Q impairments.

The computed frequency responses U and V may be used to determine corresponding impulses responses u(n) and v(n) using any of various known filter design algorithms.

Note Regarding Filters with Odd Frequency Response

Given a filter with odd frequency response $B(\omega)$, it is basic fact that the function $E_B(\omega)$ given by $$E_B(\omega) = jB(\omega)\text{sgn}(\omega)$$

is even and has the property that:

$$b(t)*x(t) = HT(e_B(t)*x(t)),$$

where HT is the Hilbert transform operator, where b(t) is the impulse response corresponding to $B(\omega)$, and x(t) is an arbitrary input function, where $\text{sgn}(\omega)$ is 1 if ω is greater than zero and −1 if ω is less than zero.

If we apply this fact to the odd functions $B(\omega)$ and $D(\omega)$ from the discussion above, we arrive at the corresponding even functions:

$$E_B(\omega) = \frac{\{g^2(-w) - g^2(\omega)\}\text{sgn}(\omega)}{g^2(\omega) + g^2(-\omega) + 2g(\omega)g(-\omega)\cos\{\varphi(\omega) + \varphi(-\omega)\}}$$

$$E_D(\omega) = \frac{2\text{sgn}(\omega)\{g(\omega)\sin(\varphi(\omega)) - g(-\omega)\sin(\varphi(-\omega))\}}{g^2(\omega) + g^2(-\omega) + 2g(\omega)g(-\omega)\cos\{\varphi(\omega) + \varphi(-\omega)\}}.$$

Note Regarding Special Case of Even $g(\omega)$ and Odd $\varphi(\omega)$

In many circumstances, the gain imbalance function may be modeled as being even and the phase skew function may be modeled as being odd, i.e., $g(\omega)=g(-\omega)$ and $\varphi(\omega)=-\varphi(-\omega)$. Under these constraints, $U(\omega)=0$ and $V(\omega)$ is complex.

Note Regarding Special Case of Even $g(\omega)$ and Even $\varphi(\omega)$

The above-derived expressions for $U(\omega)$ and $V(\omega)$ are typically complex valued. However, when the gain imbalance and phase skew functions are even, i.e., $g(\omega)=g(-\omega)$ and $\varphi(\omega)=\varphi(-\omega)$, it follows that $U(\omega)$ and $V(\omega)$ become real valued:

$$U(\omega) = -\tan(\varphi(\omega))$$

$$V(\omega) = 1/\{g(\omega)\cos\varphi(\omega)\}.$$

Constant Matrix to Post-Correct Receiver Impairments at a Single Frequency

Figure 10:
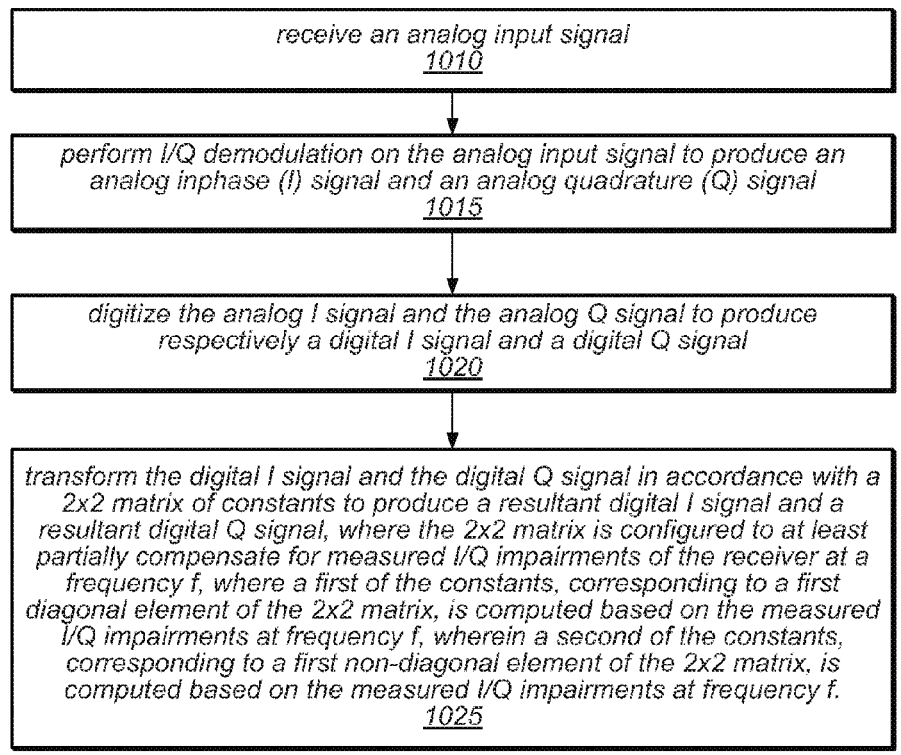
FIG. 10 illustrates one embodiment of a method for operating a receiver so as to achieve at least partial compensation for I/Q impairments at frequency f.

In one set of embodiments, a method 1000 for operating a receiver (or operating a system including a receiver) may involve the operations shown in FIG. 10.

At 1010, the receiver may receive an analog input signal. The analog input signal may be received from a transmission medium, e.g., as described above.

At 1015, the receiver may perform I/Q demodulation on the analog input signal to produce an analog inphase (I) signal and an analog quadrature (Q) signal, e.g., as described above.

At 1020, the receiver may digitize the analog I signal and the analog Q signal to produce respectively a digital I signal and a digital Q signal.

At 1025, the receiver may transform the digital I signal and the digital Q signal in accordance with a 2×2 matrix $c=(c_{ij})$ of constants to produce a resultant digital I signal and a resultant digital Q signal. The transformation may be performed by applying the following matrix multiplication:

$$\begin{bmatrix} I_R(n) \\ Q_R(n) \end{bmatrix} = \begin{bmatrix} c_{11} & c_{12} \\ c_{21} & c_{22} \end{bmatrix} \begin{bmatrix} I(n) \\ Q(n) \end{bmatrix},$$

where $I_R(n)$ and $Q_R(n)$ represent the resultant digital I signal and the resultant digital Q signal respectively. The 2×2 matrix c may be configured to post-compensate (or, at least partially post-compensate) for measured I/Q impairments of the receiver at a particular frequency f.

The matrix c may have the following properties. At least one of the diagonal elements $c_{11}$ and $c_{22}$ may be computed based on the measured I/Q impairments of the receiver at frequency f. For example, the coefficient $c_{22}$ may be computed as a function of the measured value g(f) and/or the measured value φ(f), where g is the gain imbalance function and φ is the phase skew function. Similarly, at least one of the non-diagonal elements $c_{12}$ and $c_{21}$ may be computed based on the measured I/Q impairments of the receiver at frequency f. For example, the coefficient $c_{21}$ may be computed as a function of the measured value g(f) and/or the measured value φ(f). In some embodiments, each of the four matrix elements is similarly computed (i.e., based on the measured impairments at f).

See the section "Performing Traditional Impairment Compensation at a Single Frequency" for one possible embodiment of the matrix c.

Let $c_{ij}(f)$ denote the functional expression that is used to determine the coefficient $c_{ij}$ from the I/Q impairments at frequency f. Due to the continuity of the functional expressions $c_{ij}(f)$ with respect frequency f, the matrix c(f) is a good approximation for the matrix c(f+Δf) as long as Δf is sufficiently small. Thus, when the receiver uses the matrix c(f) to perform transform operation 1025, the receiver will achieve at least partial compensation over a neighborhood of frequencies around f. The quality of the compensation will typically degrade as Δf increases in absolute value.

In some embodiments, the analog input signal is a pure sinusoidal tone, e.g., a tone at frequency f or a tone at frequency $f+f_{LO}$, where $f_{LO}$ is the frequency of the receiver's local oscillator. In other embodiments, the analog input signal is a communication signal that carries a stream of binary information.

In some embodiments, the matrix c has the additional property that one of its diagonal elements is one. In some embodiments, the matrix c has the additional property that one of its non-diagonal elements is zero. In some embodiments, the matrix c has one of the following special forms:

$$c = \begin{bmatrix} 1 & 0 \\ c_{21} & c_{22} \end{bmatrix},$$

$$c = \begin{bmatrix} c_{11} & c_{12} \\ 0 & 1 \end{bmatrix}.$$

As described above, the transform operation 1025 is performed "in accordance with a 2×2 matrix". That qualifying phrase is not meant to require that the receiver include a multiplier (or adder) to implement a trivial multiplication by one (or a trivial addition by zero). For example, in the first special form given above, the resultant digital I signal is equal to the digital I signal: $I_R(n)=I(n)$. This requires no computation at all. One can simply pass the I(n) input to the $I_R(n)$ output.

Figure 11:
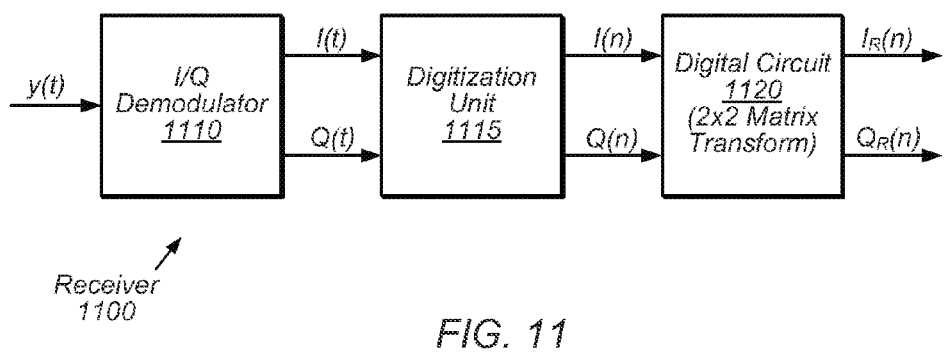
FIG. 11 illustrates one embodiment of a receiver that is configured to achieve at least partial compensation for I/Q impairments at frequency f.

In one set of embodiments, a receiver 1100 may be configured as shown in FIG. 11. (The receiver 1100 may incorporate any subset of the features described above in connection with method 1000.) The receiver 1100 may include an I/Q demodulator 1110, a digitization unit 1115 and a digital circuit 1120.

The I/Q demodulator 1110 may be configured to receive an analog input signal, and perform I/Q demodulation on the analog input signal to produce an analog inphase (I) signal and an analog quadrature (Q) signal. The analog input signal may be received from a transmission medium as described above.

The digitization unit 1115 may be configured to digitize the analog I signal and the analog Q signal to produce respectively a digital I signal and a digital Q signal.

The digital circuit 1120 may be configured to transform the digital I signal and the digital Q signal in accordance with a 2×2 matrix of constants to produce a resultant digital I signal and a resultant digital Q signal. The 2×2 matrix may be configured to at least partially compensate for I/Q impairments of the receiver at a particular frequency f. A first of the constants, corresponding to a first diagonal element of the 2×2 matrix, may be computed based on measured I/Q impairments of the receiver at frequency f. Furthermore, a second of the constants, corresponding to a first non-diagonal element of the 2×2 matrix, may be computed based on the measured I/Q impairments at frequency f. In some embodiments, each of the four constants is similarly computed (i.e., based on the measured impairments at f).

Figure 12:
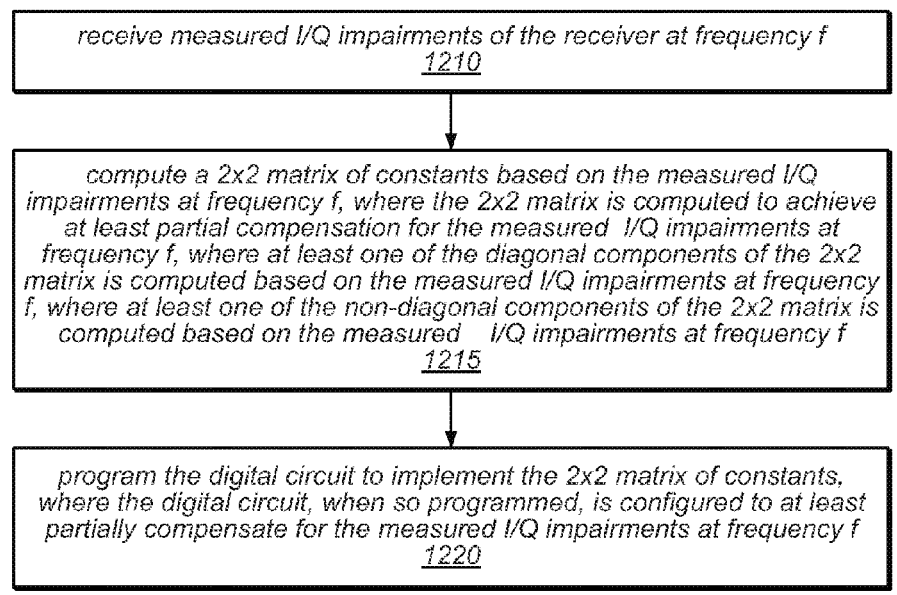
FIG. 12 illustrates one embodiment of a method for configuring a receiver to enable the receiver to achieve at least partial compensation for I/Q impairments at frequency f.

In one set of embodiments, a method 1200 for configuring a receiver may involve the operations shown in FIG. 12. The method 1200 may be used to configure the receiver to at least partially compensate for I/Q impairments of the receiver at a given frequency f. The method 1200 may be implemented by a computer system in response to the execution of program instructions. (The method 1200 may include any subset of the features described above in connection with FIGS. 10 and 11.)

At 1210, the computer system may receive measured I/Q impairments of the receiver at frequency f. The receiver may include an I/Q demodulator, an analog-to-digital conversion (ADC) unit and a digital circuit, e.g., as described above in connection with FIGS. 10 and 11. The I/Q demodulator may be configured to generate an analog I signal and an analog Q signal from an analog input signal. The ADC unit may be configured to sample the analog I signal and the analog Q signal to respectively obtain a digital I signal and a digital Q signal. The digital circuit may be configured to transform the digital I signal and the digital Q signal to obtain a resultant digital I signal and a resultant digital Q signal. (See the discussions above for various ways of realizing the digital circuit.)

At 1215, the computer system may compute a 2×2 matrix of constants based on the measured I/Q impairments at frequency f. The 2×2 matrix may be computed to achieve at least partial compensation for the measured I/Q impairments at frequency f. At least one of the diagonal components of the 2×2 matrix may be computed based on the measured I/Q impairments at frequency f. Furthermore, at least one of the non-diagonal components of the 2×2 matrix may be computed based on the measured I/Q impairments at frequency f.

At 1220, the computer system may program the digital circuit to implement the 2×2 matrix of constants, where the digital circuit, when so programmed, is configured to at least partially compensate for the measured I/Q impairments at frequency f. The action of programming the digital circuit involves transferring the 2×2 matrix (or information specifying the matrix) to the digital circuit or to a memory used by the digital circuit.

True Matrix Pre-Correction at a Single Frequency

Figure 13:
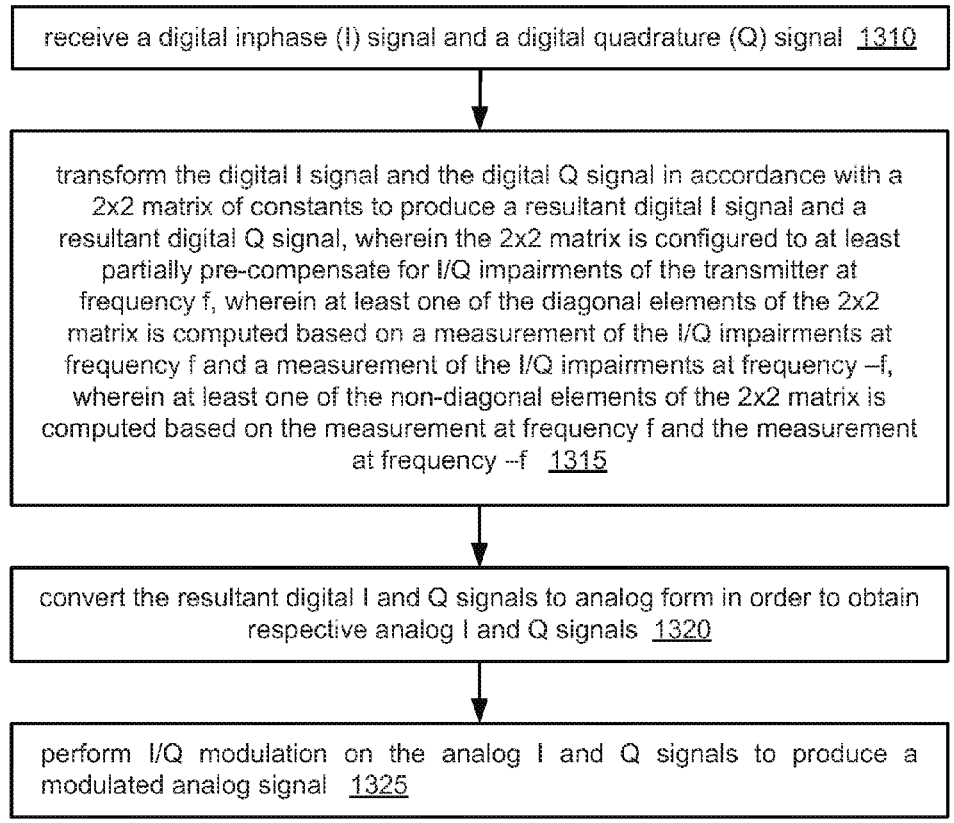
FIG. 13 illustrates one embodiment of a method for operating a transmitter so as to achieve at least partial compensation for I/Q impairments at frequency f.

In one set of embodiments, a method 1300 for compensating for the I/Q impairments of a transmitter at a particular frequency f may involve the operations shown in FIG. 13.

At 1310, a digital inphase (I) signal and a digital quadrature (Q) signal (e.g., as variously described above) may be received. In some embodiments, the digital I signal and the digital Q signal together may represent a complex exponential tone at the frequency f. In other embodiments, the digital I signal and the digital Q signal may carry respective streams of binary information. The digital I and Q signals may be the components of a complex baseband signal or of a complex intermediate-frequency signal.

At 1315, the digital I signal and the digital Q signal may be transformed in accordance with a 2×2 matrix $c=(c_{ij})$ of constants to produce a resultant digital I signal and a resultant digital Q signal. (The transformation may be performed by the transmitter or some other agent.) The transformation may be described by the following matrix multiplication:

$$\begin{bmatrix} I_R(n) \\ Q_R(n) \end{bmatrix} = \begin{bmatrix} c_{11} & c_{12} \\ c_{21} & c_{22} \end{bmatrix} \begin{bmatrix} I(n) \\ Q(n) \end{bmatrix},$$

where $I_R(n)$ and $Q_R(n)$ represent the resultant digital I signal and the resultant digital Q signal respectively. The 2×2 matrix may be configured to pre-compensate (or, at least partially pre-compensate) for the I/Q impairments of the transmitter at the frequency f. See the above discussion regarding the nature of "pre-compensation". In brief, the application of the transform introduces an inverse distortion that, in combination with the distortions of the following transmitter stages, makes the transmitter appear more ideal in its input-output behavior.) Note that the above discussion regarding the meaning of transforming "in accordance with a 2×2 matrix" applies here as well.

The 2×2 matrix c may have the following properties. At least one of the diagonal elements $c_{11}$ and $c_{22}$ may be computed based on a measurement of the I/Q impairments at frequency f and a measurement of the I/Q impairments at frequency −f. For example, the diagonal element $c_{22}$ may be computed based on a measured value of each of g(f), g(−f), φ(f) and φ(−f), where g is the gain imbalance function and φ is the phase skew function. For example, the diagonal element $c_{22}$ may be computed based on a measured value of each of g(f), g(−f), φ(f) and φ(−f), where g is the gain imbalance function and φ is the phase skew function. Furthermore, at least one of the non-diagonal elements $c_{12}$ and $c_{21}$ may be computed based on the measurement at frequency f and the measurement at frequency −f. In some embodiments, each of the four coefficients may be computed based on the measurement at frequency f and the measurement at frequency −f. See the section "Calculating True Single Point Vector Calibration Constants" for one possible embodiment of the matrix c.

The measured impairments may be impairments measured at the output of the corruption (i.e. the I/Q modulator) and may be different than the impairments if they could be measured at the input. Alternatively, the method may include transforming the output impairments at +f and −f to input impairments at only +f and then computing the matrix constants according to simplified formulas using the input impairments at only +f. The transformation may be derived follows. First, derive specialized expressions for U(f) and V(f) based on the output impairments at +f and −f using equations (7.9) and (7.10) with $g_{in}(f)=g_{in}(-f)=1$ and $\phi_{in}(f)=\phi_{in}(-f)=0$. Then compute the input impairments $g_{in}(f)$ and $\phi_{in}(f)$ based on equation (7.7) with $g_{out}(f)=1$ and $\phi_{out}(f)=0$:

$$g_{in}(f)\exp(j\phi_{in}(f))=\{1-jU(f)\}/V(f).$$

The matrix constants may then be determined based on $g_{in}(f)$ and $\phi_{in}(f)$, e.g., according to the relations $\alpha=g_{in}(f)\sin(\phi_{in}(f))$ and $\beta=g_{in}(f)\cos(\phi_{in}(f))$.

The quality of the compensation achieved by operation 1315 will be limited by the quality of the impairment measurements. The present patent disclosure describes methods for obtaining quality measurements of the transmitter's I/Q impairments at any given frequency, or, over a whole range of frequencies.

Let $c_{ij}(f)$ denote the functional expression that is used to determine the coefficient $c_{ij}$ from the I/Q impairments at frequency f and the I/Q impairments at frequency −f. Due to the continuity of the functional expressions $c_{ij}(f)$ with respect frequency f, the matrix c(f) is a good approximation for the matrix c(f+Δf) as long as Δf is sufficiently small. Thus, when the transmitter uses the matrix c(f) to perform transform operation 1315, the transmitter will achieve at least partial compensation over a neighborhood of frequencies around f. The quality of the compensation will typically degrade as Δf increases in absolute value.

At 1320, the transmitter may convert the resultant digital I and Q signals to analog form in order to obtain respective analog I and Q signals.

At 1325, the transmitter may perform I/Q modulation on the analog I and Q signals to produce a modulated analog signal, e.g., as described above.

In some embodiments, the matrix c has one of the following special forms:

$$c = \begin{bmatrix} 1 & 0 \\ c_{21} & c_{22} \end{bmatrix},$$

$$c = \begin{bmatrix} c_{11} & c_{12} \\ 0 & 1 \end{bmatrix}.$$

In the first special form above, the constants $c_{21}$ and $c_{22}$ may be computed based on the values A(f), $E_B(f)$, C(f) and $E_D(f)$ as described in the section "Calculating True Single Point Vector Calibration Constants", especially at equations (1.81) and (1.82).

In some embodiments, the transformation 1315 may be performed on a programmable hardware element such as an FPGA, or in dedicated digital circuitry such as an application specific integrated circuit (ASIC). The programmable hardware element or dedicated digital circuitry may be supplied with the same sample clock that drives the ADC conversion.

In some embodiments, the transformation 1315 may be performed by a processor in response to the execution of program instructions. The processor may be incorporated as part of the transmitter, or as part of another system such as a host computer or controller board.

Figure 14:
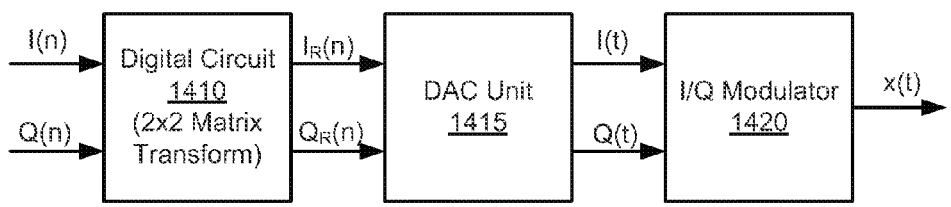
FIG. 14 illustrates one embodiment of a transmitter that is configured to achieve at least partial compensation for I/Q impairments at frequency f.

In one set of embodiments, a transmitter 1400 may be configured as shown FIG. 14. (Transmitter 1400 may include any subset of the features described above in connection with method 1300.) Transmitter 1400 may include a digital circuit 1410, a DAC unit 1415 and an I/Q modulator 1420.

The digital circuit 1410 may be configured to receive a digital inphase (I) signal and a digital quadrature (Q) signal, and transform the digital I signal and the digital Q signal in accordance with a 2×2 matrix of constants to produce a resultant digital I signal and a resultant digital Q signal. The digital circuit 1410 may be realized in any of various forms, e.g., as variously described above in connection with method 1300.

The DAC unit 1415 may be configured to convert the resultant digital I signal and the resultant digital Q signal to analog form in order to respectively obtain an analog I signal and an analog Q signal.

The I/Q modulator 1420 may be configured to perform I/Q modulation on the analog I and Q signals to produce a modulated analog signal. The 2×2 matrix is configured to at least partially pre-compensate for I/Q impairments of the transmitter at frequency f. A first of the constants, corresponding a first diagonal element of the 2×2 matrix, may be computed based on a measurement of the I/Q impairments at frequency f and a measurement of the I/Q impairments at frequency −f. A second of the constants, corresponding to a first non-diagonal element of the 2×2 matrix, may be computed based on the measurement at frequency f and the measurement at frequency −f.

The Meaning of "Impairments at Frequency f"

Figure 15:
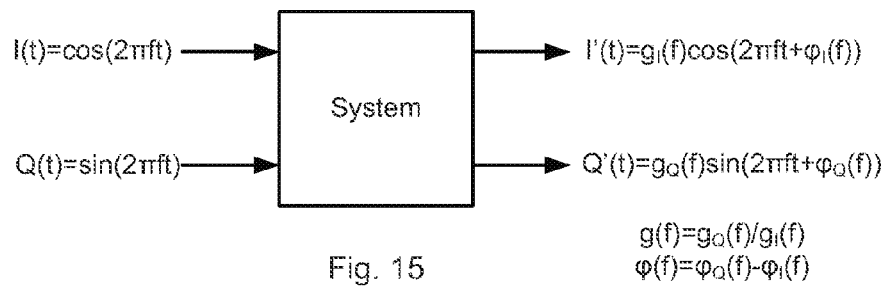
FIG. 15 illustrates a system being stimulated by a complex exponential tone and a distorted complex exponential tone appearing at the system output, where the distortions is characterized by a gain imbalance and phase skew.

The present disclosure repeatedly uses the term "the I/Q impairments at frequency f". Whether that term is applied to the transmitter, the receiver, or the series combination comprising the transmitter, the transmission path and the receiver, it includes within its scope of meaning the I/Q impairments that result from stimulating the system in question with a complex exponential tone $\exp(j2\pi ft)=\cos(2\pi ft)+j\sin(2\pi ft)$ at frequency f, as shown in FIG. 15. The real and imaginary outputs of the system may be represented as:

$$I'(t)=g_I(f)\cos(2\pi ft+\phi_I(f))$$

$$Q'(t)=g_Q(f)\sin(2\pi ft+\phi_Q(f)).$$

The I/Q impairments at frequency f may include the gain imbalance g(f) and the phase skew φ(f) given by:

$$g(f)=g_Q(f)/g_I(f)$$

$$\phi(f)=\phi_Q(f)-\phi_I(f).$$

Here we adopt the convention of using the I channel as the reference for both the gain imbalance and the phase skew. However, the inventive principles described herein apply equally to any other referencing convention. For example, one might just as well use the opposite convention (i.e., the choice of the Q channel as reference for both the gain imbalance and the phase skew), or a convention where the gain imbalance is referenced to one channel and the phase skew to the other.

Figure 16:
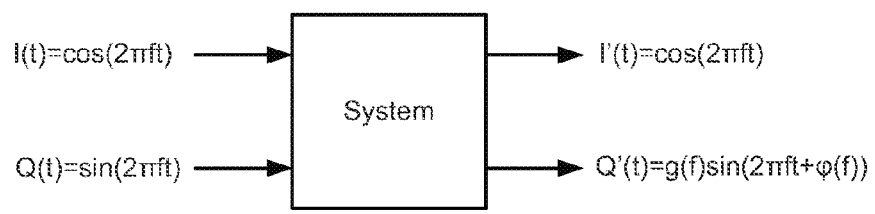
FIG. 16 illustrates a system where the gain imbalance and phase skew appear entirely on the Q channel.

Because we are interested in compensating for imbalances of gain and differences in phase between the two channels, we can model the gain imbalance and the phase skew as appearing all on the I channel or all on the Q channel. For example, FIG. 16 illustrates the latter choice. Thus, the Q channel output has the form:

$$Q'(t)=g(f)\sin(2\pi ft+\phi(f)).$$

The Physical Consequence of I/Q Impairments

The consequence of I/Q impairments at frequency f is the appearance of unwanted signal energy at the frequency −f. To see this, we analyze the complex output signal as follows:

$$\begin{aligned} I'(t) + jQ'(t) &= \cos(\omega t) + jg(\omega)\sin(\omega t + \varphi(\omega)) \\ &= (1/2)\{\exp(j\omega t) + \exp(-j\omega t)\} + \\ &\quad (1/2)g(\omega)\{\exp(j\omega t + \varphi(\omega)) - \exp(-j\omega t - \varphi(\omega))\} \\ &= (1/2)\{1 + g(\omega)\exp[\varphi(\omega)]\}\exp(j\omega t) + \\ &\quad (1/2)\{1 - g(\omega)\exp[-\varphi(\omega)]\}\exp(-j\omega t) \\ &= A_{TONE}(\omega)\exp(j\omega t) + A_{IMAGE}(\omega)\exp(-j\omega t). \end{aligned}$$

(We have switched from f to $\omega=2\pi f$ merely for the sake of notational brevity.) Thus, in response to the stimulus signal $\exp(j\omega t)$, the system produces a complex exponential tone at frequency $\omega$ with complex amplitude $A_{TONE}(\omega)$ and a complex exponential tone at frequency $-\omega$ with complex amplitude $A_{IMAGE}(\omega)$.

$$A_{TONE}=(\tfrac{1}{2})\{1+g(\omega)\exp[\phi(\omega)]\}$$

$$A_{IMAGE}=(\tfrac{1}{2})\{1-g(\omega)\exp[-\phi(\omega)]\}.$$

The complex exponential tone at frequency $\omega$ is often referred to simply as "the tone", while the complex exponential tone at frequency $-\omega$ is often referred to as "the image". As expected, $A_{TONE}(\omega)\to 1$ and $A_{IMAGE}\to 0$ as $g(\omega)\to 1$ and $\phi(\omega)\to 0$. It is desirable to have $g(\omega)$ as close to one as possible and $\phi(\omega)$ as close to zero as possible. (Linear scale is being assumed here for the gain imbalance. Gain imbalance may also be expressed in a logarithmic scale, e.g., in units of dB, in which case 0 dB represents the case of no gain imbalance.)

From the above discussion, one can readily see that the series combination of two systems, the first having gain imbalance $g_1(\omega)$ and phase skew $\phi_1(\omega)$, and the second having gain imbalance $g_2(\omega)$ and phase skew $\phi_2(\omega)$, does not give a net gain imbalance of $g(\omega)=g_1(\omega)g_2(\omega)$ and a net phase skew of $\phi(\omega)=\phi_1(\omega)+\phi_2(\omega)$. (This is because the second system is not being stimulated by a pure complex exponential $\exp\{j\omega t\}$.) The true relations are more complicated.

Image Rejection

Image rejection is a measure of the relative magnitudes of complex amplitudes $A_{TONE}(\omega)$ and $A_{IMAGE}(\omega)$. For example, according to one conventional definition:

$$\text{Image\_Rejection}=20*\log(|A_{IMAGE}|/|A_{TONE}|).$$

Because $|A_{IMAGE}|$ is typically smaller than $|A_{TONE}|$, the image rejection is typically negative. The more negative the image rejection, the better.

Post-Compensation vs. Pre-Compensation

The notion of post-compensation involves coupling a compensation block to the output of a system that exhibits I/Q impairments. The compensation block is configured so that the series combination of the system followed by the compensation block behaves (or, approximates the behavior of) an ideal model having unity gain imbalance and zero phase skew. When the system is stimulated by a complex exponential tone at frequency $\omega$, it will generate a distorted complex signal that can be modeled as $$\cos(\omega t)+jg(\omega)\sin(\omega t+\phi(\omega)),$$

where $g(\omega)$ and $\phi(\omega)$ are the I/Q impairments of the system at frequency $\omega$. The compensation block operates on the distorted complex signal to generate a corrected output signal equal to the original complex exponential tone at frequency $\omega$. Thus, the compensation block is said to "compensate" or "post-compensate" for the I/Q impairments of the system at frequency $\omega$. Wideband post-compensation of I/Q impairments means post-compensating for I/Q impairments at each frequency $\omega$ in a frequency range or frequency band.

The notion of pre-compensation involves placing a compensation block before the system, i.e., the output of the compensation block couples to the input of the system. The compensation block is configured so that the series combination of the compensation block followed by the system behaves (or, approximates the behavior of) an ideal model having unity gain imbalance and zero phase skew. In response to a complex exponential tone at frequency $\omega$, the compensation block will produce a pre-distorted complex signal. The system receives the pre-distorted complex signal and further distorts that signal (by introducing I/Q impairments), thereby producing a complex output signal. The compensation block generates the pre-distorted complex signal so that the complex output signal from the system is equal to the original complex exponential tone at frequency $\omega$. Thus, the compensation block is said to "compensate" or "pre-compensate" for the I/Q impairments of the system at frequency $\omega$. Wideband pre-compensation of I/Q impairments means pre-compensating for I/Q impairments at each frequency $\omega$ in a frequency range or frequency band.

Performing Traditional Impairment Compensation at a Single Frequency

Figure 17:
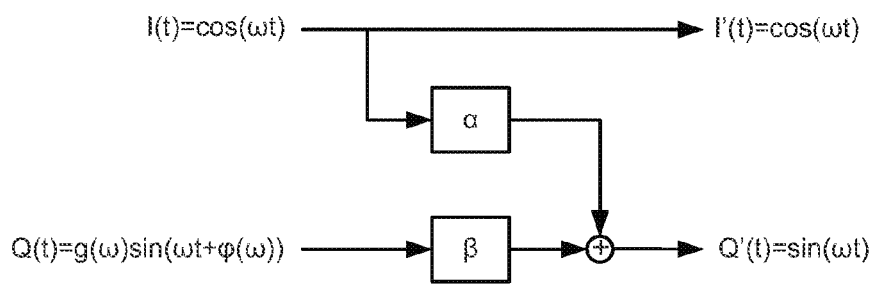
FIG. 17 illustrates one embodiment of a system for performing impairment compensation at a single frequency.

If one is interested in post-compensating for I/Q impairments at a particular frequency $\omega_0$, one might use the block diagram of FIG. 17 with real constants $\alpha$ and $\beta$. By appropriate choice of the constants, the disturbed complex input signal $$\cos(\omega_0 t)+jg(\omega_0)\sin(\omega_0 t+\phi(\omega_0))$$

will be mapped to the corrected output signal $\cos(\omega_0 t)+j\sin(\omega_0 t)$, as desired. The appropriate values are:

$$\alpha=-\tan(\phi(\omega_0))$$

$$\beta=1/\{g(\omega_0)\cos(\phi(\omega_0))\}.$$

This method of compensation is referred to herein as "traditional single-point compensation".

Due to the continuity of the gain imbalance g and phase skew $\phi$ with respect to frequency $\omega$, the real constants $\alpha$ and $\beta$ will achieve partial compensation for I/Q impairments at frequencies in a neighborhood of $\omega_0$, with the quality of compensation degrading with increasing distance from $\omega_0$. However, because $g(\omega_0)$ is typically different from $g(-\omega_0)$, and $\phi(\omega_0)$ is typically different from $\phi(-\omega_0)$, the appropriate pair of values $(\alpha,\beta)$ for compensating I/Q impairments at frequency $\omega_0$ is typically different from the appropriate pair of values for compensating I/Q impairments at frequency $-\omega_0$. Thus, unfortunately, one typically cannot find a single pair of values that will work for both $\omega_0$ and $-\omega_0$.

While the above-derived values of $\alpha$ and $\beta$ work perfectly for post-compensation of I/Q impairments at the single frequency $\omega_0$, they may also be used for pre-compensation of I/Q impairments at the single frequency $\omega_0$ with generally less than perfect results. (Various ones of the methods described herein may employ such pre-compensation, even though it gives less than perfect results, in part because it does not require knowledge of the I/Q impairments at frequency $-\omega_0$.) To achieve perfect pre-compensation of I/Q impairments at a single frequency, see the section "Calculating True Single Point Vector Calibration Constants".

Wideband I/Q Impairment Equalization

Figure 18:
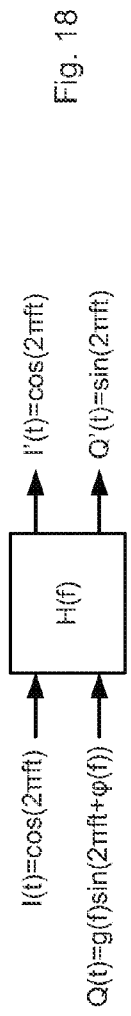
FIG. 18 illustrates a 2×2 system model for performing I/Q impairment compensation.

FIG. 18 depicts a basic model of a system H that will be used repeatedly throughout this patent disclosure, e.g., to represent the equalization filtering performed by the receiver and the equalization filtering performed by the transmitter. (Equalization is used here as a synonym for I/Q impairment compensation.)

Figure 19:
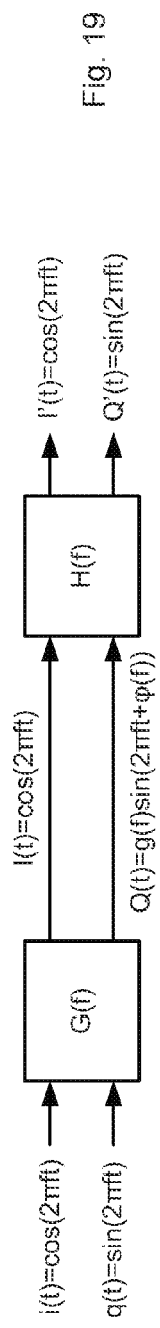
FIG. 19 illustrates an embodiment where an impairment model G precedes the compensation model H.

In the case where system H represents the receiver's equalization filtering, the complex input signal $I(t)+jQ(t)$ represents a distorted signal supplied by a preceding system G, as illustrated in FIG. 19. The system G generates the distorted signal $$I(t)+jQ(t)=\cos(2\pi ft)+jg(f)\sin(2\pi ft+\phi(f))$$

in response to being stimulated by the complex exponential signal $i(t)+jq(t)=\exp(j2\pi ft)$ at frequency f. The gain imbalance $g(f)$ and the phase skew $\phi(f)$ are the I/Q impairments of the system G at frequency f. System G may represent the baseband equivalent of the receiver's front end, i.e., the portions of the receiver from its RF input to the output of the I/Q digitization unit. Alternatively, in the situation where the receiver is expected to compensate for the transmitter's I/Q impairments as well as for its own, system G may represent the path from the input of the transmitter's I/Q DAC unit to the output the receiver I/Q digitization unit.

The system H operates on the distorted input to produce a corrected output signal $I'(t)+jQ'(t)=\exp(j2\pi ft)$, for all f in a desired frequency band. Note, however, that the set B given by $$\{\exp(j2\pi ft) : f \text{ in given frequency range}\}$$

forms a basis for the space of functions $\{x(t)\}$ that are band limited to the given frequency range. Because the series combination of G followed by H is an identity map on each function of the basis set B, by linearity it will be an identity map on all band-limited functions $x(t)$.

The equalization system H may be realized by the receiver's digital circuit 220 as variously described above.

Figure 20A:
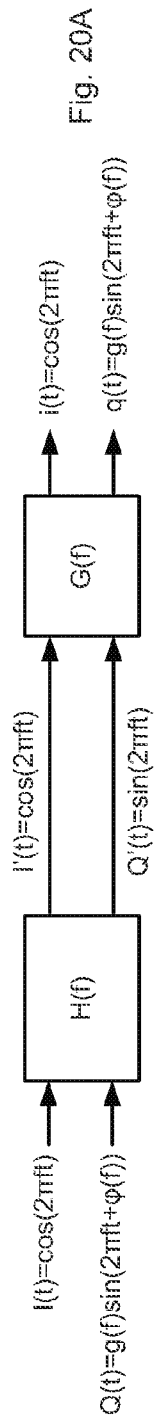
FIG. 20A illustrates an embodiment where the impairment model G follows the compensation model H.

In the case where system H represents the transmitter's equalization filtering, we interpret H as receiving a basis function $$I(t)+Q(t)=\cos(2\pi ft)+jg(f)\sin(2\pi ft+\phi(f)),$$

and, in response to that basis function, generating a pre-compensated complex signal $$I'(t)+jQ'(t)=\exp(j2\pi ft),$$

as shown in FIG. 20A. Note that the set X given by $$\{\cos(2\pi ft)+jg(f)\sin(2\pi ft+\phi(f)) : f \text{ in given frequency range}\}$$

also forms a basis for the space of functions $\{x(t)\}$ that are band limited to the given frequency range.

Figure 20B:
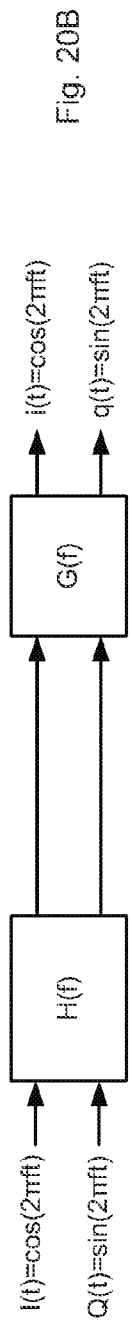
FIG. 20B illustrates the response of the same seris combination (of model H followed by model G) to a complex exponential tone at frequency f.

The pre-compensated signal that gets distorted by the following system G. The system G generates distorted signal $$i(t)+jq(t)=\cos(2\pi ft)+jg(f)\sin(2\pi ft+\phi(f)),$$

where $g(f)$ and $\phi(f)$ represent the gain imbalance and phase skew of the system G at frequency f. Because the series combination of H followed by G is an identity map on each function of the basis set X, it will be an identity map on all band-limited functions $x(t)$. Thus, when stimulated by a complex exponential tone $\exp(j2\pi ft)$ at any frequency f in the frequency band, the series combination will produce that same complex exponential tone at its final output, as shown in FIG. 20B.

The system G may represent the baseband equivalent of the transmitter's RF front end, i.e., the portions of the transmitter from the input of the transmitter's DAC unit to the RF output. Alternatively, in situations where the transmitter is expected to compensate for the receiver's I/Q impairments as well as for its own, the system G may represent the path from the input of the transmitter's DAC unit to the output of the receiver's digitization unit. The system H may be realized by the digital circuit 510 as variously described above.

Complex exponentials are used throughout the present analysis since any band-limited signal can be represented as the superposition of an ensemble of complex exponentials via Fourier analysis. I/Q impairments may include an imbalance of the gain when comparing the in-phase (I) channel with the quadrature-phase (Q) channel, and a skew in the phase that occurs due to imperfect quadrature mixing. (The phase skew perturbs the ideal 90-degree phase relationship between the I and Q channels). While phase skew is typically modeled as an imperfection in the quadrature mixing, it can also be modeled as the phase skew between the I(t) and Q(t) signals. In both cases discussed above, the input to the distortion model G is a complex exponential signal. Since I/Q impairments are relative, we may assume that the I/Q impairments appear entirely at the Q(t) output while the I(t) output is ideal. While other assumptions could be made, this assumption will simplify the following mathematical derivations.

Figure 21:
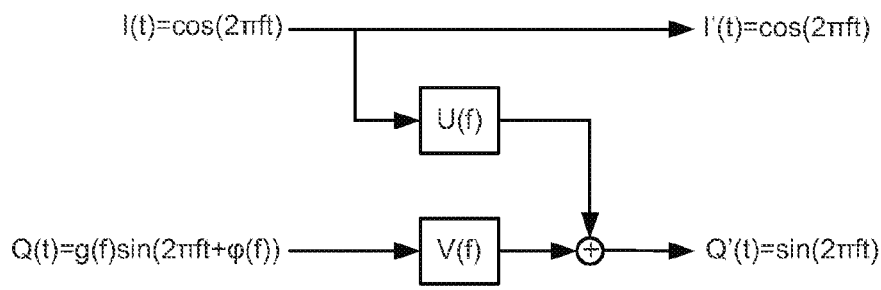
FIG. 21 illustrates one embodiment for the compensation model H in terms of a pair of digital filters having frequency responses U(f) and V(f) respectively.

The equalization system H may be modeled by a 2×2 frequency response matrix $H(f)=(H_{ij}(f))$, or equivalently, by a 2×2 matrix $h(t)=(h_{ij}(t))$ of real-valued impulse responses. However, under the above-identified assumption on how the impairments are expressed at the output of the distortion model G, the matrix H may be simplified to the structure shown in FIG. 21, i.e., $H_{11}(f)=1$ and $H_{12}(f)=0$. For notational efficiency, we define $U(f)=H_{21}(f)$ and $V(f)=H_{22}(f)$. Thus, $$I'(t)=I(t)$$

$$Q'(t)=u(t)*I(t)+v(t)*Q(t),$$

where $u(t)$ and $v(t)$ are the impulse responses corresponding to $U(f)$ and $V(f)$ respectively.

Any real-valued filter must necessarily have a symmetric magnitude response and an anti-symmetric phase response. In other words, $x(t)$ being real implies $$I'(t)=I(t)$$

$$Q'(t)=u(t)*I(t)+v(t)*Q(t),$$

for all f, where $X(f)$ is the Fourier transform of $x(t)$. As a result, the frequency response $V(f)$ cannot apply independent impairment corrections at frequencies f and −f. In the typical situation $g(f)$ and $g(-f)$ are different, and $\phi(f)$ and $\phi(-f)$ are different. Thus, the filter V acting by itself (i.e., with U identically equal to zero) is not sufficient to provide correction at f and −f. If the goal was to only correct for the wideband I/Q impairments over positive frequencies only or over negative frequencies only, the filter V would suffice. (Note: V acting by itself can correct for +f and −f impairments as long as the impairments are constrained to $g(f)=g(-f)$ and $\phi(f)=-\phi(-f)$, as demonstrated in the "Adding Constraints" section.) However, since it is desirable to correct for both sides of the spectrum, the second filter $U(f)$ is introduced. Applying another filter from in-phase component and summing it into the quadrature-phase channel provides the needed degrees of freedom to control both sides of the complex spectrum. This is due to the fact that the in-phase component I(t)=cos(2πft) is that same for frequencies f and −f, while the quadrature-phase component changes its phase by 180 degrees when changing from f to −f.

Figure 22:
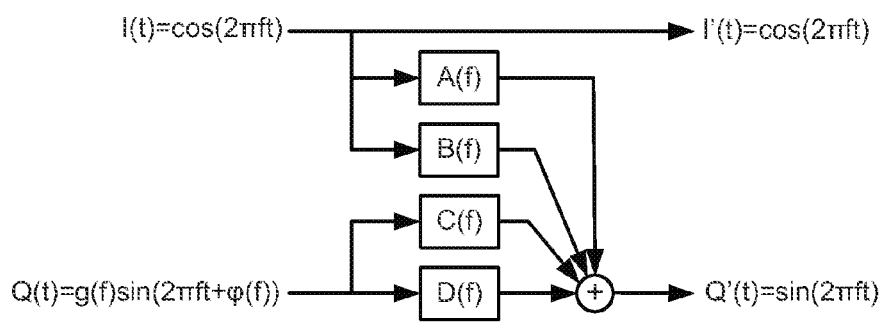
FIG. 22 illustrates a refinement of FIG. 21, where U and V are represented in terms of their even and odd parts.

In order to solve for U(f) and V(f), their respective output signals need to be known. In order to simplify the mathematical derivation, both U(f) and V(f) are broken into their even and odd parts as shown in FIG. 22. Thus, A(f) and B(f) are the even and odd parts of U(f), while C(f) and D(f) are the even and odd parts of V(f).

Since any real-valued filter must necessarily have a symmetric magnitude response, we can reduce complexity by solving only for the positive-frequency portion of each spectrum A, B, C and D. However, to achieve impairment compensation for negative frequencies as well as positive frequencies, one cannot simply ignore the inputs I(t)+jQ(t) corresponding to negative frequencies. Rather, we account for such inputs by expressing them as equivalent positive-frequency inputs, relying on the odd symmetry of the sine function and the even symmetry of the cosine function:

$$I(t) + jQ(t) = \cos(-2\pi ft) + g(-f)\sin(-2\pi ft + \varphi(-f)) =$$
$$\cos(2\pi ft) - g(-f)\sin(2\pi ft - \varphi(-f)).$$

Thus, we shall develop two equations for the positive-frequency portions of A, B, C and D, the first based on the input $$I_1(t)+jQ_1(t)=\cos(2\pi ft)+g(f)\sin(2\pi ft+\phi(f)),$$

and the second based on the input $$I_2(t)+jQ_2(t)=\cos(2\pi ft)-g(-f)\sin(2\pi ft-\phi(-f)),$$

with f>0 for both equations.

If a filter is constrained to have symmetric impulse response, then the filter will exhibit a symmetric magnitude response and a zero phase response. Such is the case for filters a(t) and c(t). If, however, a filter's impulse response is anti-symmetric, then it will exhibit a symmetric magnitude response but a phase response that equals $$-(\pi/2)sgn(f).$$

Figure 23:
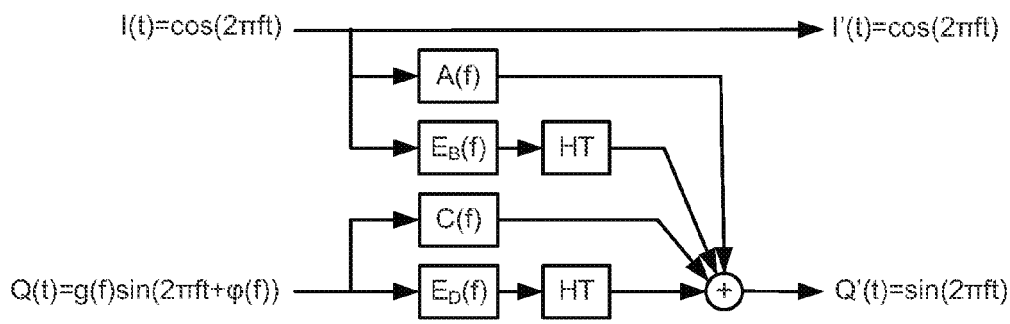
FIG. 23 illustrates an equivalent representation for the system of FIG. 22, where the odd spectra B and D are replaced by corresponding even spectra followed by Hilbert Transforms.

Thus, an anti-symmetric impulse response is equivalent to an even impulse response followed by a Hilbert transform. Such is the case for the filters b(t) and d(t). As a result, filter b(t) can be expressed as an even impulse response $e_B(t)$ followed by a Hilbert transform (HT), as shown in FIG. 23. Similarly, filter d(t) can be expressed as an even impulse response $e_D(t)$ followed by a Hilbert transform (HT). $E_B(f)$ and $E_D(f)$ are the frequency responses corresponding to $e_B(t)$ and $e_D(t)$, respectively. Now the exact outputs of the original filters A, B, C and D can easily be determined. FIG. 24A shows the outputs of the four filters A, B, C and D in response to signal $I_1(t)+jQ_1(t)$. FIG. 24B shows the outputs of the four filter in response to the signal $I_2(t)+jQ_2(t)$.

Each of FIGS. 24A and 24B can be directly translated into a corresponding linear equation in A(f), $E_B(f)$, C(f) and $E_D(f)$ for positive f (or non-negative f). We use the following notation:

$$g_1(f)=g(f) \text{ for } f>0$$

$$g_2(f)=g(-f) \text{ for } f>0$$

$$\phi_1(f)=\phi(f) \text{ for } f>0$$

$$\phi_2(f)=\phi(-f) \text{ for } f>0.$$

Figures 25, 26A, 26B:
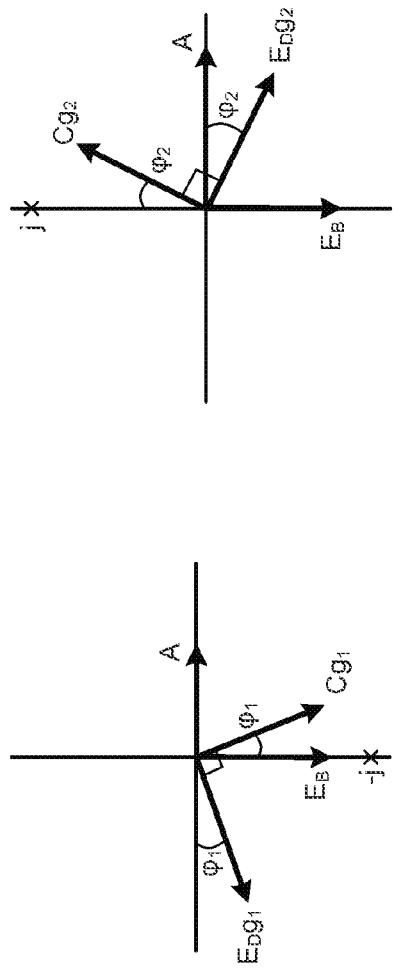
FIG. 25 presents equations that are derived from FIGS. 24A and 24B respectively.
FIGS. 26A and 26B illustrate phasor diagrams corresponding to the equations of FIG. 25.
Figure 28:
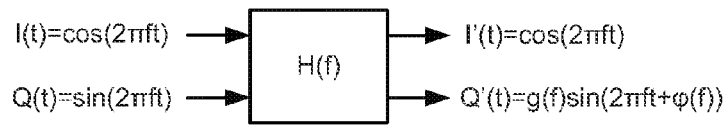
FIG. 28 illustrates a 2×2 model H that represents the I/Q impairments of a system.

FIGS. 24A and 24B give rise, respectively, to equations (1.1) and (1.2), which are shown in FIG. 25. FIGS. 26A and 26B present the corresponding phasor diagrams. (Recall that cos(2πft) maps to 1, and sin(2πft) maps to −j in the phasor diagram.)

The horizontal projections of the vectors in FIG. 26A give equation (1.3) below; the vertical projections give equation (1.4). Similarly, the horizontal projections of the vectors in FIG. 26B give equation (1.5), while the vertical projections give equation (1.6):

$$0=A(f)+C(f)g_1(f)\sin(\phi_1(f))-E_D(f)g_1(f)\cos(\phi_1(f)) \quad (1.3)$$

$$-1=-E_B(f)-C(f)g_1(f)\cos(\phi_1(f))-E_D(f)g_1(f)\sin(\phi_1(f)) \quad (1.4)$$

$$0=A(f)+C(f)g_2(f)\sin(\phi_2(f))+E_D(f)g_2(f)\cos(\phi_2(f)) \quad (1.5)$$

$$1=-E_B(f)+C(f)g_2(f)\cos(\phi_2(f))-E_D(f)g_2(f)\sin(\phi_2(f)) \quad (1.6)$$

This system of equations is a 4×4 linear system in unknown vector $(A, E_B, C, E_D)$:

$$\begin{bmatrix} 0 \\ -1 \\ 0 \\ 1 \end{bmatrix} = [P] \begin{bmatrix} A(f) \\ E_B(f) \\ C(f) \\ E_D(f) \end{bmatrix}, \quad (1.7)$$

where $$P = \begin{bmatrix} 1 & 0 & w & -x \\ 0 & -1 & -x & -w \\ 1 & 0 & y & z \\ 0 & -1 & z & -y \end{bmatrix} \quad (1.8)$$

and $$w=g_1(f)\sin(\phi_1(f)) \quad (1.9)$$

$$x=g_1(f)\cos(\phi_1(f)) \quad (1.10)$$

$$y=g_2(f)\sin(\phi_2(f)) \quad (1.11)$$

$$z=g_2(f)\cos(\phi_2(f)). \quad (1.12)$$

The determinate of matrix P is given by:

$$Det(P)=w^2+x^2+y^2+z^2-2wy+2xz. \quad (1.13)$$

$$Det(P)=g_1^2(f)+g_2^2(f)+2g_1(f)g_2(f)\cos(\phi_1(f)+\phi_2(f)) \quad (1.14)$$

As long as $$g_1^2(f)+g_2^2(f)+2g_1(f)g_2(f)\cos(\phi_1(f)+\phi_2(f))\neq 0, \quad (1.15)$$

there exists a unique solution vector $(A(f), E_B(f), C(f), E_D(f))$. As an example, the equations cannot be solved when both the phase skew φ(f) and gain imbalance g(f) are completely odd. However, it does not make sense for the gain imbalance g(f) to be completely odd since the gain imbalance is typically close to one for all f, or at least bounded below by a positive constant.

Using Cramer's Rule, we find that $$A(f)=-2(wz+xy)/Det(P). \quad (1.16)$$

$$E_B(f)=(-w^2-x^2+y^2+z^2)/Det(P) \quad (1.17)$$

$$C(f)=2(x+z)/Det(P) \qquad (1.18)$$

$$E_D(f)=2(w-y)/Det(P). \qquad (1.19)$$

Substituting equation (1.9) through (1.14) into equations (1.16) through (1.19) yields equations (1.20) through (1.23), shown in FIG. 27.

Adding Constraints

In many cases, the gain imbalance and the phase skew approximate common constraints. This section simplifies equations (1.20) through (1.23) for some typical real world conditions. For the most perfect compensation, the equations (1.20-1.23) may be used. But if the compensation performance can be relaxed, then adding some constraints can decrease the computational requirements.

Case 1: Odd Phase Skew

In the case of odd phase skew, i.e., $\phi(f)=\phi_1(f)=-\phi_2(f)$ for f>0, equations (1.20) through (1.23) specialize to:

$$A(f)=0 \qquad (1.24)$$

$$E_B(f)=\{g_2(f)-g_1(f)\}/\{g_1(f)+g_2(f)\} \qquad (1.25)$$

$$C(f)=2\cos(\phi(f))/\{g_1(f)+g_2(f)\} \qquad (1.26)$$

$$E_D(f)=2\sin(\phi(f))/\{g_1(f)+g_2(f)\}. \qquad (1.27)$$

Case 2: Even Gain Imbalance

In the case of even gain imbalance, i.e., $g(f)=g_1(f)=g_2(f)$ for f>0, equations (1.20) through (1.23) specialize to:

$$A(f) = \frac{-\sin(\varphi_1(f) + \varphi_2(f))}{1 + \cos(\varphi_1(f) + \varphi_2(f))} \qquad (1.28)$$

$$E_B(f) = 0 \qquad (1.29)$$

$$C(f) = \frac{\cos(\varphi_1(f)) + \cos(\varphi_2(f))}{g(f)\{1 + \cos(\varphi_1(f) + \varphi_2(f))\}} \qquad (1.30)$$

$$E_D(f) = \frac{\sin(\varphi_1(f)) - \sin(\varphi_2(f))}{g(f)\{1 + \cos(\varphi_1(f) + \varphi_2(f))\}}. \qquad (1.31)$$

Case 3: Odd Phase Skew and Even Gain Imbalance

In the case of odd phase skew and even gain imbalance, equations (1.20) through (1.23) specialize to:

$$A(f)=0 \qquad (1.32)$$

$$E_B(f)=0 \qquad (1.33)$$

$$C(f)=\cos(\phi(f))/g(f) \qquad (1.34)$$

$$E_D(f)=\sin(\phi(f))/g(f). \qquad (1.35)$$

Case 4: Zero Phase Skew and Arbitrary Gain Imbalance

In the case of zero phase skew and arbitrary gain imbalance, equations (1.20) through (1.23) specialize to:

$$A(f)=0 \qquad (1.36)$$

$$E_B(f)=\{g_2(f)-g_1(f)\}/\{g_2(f)+g_1(f)\} \qquad (1.37)$$

$$C(f)=2/\{g_2(f)+g_1(f)\} \qquad (1.38)$$

$$E_D(f)=0. \qquad (1.39)$$

Case 5: Arbitrary Phase Skew and Unity Gain Imbalance

In the case of arbitrary phase skew and unity gain imbalance, equations (1.20) through (1.23) specialize to:

$$A(f) = \frac{-\sin(\varphi_1(f) + \varphi_2(f))}{1 + \cos(\varphi_1(f) + \varphi_2(f))} = -\tan\left(\frac{\varphi_1(f) + \varphi_2(f)}{2}\right) \qquad (1.40)$$

$$E_B(f) = 0 \qquad (1.41)$$

$$C(f) = \frac{\cos(\varphi_1(f)) + \cos(\varphi_2(f))}{1 + \cos(\varphi_1(f) + \varphi_2(f))} \qquad (1.42)$$

$$E_D(f) = \frac{\sin(\varphi_1(f)) - \sin(\varphi_2(f))}{1 + \cos(\varphi_1(f) + \varphi_2(f))}. \qquad (1.43)$$

Case 6: Constant Gain Imbalance and Phase Skew

In the case where the gain imbalance and phase skew functions are constant functions, i.e., $g(f)=g$ and $\phi(f)=\phi$ over all f, equations (1.20) through (1.23) specialize to:

$$A(f) = \frac{-\sin(2\varphi)}{1 + \cos(2\varphi)} = -\tan(\varphi) \qquad (1.44)$$

$$E_B(f) = 0 \qquad (1.45)$$

$$C(f) = \frac{2\cos(\varphi)}{g\{1 + \cos(2\varphi)\}} = \frac{1}{g\cos(\varphi)} \qquad (1.46)$$

$$E_D(f) = 0. \qquad (1.47)$$

Filter Design

In one embodiment, symmetric linear-phase FIR filters $\hat{a}(n)$ and $\hat{c}(n)$ are designed based respectively on the magnitude responses $|A(f)|$ and $|C(f)|$, while antisymmetric linear-phase FIR filters $\hat{b}(n)$ and $\hat{d}(n)$ are designed based respectively on the magnitude responses $|B(f)|$ and $|D(f)|$. Note that $|B(f)|=|E_B(f)|$ and $|D(f)|=|E_D(f)|$ for all f. The Remez algorithm may be used to design these filters. The equalization system of FIG. 22 may then be implemented using the filters $\hat{a}(n)$, $\hat{b}(n)$, $\hat{c}(n)$ and $\hat{d}(n)$. By creating four filters, each with either symmetric or anti-symmetric filter taps, and summing the filters as shown in FIG. 22, we can effectively match the two arbitrary frequency responses U(f) and V(f). (Note: Depending on the filter design tool, the summation might actually be a subtraction. The definition of Hilbert Transform used by many filter design tools to create anti-symmetric filters differ from the definition we have used by a negation. The filter design tools often use $+(\pi/2)\text{sgn}(f)$ for the phase.)

In another embodiment, symmetric linear-phase FIR filters $\hat{a}(n)$, $\hat{e}_B(n)$, $\hat{c}(n)$ and $\hat{e}_D(n)$ are designed based respectively on the magnitude responses $|A(f)|$, $|E_B(f)|$, $|C(f)|$ and $|E_D(f)|$. Again, the Remez algorithm may be used to design these filters. The equalization system of FIG. 23 may then be realized using the filters $\hat{a}(n)$, $\hat{e}_B(n)$, $\hat{c}(n)$ and $\hat{e}(n)$.

In yet another embodiment, filters $\hat{u}(n)$ and $\hat{v}(n)$ may be designed based on the frequency responses U(f) and V(f). An $L_p$-norm design method may be used to design these filters based on the magnitude and phase responses of U(f) and the magnitude and phase responses of V(f). The equalization system of FIG. 21 may then be implemented using the filters $\hat{u}(n)$ and $\hat{v}(n)$.

Corruption I/Q Impairments

As described above, FIG. 15 illustrates a system that introduces I/Q impairments, i.e., gain imbalance g(f) and phase skew $\phi(f)$, into a received complex exponential signal exp(j2πft). In general, a 2×2 frequency response matrix H characterizing the system may be derived from the impairment functions g(f) and $\phi(f)$. To simplify this derivation, we model the gain imbalance g(f) and phase skew $\phi(f)$ of the system as appearing entirely on the Q channel output, as shown in FIG.

Figure 29:
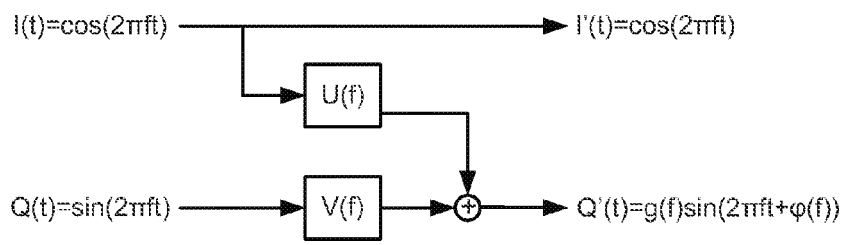
FIG. 29 illustrates one embodiment of the model H, in terms of frequency responses U and V.
Figure 30:
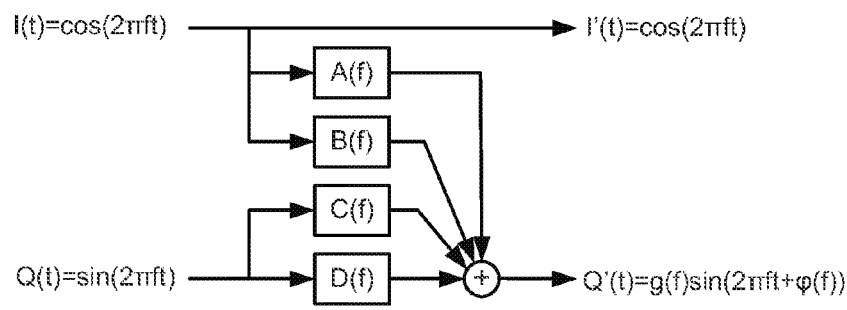
FIG. 30 illustrates a refinement of FIG. 29, where U and V are represented in terms of their even and odd parts.
Figure 31:
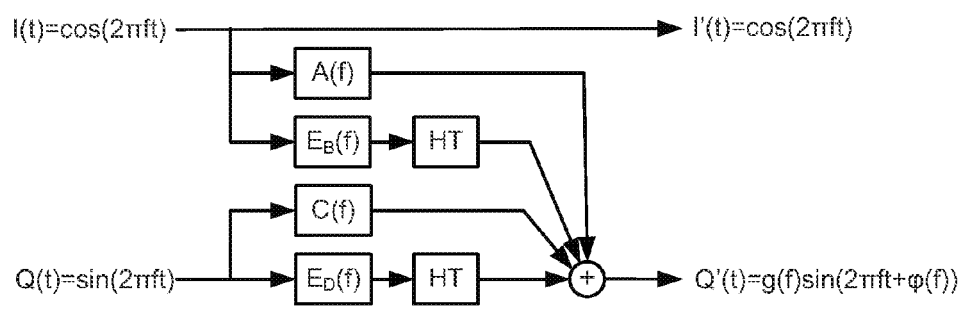
FIG. 31 illustrates an equivalent representation for the system of FIG. 30, where the odd spectra B and D are replaced by corresponding even spectra followed by Hilbert Transforms.

28. This model makes it convenient to use the special form of the matrix shown in FIG. 29, where U(f) and V(f) are frequency responses corresponding to real filters u(t) and v(t). Response U(f) may be represented as the sum of its even part A(f) and odd part B(f), as shown in FIG. 30. Similarly, V(f) may be represented as the sum of its even part C(f) and odd part D(f). The filter with odd spectrum B(f) may be represented by a subsystem with even spectrum $E_B(f)$ followed by a Hilbert Transform HT, as shown in FIG. 31. (See the above "Note Regarding Filters with Odd Frequency Response".) Similarly, the filter with odd spectrum D(f) may be represented by a subsystem with even spectrum $E_D(f)$ followed by a Hilbert Transform HT. Note that the magnitude responses of B and $E_B$ are identical, $|B(f)|=|E_B(f)|$, as are the magnitude responses of D(f) and $E_D(f)$.

Figure 32A:
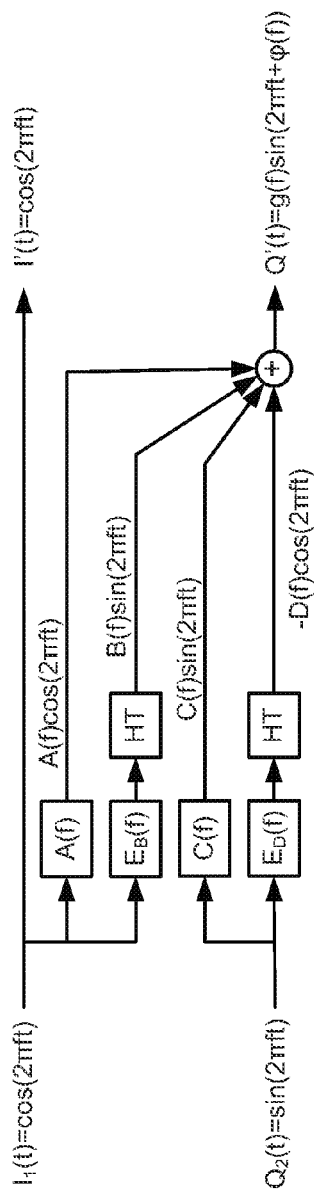
FIGS. 32A and 32B illustrate the responses of the system FIG. 31 to two respective inputs.
Figure 32B:
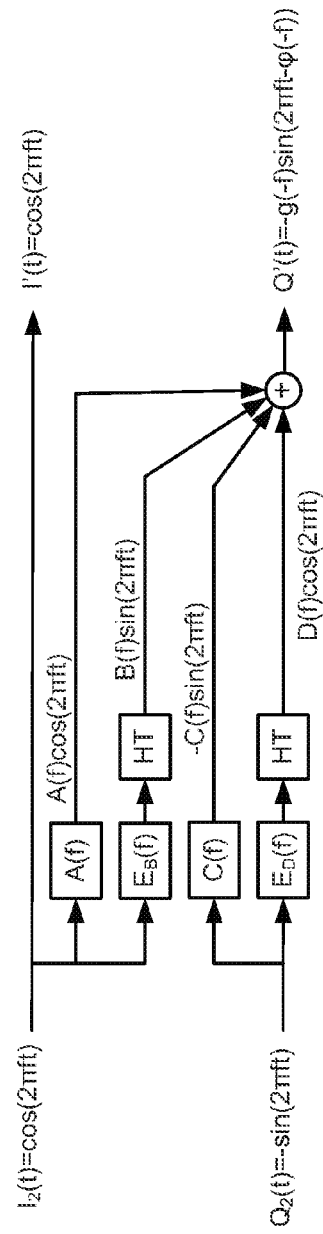

We will develop equations for the positive-frequency portions of A(f), $E_B(f)$, C(f) and $E_D(f)$ since the negative-frequency portions are determined by the respective positive frequency portions. One equation will come from stimulating the system with a positive frequency input $I_1(t)+jQ_1(t)=\exp(j2\pi ft)$ for f>0, as shown in FIG. 32A. Another equation will come from stimulating the system with a negative frequency input that is expressed in terms of an equivalent positive frequency input:

$$I_2(t) + jQ_2(t) = \exp(-j2\pi ft) = \cos(-2\pi ft) + j\sin(-2\pi ft) = \cos(2\pi ft) - j\sin(2\pi ft)$$

for f>0, as shown in FIG. 32B.

Figures 33, 34A, 34B:
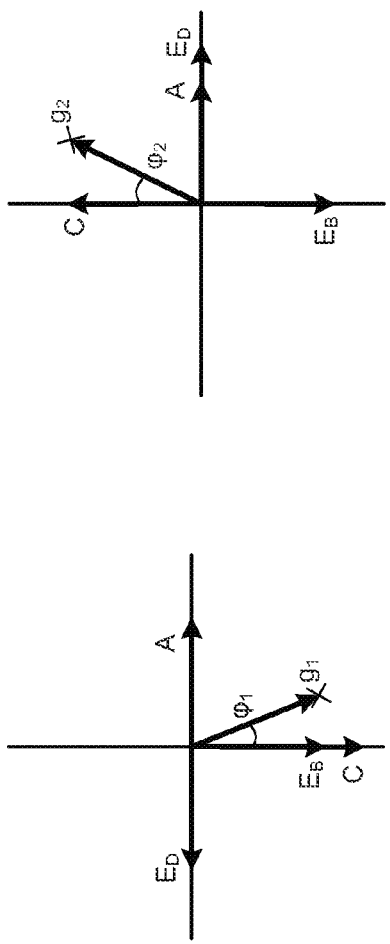
FIG. 33 presents equations that are derived from FIGS. 32A and 32B respectively.
FIGS. 34A and 34B illustrate phasor diagrams corresponding to the equations of FIG. 33.

FIG. 33 shows the two equations. Equation (1.48) is based on FIG. 32A. Equation (1.49) is based on FIG. 32B.

FIGS. 34A and 34B show the corresponding phasor diagrams, relying on the following notation:

$g_1(f)=g(f)$ for $f>0$ $g_2(f)=g(-f)$ for $f>0$ $\phi_1(f)=\phi(f)$ for $f>0$ $\phi_2(f)=\phi(-f)$ for $f>0$.

The phasor diagrams give the following equations:

$$g_1(f)\sin(\phi_1(f))=A(f)-E_D(f) \quad (1.50)$$

$$g_1(f)\cos(\phi_1(f))=E_B(f)+C(f) \quad (1.51)$$

$$g_2(f)\sin(\phi_2(0)=A(f)+E_D(f) \quad (1.52)$$

$$g_2(f)\cos(\phi_2(f))=C(f)-E_B(f) \quad (1.53)$$

These equations comprise a 4×4 matrix equation (1.54) in the unknowns A(f), $E_B(f)$, C(f) and $E_D(f)$, as shown in FIG. 35. By inverting the 4×4 coefficient matrix, we obtain the solution. See the matrix equation (1.55) in FIG. 36. It follows that:

$$A(f)=(\tfrac{1}{2})\{g_1(f)\sin(\phi_1(f))+g_2(f)\sin(\phi_2(f))\} \quad (1.56)$$

$$E_B(f)=(\tfrac{1}{2})\{g_1(f)\cos(\phi_1(f))-g_2(f)\cos(\phi_2(f))\} \quad (1.57)$$

$$C(f)=(\tfrac{1}{2})\{g_1(f)\cos(\phi_1(f))+g_2(f)\cos(\phi_2(f))\} \quad (1.58)$$

$$E_D(f)=(\tfrac{1}{2})\{-g_1(f)\sin(\phi_1(f))+g_2(f)\sin(\phi_2(f))\}. \quad (1.59)$$

Since A, $E_B$, C and $E_D$ are even functions of frequency f. Thus, their negative-frequency portions are specified by the even symmetry. Furthermore, the odd frequency responses B(f) and D(f) are given by:

$$B(f)=-jE_B(f)sgn(f) \text{ and}$$

$$D(f)=-jE_D(f)sgn(f).$$

Special Case: Even Gain Imbalance and Odd Phase Skew

In the case where the gain imbalance is an even function and the phase skew is an odd function, i.e., $g(f)=g(-f)$ and $\phi(f)=-\phi(-f)$, then equations (1.56) through (1.59) specialize to:

$A(f)=0$ $E_B(f)=0$ $C(f)=g(f)\cos(\phi(f))$ $E_D(f)=-g(f)\sin(\phi(f))$.

Special Case: Even Gain Imbalance and Even Phase Skew

In the case where the gain imbalance and phase skew are even functions, i.e., $g(f)=g(-f)$ and $\phi(f)=\phi(-f)$, then equations (1.56) through (1.59) specialize to:

$A(f)=g(f)\sin(\phi(f))$ $E_B(f)=0$ $C(f)=g(f)\cos(\phi(f))$ $E_D(f)=0$.

Special Case: Constant Gain Imbalance and Phase Skew

In the case where the gain imbalance and phase skew are constant functions, i.e., $g(f)=g$ and $\phi(f)=\phi$, then equations (1.56) through (1.59) specialize to:

$$A(f)=g\sin(\phi) \quad (1.60)$$

$$E_B(f)=0 \quad (1.61)$$

$$C(f)=g\cos(\phi) \quad (1.62)$$

$$E_D(f)=0. \quad (1.63)$$

Calculating the Mapping Between the RX and Tx

In some embodiments, a transmitter pre-distorts digital I/Q signals in order to compensate for its own I/Q impairments as variously described above. To accomplish this compensation, one must have an estimate of the transmitter's I/Q impairments. The quality of the compensation will be limited by the quality of the estimate (the extent to which it matches the truth). While a high-quality estimate is desirable, it is difficult to measure the transmitter's I/Q impairments directly. Rather, the measurements are obtained indirectly, e.g., using a receiver as shown in FIG. 37.

Figure 37:
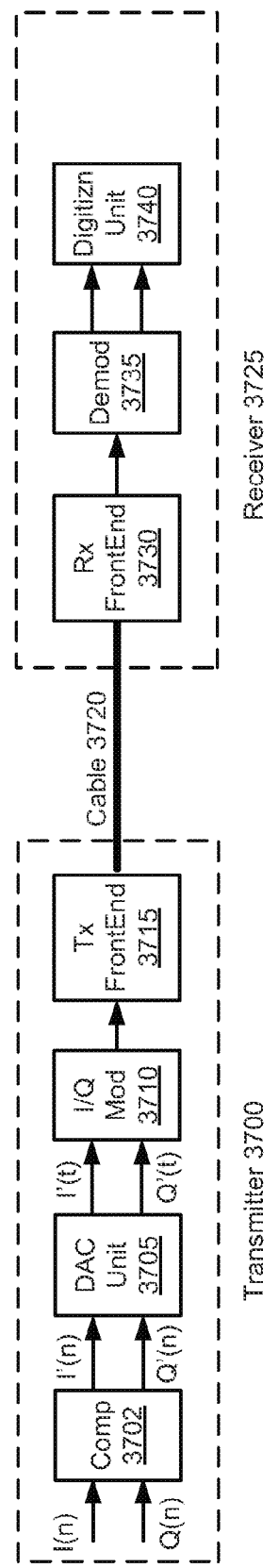
FIG. 37 illustrates one embodiment of a system for measuring properties of a signal path between the I/Q modulator 3710 and the I/Q demodulator 3735.

FIG. 37 shows a transmitter 3700 that couples to a receiver 3725 via a channel (e.g., a cable 3720 or a wireless channel). The transmitter may include a digital compensation unit 3702, a DAC unit 3705, an I/Q modulator 3710 and a front end 3715. The compensation unit 3702 may perform pre-compensation (pre-distortion) on the digital signal I(n)+jQ(n) to obtain a pre-compensated signal I'(n)+jQ'(n), e.g., as variously described above. DAC unit 3705 may convert the pre-compensated signal into an analog signal s(t)=I'(t)+jQ'(t). The analog signal s(t) may be upconverted to RF using the I/Q modulator 3710. The upconverted signal may be conditioned by the TX front end 3715 to obtain a transmit signal. The transmit signal may be delivered to the receiver by the cable 3720.

The receiver 3725 may include a front end 3730, an I/Q demodulator 3735 and a digitization unit 3740. The front end 3830 may receive the transmitted signal from the cable 3720 and operate on the received signal to produce a conditioned signal. The conditioned signal may be down-converted by the I/Q demodulator to produce a complex down-converted signal. The complex down-converted signal may be sampled by the digitization unit 3740 to obtain a sampled complex signal. The sampled complex signal may be used to make I/Q impairment measurements. In some embodiments, the receiver is a spectrum analyzer, e.g., a vector signal analyzer.

It is important to understand how measurements of I/Q impairments taken at the receiver 3725 relate to the transmitter's I/Q impairments. They are not the same. This is because the I/Q impairments at the transmitter, e.g., at the output of the I/Q modulator, are obscured (distorted) by the signal path including the TX front end 3715, the cable 3720 and the receiver front end 3730. The signal path may be characterized by a frequency response $H(f)=m(f)\exp(j\theta(f))$, where $H(f)$ is a complex number. The amplitude $m(f)$ is referred to herein as the "scaling" of the signal path at frequency f. The phase $\theta(f)$ is referred to herein as the "rotation" of the signal path at frequency f.

The problem of estimating the transmitter's I/Q impairments from receiver-based measurements is not trivial. Its solution is disclosed in this patent disclosure. (See the iterative methods disclosed below.) Part of the solution includes obtaining an initial estimate for the signal path response function $H(f)$. This section will focus on obtaining that initial estimate in the form of $H(0)$, i.e., the frequency response of the signal path at DC (zero frequency). The amplitude $m(0)$ of $H(0)$ is referred to as the "DC scaling" of the signal path. The phase $\theta(0)$ of $H(0)$ is referred to as the "DC rotation" of the signal path.

One way to estimate the transmitter's I/Q impairments involves performing an iterative procedure using a spectrum analyzer. (A spectrum analyzer is a device configured to measure the magnitude of an input signal versus frequency within the frequency range of the instrument.) The spectrum analyzer measures the I/Q impairments of its demodulated signal, and then compensation is applied at the transmitter based on that measurement. The measurement may only crudely approximate the transmitter's I/Q impairments, but it may be good enough to achieve at least partial compensation. The spectrum analyzer then makes a second measurement of the I/Q impairments of its demodulated signal. This second measurement may be used to make an adjustment to the compensation being applied at the transmitter, and so on. The sequence of measurements may converge, i.e., the measured gain imbalance may converge to one and the measured phase skew may converge to zero, indicating that appropriate compensation has been achieved at the transmitter. Because the spectrum analyzer does not capture phase information, multiple iterations may be required to achieve convergence.

In some embodiments, the transmitter's I/Q impairments may be determined using a measurement device (such as a vector signal analyzer) that can make phase measurements and can lock the phase of the measurements to the transmitter. In this case, the transmitter's I/Q impairments may be determined with two measurements or less at the measurement device.

The method described below makes two measurements, but requires that the transmitter's I/Q modulator and the receiver's I/Q demodulator be locked together in frequency (via phase locked loops with common reference). Unlike other methods, this method is resistant to synchronous spurs (i.e., spurs such as the LO leakage that are phase locked to the LO of the transmitter). While this technique can be used at any frequency, the main application is to determine the DC scaling $m(0)$ and the DC rotation $\theta(0)$ of the signal path in order to calibrate out the transmitter's LO leakage impairment.

Figure 38:
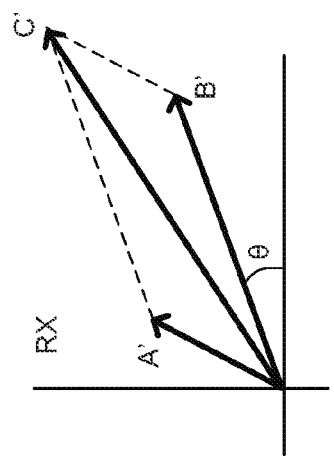
FIG. 38 illustrates a LO leakage vector A, an intentionally-injected DC vector B and their sum C.

In FIG. 38, vector $A=A_I+jA_Q$ represents the transmitter's LO leakage when the transmitter is stimulated with a constant zero signal: $I'(n)=Q'(n)=0$. (The term "vector" is used here as a synonym for "complex number".) The amplitude and phase of vector A represent the amplitude and phase of the LO leakage. As this LO leakage signal moves from the transmitter's I/Q modulator to the receiver's I/Q demodulator, it gets scaled by $m(0)$ and rotated by $\theta(0)$ so that vector A is transformed into vector A' at the receiver. See FIG. 39. The vector A' is measured, e.g., by averaging the sampled complex signal captured from the output of the I/Q demodulator.

Then we stimulate the transmitter with a known non-zero vector B:

$$I'(n)=B_I$$

$$Q'(n)=B_Q.$$

Figure 39:
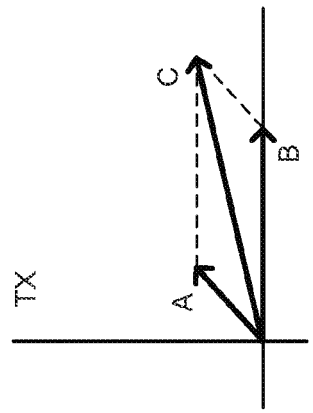
FIG. 39 illustrates the response vectors A', B' and C' corresponding respectively to vectors A, B and C.

(Vector B need not be real as shown in FIG. 38. However, it does need to be non-zero.) This intentionally-applied LO leakage B is superimposed on top of the transmitter's intrinsic LO leakage A so that the transmitter's total leakage is vector C. (The choice of B, primarily its magnitude, can affect the accuracy of the measurement. The optimum size will depend on the specific hardware. If it is too small, noise will influence the measurement more; if it is too big, the hardware could be put into a non-linear region of operation.) This total leakage signal experiences the same scaling $m(0)$ and rotation $\theta(0)$ as it traverses the signal path so that vector C is transformed to vector C' at the receiver. Referring to FIG. 39, observe that vector C' is the sum of vector A' and B'. Vector B' is the vector that would have resulted if vector B could have traversed the signal path by itself.

At the receiver, vector C' is measured, e.g., by averaging the sampled complex signal captured from the output of the I/Q demodulator during the stimulation by vector B. Since both A' and C' are known by measurement, vector B' can be calculated by subtraction. The DC scaling $m(0)$ and the DC rotation $\theta(0)$ may be calculated from the vector B' and the vector B:

$$\text{Map}=m(0)\exp(j\theta(0))=B'/B.$$

Similarly, the inverse map that will undo the effect of the signal path can be determined from the inverse expression:

$$\text{InverseMap}=\exp(-j(\theta(0))/m(0)=B/B'.$$

Then the LO leakage vector A may be computed by multiplying vector A' by the inverse map. In practice, it may be advisable to keep the magnitude of B to within an order of magnitude of A. It is also a good practice to not transmit vector B by itself, but to transmit the sum of the vector B and another signal K, where the signal K has larger energy than the vector B signal and frequency content bounded away from DC since the transmitter's LO leakage can potentially change with power in the instantaneous bandwidth. For example, the signal K may be a tone.

In some embodiments, the sampled complex signals are windowed. If a window is not applied, there are restrictions on the frequency of the tone K. In addition to tone K, if there are other signal tones present, they could also potentially leak into the measurement. Thus, if not using a window, the tones (intentional or not) are preferably restricted to certain frequencies to avoid leakage.

Method for Determining the Transmitter's LO Leakage
1. Stimulate the transmitter with a constant zero signal.
2. Measure the vector A' produced at the receiver.
3. Stimulate the transmitter with non-zero complex constant B.
4. Measure vector C' at the receiver.
5. Calculate the transmitter's LO leakage vector A from the following equations:

$$B' = C' - A' \quad (1.64)$$

$$\text{InvMap} = B/B' \quad (1.65)$$

$$A = A'^{*}\text{InvMap}. \quad (1.66)$$

Once the transmitter's LO leakage vector A has been computed, the transmitter may remove (or substantially compensate for) the LO leakage by applying the translation vector −A to transmitted signals $$I'(n) = I(n) - A_I$$

$$Q'(n) = Q(n) - A_Q.$$

The compensation unit 3702 may apply this translation in addition to the I/Q impairment pre-compensation described above. For example, the complex signal (I(n),Q(n)) may be subjected to the 2×2 matrix of digital filters to pre-compensate for I/Q impairments, and then translated to pre-compensate for the LO leakage.

In some embodiments, the calculation of the DC mapping may include the following extra calculation. As described herein, the iterative method may diverge if the estimation error of the phase rotation is too large. In the case that the phase skew is large, this extra step may be used to get a more accurate estimate and enable the iterative method to converge: (1) Calculate the mapping from RX to TX as is already described. (2) Make a measurement of the phase skew. (3) Calculate using the method "Altering the gain imbalance and phase skew through a linear system" using the mapping from #1. (4) Add the rotation measurement of #1 to the computed phase skew of #3 to attain a more accurate rotation estimate.

Method for Computing a DC Mapping and DC Rotation for Signal Path

Figure 40:
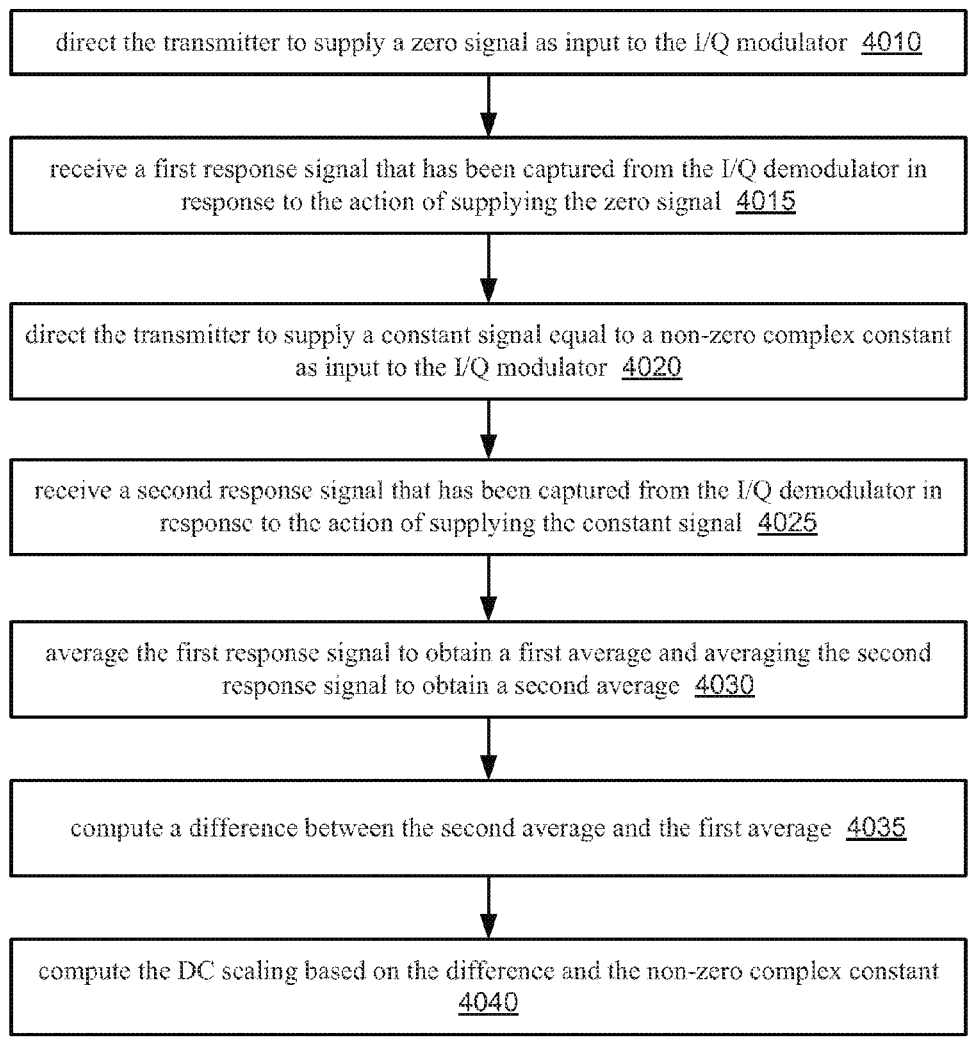
FIG. 40 illustrates one embodiment of a method for computing a DC mapping value for the signal path.

In one set of embodiments, a method 4000 may involve the actions shown in FIG. 40. The method 4000 may be used to estimate a DC scaling m(0) of a signal path between an I/Q modulator of a transmitter and a demodulator of a receiver. (The method 4000 may incorporate any subset of the features described above in the section "Calculating the Mapping Between the RX and Tx".) The method 4000 is described below as being performed by a "processing agent". The processing agent may be any system of digital circuitry, e.g., a processor (executing under the control of program instructions), a programmable hardware element, an ASIC, or any combination thereof.

In some embodiments, the receiver conforms to a direct-conversion architecture, and the demodulator is an analog I/Q demodulator. In other embodiments, the receiver may conform to a different architecture (e.g., a superheterodyne architecture) which performs analog down-conversion followed by digital I/Q demodulation. Thus, in this case the demodulator is realized by digital circuitry, e.g., on a programmable hardware element, in dedicated digital circuitry, in software on a processor, or any combination thereof.

At 4010, the processing agent may direct the transmitter to supply a zero signal as input to the I/Q modulator. The zero signal is a constant zero signal. The zero signal may be a digital zero signal that is supplied to the complex input of the transmitter's DAC unit (e.g., DAC unit 3705 of FIG. 37). Thus, I'(n)=0 and Q'(n)=0.

At 4015, the processing agent may receive a first response signal that has been captured from the demodulator in response to the action of supplying the zero signal. The first response signal may be captured from the output of the receiver's ADC unit. (See, e.g., digitization unit 215 of FIG. 2B.)

At 4020, the processing agent may direct the transmitter to supply a constant signal equal to a non-zero complex constant $B = B_I + jB_Q$ as input to the I/Q modulator. Again, the constant signal may be supplied to the complex input of the transmitter's DAC unit. Thus, I'(n)=$B_I$ and Q'(n)=$B_Q$. In some embodiments, B is entirely real, i.e., $B_Q$=0.

At 4025, the processing agent may receive a second response signal that has been captured from the demodulator in response to the action of supplying the constant signal. The second response signal may be captured from the output of the receiver's ADC unit.

At 4030, the processing agent may average the first response signal to obtain a first average and averaging the second response signal to obtain a second average. The averaging helps to reduce noise in the measurements.

At 4035, the processing agent may compute a difference between the second average and the first average, e.g., according to the expression:

$$\text{Diff} = \text{SecondAvg} - \text{FirstAvg}.$$

At 4040, the processing agent may compute the DC scaling based on the difference and the non-zero complex constant, e.g., as described above. The processing agent may store the DC scaling in a memory.

In some embodiments, the method 4000 may also include computing a DC rotation θ(0) of the signal path based on a phase of the difference and a phase of the non-zero complex constant B, e.g., according to the expression $$\theta(0) = \text{Phase}(\text{Diff})/\text{Phase}(B).$$

In some embodiments, the DC scaling and DC rotation are used to remove an effect of the signal path from measured I/Q impairments at the receiver in order to obtain estimates of the I/Q impairments of the transmitter.

In some embodiments, the signal path includes a cable coupling between the transmitter and the receiver. In other embodiments, the signal path includes a wireless channel between the transmitter and the receiver.

As an alternative to computing a difference of averages, the processing agent may alternatively compute a difference signal by subtracting the first response signal from the second response signal, and then average the difference signal. The DC scaling may then be computed based on average value and the non-zero complex constant.

In one set of embodiments, a computer system for estimating a DC scaling m(0) of a signal path between an I/Q modulator of a transmitter and a demodulator of a receiver, the computer system comprising a processor and memory. The memory storing program instructions, where the program instructions, when executed by the processor, cause the processor to: direct the transmitter to supply a zero signal as input to the I/Q modulator; receive a first response signal that has been captured from the demodulator in response to said supplying the zero signal; direct the transmitter to supply a constant signal equal to a non-zero complex constant as input to the I/Q modulator; receive a second response signal that has been captured from the demodulator in response to said supplying the constant signal; average the first response signal to obtain a first average and averaging the second response signal to obtain a second average; compute a difference between the second average and the first average; compute the DC scaling based on the difference and the non-zero complex constant. The program instructions may incorporate any subset of the features described above in the section "Calculating the Mapping Between the RX and Tx" and in connection with method 4000.

Altering the Gain Imbalance and Phase Skew through a Linear System

When calibrating the transmitter or measuring the I/Q impairments of the transmitter, the method of this section may be used to remove the effects of the signal path between the transmitter's I/Q modulator and the receiver's I/Q demodulator from the receiver's I/Q impairment measurements. Those effects may include the effects of the transmitter's front end, the transmission channel and the receiver's front end. For example, the transmitter's front end may include an RF filter that contributes to the frequency response of the signal path. Similarly, the receiver's front end may include an RF filter that contributes to the frequency response of the signal path.

In some embodiments, the magnitude response m(f) of the signal path may be calibrated out, while the phase rotation θ(f) is not calibrated out. (Calibration may be achieved by performing pre-compensation at the transmitter using digital circuit 510 and/or post-compensation at the receiver using digital circuit 220.) The calculations of this section allow for the correct measurement of the transmitter's I/Q impairments without first calibrating out the phase response of the signal path.

In some embodiments, the total frequency response (including both magnitude and phase rotation) of the signal is calibrated out.

Given a system with frequency response H(f) and an input signal $s_{input}(f,t)$ having gain imbalance g(f) and phase skew φ(f) as shown in FIG. 41, we will develop equations that allow us to determine the gain imbalance g'(f) and phase skew φ'(f) at the system output $s_{output}(f,t)$. We assume the input gain imbalance g(f) and input phase skew φ(f) appear entirely on the Q input channel. However, we cannot simultaneously make the same assumption at the system output. In general, the output components I'(t) and Q'(t) will have the form:

$$I'(t)=g_1(f)\cos(2\Sigma ft+\phi_I(f))$$

$$Q'(t)=g_Q(f)\sin(2\Sigma ft+\phi(f)).$$

The output gain imbalance g'(f) and output phase skew φ'(f) may then determined by:

$$g'(f)=g_Q(f)/g_I(f)$$

$$\phi'(f)=\phi_Q(f)-\phi_I(f).$$

The development starts with equations (1.60) through (1.62) given in FIG. 42, relying on the fact that $s_{output}(f,t)=h(t)*s_{input}(f,t)$, where h(t) is the impulse response corresponding to H(f). Equations 1.61 and 1.62 imply that:

$$g_I(f)\exp(j\phi_I(f))+g_Q(f)\exp(j\phi_Q(f))=H(f)\{1+g(f)\exp(j\phi(f))\} \quad (1.63)$$

$$g_I(f)\exp(-j\phi_I(f))-g_Q(f)\exp(-j\phi_Q(f))=H(-f)\{1-g(f)\exp(-j\phi(f))\} \quad (1.64)$$

Define A(f) and B(f) to be respectively the right-hand sides of equation (1.63) and (1.64):

$$A(f)=H(f)\{1+g(f)\exp(j\phi(f))\} \quad (1.65)$$

$$B(f)=H(-f)\{1-g(f)\exp(-j\phi(f))\}. \quad (1.66)$$

Also, define w(f), x(f), y(f) and z(f) based on the left-hand sides of equations (1.63) and (1.64):

$$g_I(f)\exp(j\phi_I(f))=w(f)+jx(f) \quad (1.67)$$

$$g_Q(f)\exp(j\phi_Q(f))=y(f)+jz(f) \quad (1.68)$$

It follows that $$w(f)+jx(f)+y(f)+jz(f)=A(f) \quad (1.69)$$

$$w(f)-jx(f)-y(f)+jz(f)=B(f), \quad (1.70)$$

and thus, $$w(f)=(\tfrac{1}{2})Re\{A(f)+B(f)\}$$

$$x(f)=(\tfrac{1}{2})Im\{A(f)-B(f)\}$$

$$y(f)=(\tfrac{1}{2})Re\{A(f)-B(f)\}$$

$$z(f)=(\tfrac{1}{2})Im\{A(f)+B(f)\}.$$

Note that if H(f) has an even magnitude response and an odd phase response, i.e., H(−f)=H(f)*, then the impulse response h(t) corresponding to H(f) is entirely real. As a result, in this specific case, the filter H(f) does not change the measurement of the I/Q impairments:

$$A(f)+B(f)=H(f)+H^*(f)+g\{H(f)\exp(j\varphi(f))-H^*(f)\exp(-j\varphi(f))\}=$$
$$2Re(H)+2jg\text{Im}\{H(f)\exp(j\varphi(f))\}A(f)-B(f)=$$
$$H(f)-H^*(f)+g\{H(f)\exp(j\phi(f))+H^*(f)\exp(-j\phi(f))\}$$
$$A(f)-B(f)=H(f)-H^*(f)+g\{H(f)\exp(j\varphi(f))+H^*(f)\exp(-j\varphi(f))\}=$$
$$2j\text{Im}\{H(f)\}+2g\text{Re}\{H(f)\exp(j\varphi(f))\}$$
$$w(f)=\text{Re}(H(f)),\ x(f)=\text{Im}(H(f))$$
$$g_I(f)\exp(j\varphi_I(f))=w(f)+jx(f)=H(f)$$
$$y(f)=g\text{Re}\{H(f)\exp(j\varphi(f))\}$$
$$z(f)=g\text{Im}\{H(f)\exp(j\varphi(f))\}$$
$$g_Q(f)\exp(j\varphi_Q(f))=y(f)+jz(f)=gH(f)\exp(j\varphi(f))$$
$$g_Q(f)\exp(j\varphi_Q(f))/g_I(f)\exp(j\varphi_I(f))=g\exp(j\varphi(f)).$$

The method below describes how to iteratively measure the TX impairments when the magnitude and phase of the signal path transfer function H(f) are only approximately known. Part of that iterative measurement method involves using the equations derived in this section to compute the I/Q impairments at the output of the transmitter's I/Q modulator based on the I/Q impairments at the input (or alternatively, at the output) of the receiver's I/Q demodulator. To perform this computation, the frequency response H(f) is set equal to the inverse of an estimate of the frequency response of the signal path. Different estimates of the signal path frequency response may be used in different circumstances.

Transforming I/Q Impairments through a Linear System H(f)

In one set of embodiments, a method 4300 may involve the operations shown in FIG. 43. The method 4300 may be used to compute I/Q impairments at a complex output $z_{OUT}$ of an electrical system based on I/Q impairments at a complex input $z_{IN}$ of the electrical system. A complex input is an input that includes an inphase channel and a quadrature channel. Likewise a complex output is an output that includes an inphase channel and a quadrature channel. (Method 4300 may include any subset of the features described above in the section "Altering the Gain Imbalance and Phase Skew through a Linear System".) Method 4300 may be performed by a processing agent as described above.

At 4310, the processing agent may compute a spectrum A(f) according to the expression $$H(f)\{1+g(f)\exp(j\phi(f))\},$$

where H(f) is a spectrum of a linear system model of the electrical system, where g(f) is a gain imbalance at the complex input $z_{IN}$, where $\phi(f)$ is a phase skew at the complex input $z_{IN}$.

At 4315, the processing agent may compute a spectrum B(f) according to the expression $$H(-f)\{1-g(f)\exp(-j\phi(f))\}.$$

At 4320, the processing agent may compute a sum of the spectra A(f) and B(f), and a difference of the spectra A(f) and B(f), e.g., according to the relations:

$$\text{Sum}(f)=A(f)+B(f),$$

$$\text{Diff}(f)=A(f)-B(f).$$

At 4325, the processing agent may compute a gain imbalance and phase skew at the complex output $z_{OUT}$ based on real and imaginary parts of the sum, and real and imaginary parts of the difference. In particular, as described above, the functions $g_I(f)$, $g_Q(f)$, $\phi_I(f)$ and $\phi_Q(f)$ may be computed based on the sum spectrum and the difference spectrum, and then the gain imbalance and phase skew at the complex output $z_{OUT}$ may be computed based on $g_I(f)$, $g_Q(f)$, $\phi_I(f)$ and $\phi_Q(f)$ as shown in FIG. 41. The output gain imbalance and output phase skew constitute useful information in part because they may be used to perform I/Q impairment compensation or calibration as variously described herein.

The processing agent may store the output gain imbalance and the output phase skew in a memory.

In some embodiments, the electrical system being modeled by the spectrum H(f) is the inverse of a signal path from an I/Q modulator of a transmitter to a demodulator of a receiver, e.g., as variously described herein. The gain imbalance and the phase skew at the complex input $z_{IN}$ of the electrical system may represent a gain imbalance and a phase skew at the input (or alternatively, at the output) of the demodulator. The gain imbalance and the phase skew at the complex output $z_{OUT}$ of the electrical system may represent a gain imbalance and a phase skew at the output of the I/Q modulator.

In some embodiments, the receiver conforms to a direct-conversion architecture, and the demodulator is an analog I/Q demodulator. In other embodiments, the receiver may conform to a different architecture (e.g., a superheterodyne architecture) which performs analog down-conversion followed by digital I/Q demodulation. Thus, in this case the demodulator is realized by digital circuitry, e.g., on a programmable hardware element, in dedicated digital circuitry, in software on a processor, or any combination thereof.

In some embodiments, the processing agent may also include computing an inverse of a spectrum of the signal path to determine the spectrum H(f), e.g., as variously described herein.

In some embodiments, the spectrum H(f) may be determined (or estimated) based on a DC scaling and a DC rotation of the signal path, e.g., according to the relation $$H(f)=\exp\{-j\theta(0)\}/m(0).$$

In some embodiments, the processing agent may compute the DC scaling and the DC rotation by: supplying a zero signal as input to the I/Q modulator, capturing a first response signal from the I/Q demodulator in response to said supplying the zero signal; supplying a constant signal equal to a non-zero complex constant as input to the I/Q modulator; capturing a second response signal from the I/Q demodulator in response to said supplying the constant signal; averaging the first response signal to obtain a first average and averaging the second response signal to obtain a second average; computing a difference between the second average and the first average; and computing the DC scaling based on the difference and the non-zero complex constant.

In some embodiments, the processing agent may also measure (e.g., direct the measurement of) the gain imbalance g(f) and the phase skew $\phi(f)$ of an electronic device at a plurality of frequencies. The electronic device may be a transmitter, a receiver, or the series combination of a transmitter and receiver, as variously described herein.

In some embodiments, the processing agent may be a programmable hardware element. In other embodiments, the processing agent may be a processor that is configured to perform the method 4300 in response to execution of program instructions.

Determination of Transmitter I/Q Impairments Using Shared LOs

In one set of embodiments, a method 4400 for determining I/Q impairments of a transmitter may involve the actions shown in FIG. 44. (Furthermore, the method 4400 may include any subset of the features described in the section "Iterative Technique for Measuring Tx Impairments, in the section "Iterative Estimation of Transmitter Impairments Using Shared LOs", and in the section "Iterative Estimation of Transmitter Impairment Using Shared LO—Optimized".) The method 4400 may be enacted by a processing agent, e.g., a processing agent as variously described above.

At 4410, the processing agent may perform a set of operations. The set of operations may include the operations 4415 through 4440, as shown in FIG. 44.

At 4415, the processing agent may direct that a complex exponential tone at frequency f be supplied to the transmitter. For example, the processing agent may issue commands causing the complex exponential tone to be supplied (or generated by) the transmitter. The frequency f may be interpreted as a displacement frequency relative to the transmitter's local oscillator frequency. The frequency f may be non-zero.

At 4420, the processing agent may supply a pre-compensation transformation to a pre-compensation circuit of the transmitter. The pre-compensation circuit may be configured to apply the pre-compensation transformation to the complex exponential tone to obtain an adjusted complex signal. (For example, the pre-compensation circuit may be the digital circuit 510 of FIG. 5 or the compensation unit 3702 of FIG. 37.) The pre-compensation transformation may be configured to pre-compensate for a current estimate of the I/Q impairments of the transmitter. The transmitter may be configured to transmit a transmit signal based on the adjusted complex signal, e.g., as variously described above. The receiver may be configured to receive the transmit signal and capture a sampled complex signal representing the received transmit signal, e.g., as variously described above. (The action of "sampling" a complex signal involves sampling its I component and sampling its Q component. Thus, a "sampled complex signal" includes a sampled I signal and a sampled Q signal.)

At 4425, the processing agent may compute raw I/Q impairments based on the sampled complex signal. For example, the raw I/Q impairments may include a gain imbalance and phase skew of the sampled complex signal. See the section "Precise Measurement Technique" for information on how to compute the raw I/Q impairments.

At 4430, the processing agent may transform the raw I/Q impairments to determine transformed I/Q impairments. The transform may remove measured I/Q impairments of the receiver from the raw I/Q impairments. See the section "Removing Receiver Impairments from Measured Output Impairments" for more information on how perform this transform.

As an alternative to operations 4425 and 4430, the processing agent may apply a 2×2 matrix of digital filters to the sampled complex signal to remove the effect of the receiver's measured I/Q impairments, e.g., as described above in connection with FIGS. 2A, 2B and 3, and in the sections "Wideband I/Q Impairment Equalization" and "Filter Design". The application of the 2×2 matrix of digital filters to the sampled complex signal produces a filtered complex signal. The filtered complex signal may be used to compute the transformed I/Q impairments. The method described in the section "Precise Measurement Technique" may be used to determine the transformed I/Q impairments based on the filtered complex signal.

At 4435, the processing agent may remove a current estimate of a signal path from the transformed I/Q impairments to obtain path-compensated I/Q impairments, where the signal path includes a path from an I/Q modulator of the transmitter to a demodulator of the receiver. (The signal path estimate may be removed by using the method described in the section "Altering the Gain Imbalance and Phase Skew Through a Linear System".) The path-compensated I/Q impairments may represent an estimate for residual I/Q impairments of the transmitter, i.e., "residual" in the sense that they are remaining impairments after the partial correction realized by the pre-compensation transformation of 4420.

In some embodiments, the receiver may conform to a direct-conversion architecture, and the demodulator may be an analog I/Q demodulator, in which case the sampled complex signal may be captured by digitizing the complex analog output of the analog I/Q demodulator. In other embodiments, the receiver may conform to a different kind of architecture, e.g., a superheterodyne architecture. Thus, the receiver may generate a real analog signal (e.g., a real intermediate-frequency signal) that represents the received transmit signal. The real analog signal may be digitized to obtain a sampled real signal. The sampled complex signal may then be generated computationally, e.g., by digitally mixing the sampled real signal with an orthogonal pair of digital sinusoids to obtain respectively the I and Q components of the sampled complex signal.

At 4440, the processing agent may update the current estimate of the I/Q impairments of the transmitter based on the path-compensated I/Q impairments, e.g., by combining the path-compensated I/Q impairments with the respective impairments of the current estimate.

In some embodiments, the method 4400 may include repeating the set of operations to determine a converged estimate (stable estimate) of the I/Q impairments of the transmitter at the frequency f. (This converged estimate comprises a measurement of the transmitter's I/Q impairments at the frequency f.) The set of operations may be repeated until a quality measure based on the path-compensated I/Q impairments is larger than a threshold. The converged estimate may be used to at least partially compensate for the I/Q impairments of the transmitter at frequency f, e.g., as variously described herein.

In some embodiments, the above-described action of repeating the set of operations may itself be performed a plurality of times to determine the converged estimate at a plurality of different values for the frequency f. The above-described action of repeating the set of operations to determine the converged estimate at frequency f may be referred to herein as a "transmitter I/Q impairment measurement at frequency f". Thus, a plurality of transmitter I/Q impairment measurements may be made so as to cover the plurality of frequency values.

In some embodiments, the plurality of frequency values are symmetric about zero. Furthermore, the transmitter I/Q impairment measurements may be made so that the frequency values are visited in manner that alternates in sign and is non-decreasing in absolute value, e.g., as variously described herein.

In some embodiments, a local oscillator of the transmitter and a local oscillator of the receiver are phase locked to the same frequency reference (infers frequency lock).

In some embodiments, the current estimate of the signal path is based on a DC scaling and a DC rotation of the signal path, at least for a first of the transmitter I/Q impairment measurements.

In some embodiments, the DC scaling and the DC rotation may be determined by: supplying a zero vector signal to the transmitter; supplying a non-zero DC vector signal to the transmitter; and computing the DC scaling and the DC rotation based on a first DC vector response and a second DC vector response, where the first DC vector response is measured at the receiver in response to the zero vector signal, where the second DC vector response is measured at the receiver in response to the non-zero DC vector signal. For more information on how to compute the DC scaling and DC rotation, see the section "Calculating the Mapping Between RX and TX".

In some embodiments, the pre-compensation transformation has the form of a 2×2 matrix, where at least a first diagonal element of the matrix is computed from the current estimate of the I/Q impairments of the transmitter at frequencies f and −f, and where at least a first non-diagonal element of the matrix is computed from the current estimate of the I/Q impairments of the transmitter at frequencies f and −f.

In some embodiments, the current estimate of the signal path includes a measured amplitude of the sampled complex signal at frequency f. The amplitude may be measured as described in the section "Precise Measurement Technique".

In some embodiments, the current estimate of the signal path also includes a measured rotation of the sampled complex signal at frequency f.

Determination of Transmitter I/Q Impairments with Offset LOs

In one set of embodiments, a method 4500 for determining I/Q impairments of a transmitter may involve the actions shown in FIG. 45. (Furthermore, the method 4500 may include any subset of the features described in the section "Iterative Techniques for Measuring Tx Impairments.) The method 4500 may be performed by a processing agent, e.g., a processing agent as variously described above.

At 4510, the processing agent may configure a local oscillator (LO) of the transmitter and a local oscillator (LO) of the receiver to be phase locked to a common reference and so that a frequency of the receiver's LO minus a frequency of the transmitter's LO frequency is equal to a non-zero amount ΔLO. The amount ΔLO may be positive or negative.

At 4520, the processing agent may perform a set of operations $S_O$. The set $S_O$ may include operations 4525 through 4550, as shown in FIG. 45.

At 4525, the processing agent may direct that a complex exponential tone at frequency f be supplied to the transmitter. (The frequency f may be interpreted as a displacement relative to the transmitter's LO frequency.) The complex exponential tone may be supplied in digital form, e.g., as variously described above. In some embodiments, the transmitter may couple to (or include) a programmable hardware element configured to generate the complex exponential tone. To facilitate this generation, the PHE may receive the sample clock used by the transmitter's DAC unit.

At 4530, the processing agent may supply a pre-compensation transformation to a pre-compensation circuit of the transmitter. The pre-compensation circuit may be configured to apply the pre-compensation transformation to the complex exponential tone in order to obtain an adjusted complex signal. (For example, the pre-compensation circuit may be the digital circuit 510 of FIG. 5 or the compensation unit 3702 of FIG. 37.) The pre-compensation transformation may be configured to pre-compensate for a current estimate of the I/Q impairments of the transmitter. The transmitter may be configured to transmit a transmit signal based on (derived from) the adjusted complex signal, e.g., as variously described above. A receiver may be configured to receive the transmit signal and to capture a sampled complex signal representing the received transmit signal, e.g., as variously described above. The transmitter may transmit the transmit signal onto a transmission channel (e.g., a cable), and the receiver may receive the transmit signal from the channel.

At 4535, the processing agent may frequency shift the sampled complex signal by the amount ΔLO to obtain a frequency-shifted signal, e.g., by multiplying the sampled complex signal by a discrete-time complex exponential signal running at frequency ΔLO.

At 4540, the processing agent may compute raw I/Q impairments at frequency f based on the frequency-shifted signal. The raw I/Q impairments may include a gain imbalance $g_R(f)$ and a phase skew $\phi_R(f)$. (The process of computing the I/Q impairments from a complex signal is described above.)

At 4545, the processing agent may remove a current estimate of a signal path from the raw I/Q impairments at frequency f to obtain path-compensated I/Q impairments at frequency f (e.g., as described above in the section "Transforming I/Q Impairments through a Linear System", or in the section "Altering the Gain Imbalance and Phase Skew through a Linear System"). The signal path may include a path from an I/Q modulator of the transmitter to a demodulator of the receiver. The path-compensated I/Q impairments at frequency f may represent an estimate for residual I/Q impairments of the transmitter at frequency f.

In some embodiments, the receiver may conform to a direct-conversion architecture, and the demodulator may be an analog I/Q demodulator, in which case the sampled complex signal may be captured by digitizing the complex analog output of the analog I/Q demodulator. In other embodiments, the receiver may conform to a different kind of architecture, e.g., a superheterodyne architecture. Thus, the receiver may generate a real analog signal (e.g., a real intermediate-frequency signal) that represents the received transmit signal. The real analog signal may be digitized to obtain a sampled real signal. The sampled complex signal may then be generated computationally, e.g., by digitally mixing the sampled real signal with an orthogonal pair of digital sinusoids to obtain respectively the I and Q components of the sampled complex signal.

At 4550, the processing agent may update the current estimate of the I/Q impairments of the transmitter at frequency f based on the path-compensated I/Q impairments at frequency f.

In some embodiments, the method 4500 may include repeating the set of operations $S_O$ to determine a converged estimate (or stable estimate) of the I/Q impairments of the transmitter at frequency f. (This converged estimate may be interpreted as a measurement of the transmitter's I/Q impairments at frequency f.) For example, the set of operations may be repeated until a quality measure based on the path-compensated I/Q impairments is larger than a threshold. (The quality measure may be the negative of image rejection at frequency f.) The converged estimate is usable to at least partially compensate for the I/Q impairments of the transmitter at frequency f. The above-described action of frequency shifting may be performed using a frequency-shift signal that is phase continuous between successive repetitions of the set of operations.

In some embodiments, the method 4500 may also include performing said repeating (of the set of operations $S_O$) a plurality of times to determine the converged estimate at a plurality of different values for the frequency f, e.g., values covering a desired transmission (or communication) band.

In some embodiments, the set of operations $S_O$ may also include removing measured I/Q impairments of the receiver at frequency f-ΔLO from the sampled complex signal prior to the frequency shifting operation. The measured I/Q impairments of the receiver at frequency f-ΔLO may be removed by multiplying the sampled complex signal by a 2×2 matrix $M=(m_{ij})$ of constants, e.g., according to the relations:

$$\begin{bmatrix} I'(n) \\ Q'(n) \end{bmatrix} = \begin{bmatrix} m_{11} & m_{12} \\ m_{21} & m_{22} \end{bmatrix} \begin{bmatrix} I(n) \\ Q(n) \end{bmatrix},$$

where $I(n)$ and $Q(n)$ denote respectively the inphase and quadrature components of the sampled complex signal. In one embodiment, the matrix M may have the special form $$M = \begin{bmatrix} 1 & 0 \\ m_{21} & m_{22} \end{bmatrix},$$

and the constants $m_{21}$ and $m_{22}$ may be determined from a receiver's gain imbalance $g_{RX}(f-\Delta LO)$ and receiver's phase skew $\phi_{RX}(f-\Delta LO)$ at frequency f-ΔLO based on the expressions:

$$m_{21} = -\tan\{\varphi_{RX}(f - \Delta LO)\}.$$

$$m_{22} = \frac{1}{g_{RX}(f - \Delta LO)\cos\{\varphi_{RX}(f - \Delta LO)\}}.$$

See the section entitled "Performing Traditional Impairment Compensation at a Single Frequency".

In an alternative embodiment, the constants $m_{21}$ and $m_{22}$ may be determined based on the receiver's measured I/Q impairments at frequency f-ΔLO and its negative −(f-ΔLO), as described in the section "Calculating True Single Point Vector Calibration Constants", and especially at equations (1.81) and (1.82).

In some embodiments, the receiver's I/Q impairments may be measured as part of method 4500, i.e., measured based on the sampled complex signal prior to frequency shifting. For example, the set of operations $S_O$ may include measuring the I/Q impairments of the receiver at frequency f-ΔLO based on the sampled complex signal. One technique for performing this measurement involves: (a) computing a Discrete-Time Fourier transform value $C_I$ at frequency f-ΔLO of an I component of the sampled complex signal; (b) computing a Discrete-Time Fourier transform value $C_Q$ at frequency f-ΔLO of a Q component of the sampled complex signal; (c) computing the receiver gain imbalance at frequency f-ΔLO based on the magnitudes of the values $C_I$ and $C_Q$; and (d) computing the receiver phase skew at frequency f-ΔLO based on the phases of the values $C_I$ and $C_Q$. For more information on embodiments of this technique, see the "Precise Measurement Technique" section.

In some embodiments, the method 4500 may also include applying a time-domain window to the sampled complex signal prior to computing the values $C_I$ and $C_Q$. The time-domain window may be a rectangular (uniform) window or any of a variety of standard non-uniform windows. For more information on use of the rectangle window, see the section "Rectangle Window Optimization".

In some embodiments, the above-described measurement of the receiver's I/Q impairments and the estimation of the transmitter's I/Q impairments may be performed at least partially in parallel. For example, in one embodiment, a programmable hardware element (or perhaps a multicore processor) may be configured to perform the measurement of the receiver's I/Q impairments in parallel with the frequency shift operation on the sampled complex signal.

In some embodiments, the set of operations may include measuring the receiver's I/Q impairments at frequency f-ΔLO as described above, computing the 2×2 matrix of correction constants based on the measured I/Q impairments as described above, and then applying the 2×2 matrix to the sampled complex signal prior to the frequency shift operation. In other words, the frequency shift operation is applied to the modified complex signal (I'(n),Q'(n)) resulting from the application of the 2×2 matrix.

In some embodiments, it is assumed that the I/Q impairments of the receiver have already been measured over the frequency band of interest prior to the execution of method 4500. Thus, a 2×2 matrix of digital filters may be designed based on the receiver's I/Q impairments, as described above in connection with FIGS. 2A, 2B and 3, and in the sections "Wideband I/Q Impairment Equalization" and "Filter Design". The set of operations may include the operation of applying the 2×2 matrix of digital filters to the sampled complex signal prior to the frequency shifting operation. The resulting filtered complex signal may then be subjected to the frequency shifting.

In some embodiments, the pre-compensation transformation has the form of a 2×2 matrix, and the matrix has the property that at least one of the diagonal elements of the matrix is computed based on the current estimate of the I/Q impairments of the transmitter at frequency f and a current estimate of the I/Q impairments of the transmitter at frequency -f, and the property that at least one of the non-diagonal elements of the matrix is computed based on the current estimate of the I/Q impairments of the transmitter at frequency f and the current estimate of the I/Q impairments of the transmitter at frequency -f. In some embodiments, each of the four matrix elements is computed in this fashion.

As described above, the processing agent may remove a current estimate of a signal path from the raw I/Q impairments at frequency f to obtain path-compensated I/Q impairments at frequency f. In some embodiments, the current estimate of the signal path may include a measured amplitude of the frequency-shifted signal at frequency f. In one embodiment, the current estimate of the signal path may also include a measured rotation of the frequency-shifted signal at frequency f.

In some embodiments, the current estimate of the signal path may be based on a DC scaling and a DC rotation of the signal path. Such an estimate may be used in at least a first performance of said set of operations.

In some embodiments, the method 4500 may also include determining the DC scaling and the DC rotation by: supplying a zero vector signal to the transmitter; supplying a non-zero DC vector signal to the transmitter; computing the DC scaling and the DC rotation based on a first DC vector response and a second DC vector response, where the first DC vector response is measured at the receiver in response to the zero vector signal, where the second DC vector response is measured at the receiver in response to the non-zero DC vector signal. For more information on determination of the DC scaling and DC rotation, see the section "Calculating the Mapping Between the RX and Tx" and the section "Method for Computing a DC Mapping and DC Rotation for Signal Path".

Determining I/Q Impairments of a Receiver

In one set of embodiments, a method 4600 for determining I/Q impairments of a receiver may include the operations shown in FIG. 46. The method 4600 may be performed by a processing agent as described above.

At 4610, the processing agent may direct that an input signal be supplied to the receiver. In other words, the processing agent may issue commands to cause the input signal to be supplied to (or generated by) the receiver. The input signal may include an isolated tone at displacement frequency f and a void interval (i.e., an interval containing only noise) around displacement frequency -f (To say that a tone is "isolated" at a given frequency means that the tone is the only energy source except for noise in a frequency neighborhood of the given frequency (e.g., in an interval of frequencies centered on the given frequency). If the noise energy is too large, the measurement quality will degrade. The tone is preferably the only significant source of energy in the frequency neighborhood.) The receiver may be configured to demodulate the input signal in order to obtain a sampled complex signal, e.g., as variously described above. The displacement frequencies f and -f may be displacements relative to a local oscillator frequency of the receiver.

At 4615, the processing agent may compute the I/Q impairments of the receiver at frequency f based on the sampled complex signal.

At 4620, the processing agent may repeat the actions of directing (4610) and computing (4615) for values of the frequency f spanning a specified frequency band, e.g., the currently-selected input band of the receiver or a standardized communication band.

At 4625, the processing agent may store the receiver's I/Q impairments for each of the values of the frequency f in a memory.

In some embodiments, the input signal is supplied by a transmitter whose local oscillator frequency is offset by a non-zero value from the local oscillator frequency of the receiver, e.g., as variously described above.

In some embodiments, the input signal is supplied by a calibration tone synthesizer. A calibration tone synthesizer is a system configured to create quality tones for the purpose of calibrating other systems. In some embodiments, the term "quality tone" implies stability over amplitude, frequency, temperature, or time. In one embodiment, the receiver includes a calibration tone synthesizer to facilitate self calibration.

In some embodiments, the action of computing the I/Q impairments of the receiver at frequency f includes: computing a Discrete-Time Fourier transform value $C_I$ at frequency f of an I component of the sampled complex signal; computing a Discrete-Time Fourier transform value $C_Q$ at frequency f of a Q component of the sampled complex signal; computing a gain imbalance of the receiver at frequency f based on magnitudes of the values $C_I$ and $C_Q$; and computing a phase skew of the receiver at frequency f based on phases of the values $C_I$ and $C_Q$.

In some embodiments, the method 4600 may also include applying a time-domain window to the sampled complex signal prior to said computing of the values $C_I$ and $C_Q$, e.g., as describe below in the section "Precise Measurement Technique".

Measuring I/Q Impairments Associated with Complex Signal

In one set of embodiments, a method 4700 may include the operations shown in FIG. 47. The method 4700 may be used to measure I/Q impairments associated with a sampled complex signal produced by a receiver. The method 4600 may be performed by a processing agent (e.g., a computer system executing under the control of program instructions).

At 4710, the processing agent may direct a device to stimulate the receiver with a stimulus signal having an isolated tone at displacement frequency f and a void interval at displacement frequency −f The displacement frequencies f and −f may be interpreted as displacements with respect to a local oscillator frequency of the receiver. The sampled complex signal may be a baseband signal produced by the receiver in response the action of stimulating with the stimulus signal.

At 4715, the processing agent may compute a Discrete-Time Fourier transform value $C_I$ at frequency f of an I component of the sampled complex signal;

At 4720, the processing agent may compute a Discrete-Time Fourier transform value $C_Q$ at frequency f of a Q component of the sampled complex signal.

At 4725, the processing agent may compute a gain imbalance g of the sampled complex signal at frequency f based on magnitudes of the values $C_I$ and $C_Q$, where the gain imbalance g includes a gain imbalance of the receiver.

At 4730, the processing agent may compute a phase skew φ of the sampled complex signal at frequency f based on phases of the values $C_I$ and $C_Q$, where the phase skew φ includes a phase skew of the receiver.

In some embodiments, the processing agent may apply a time-domain window to the sampled complex signal prior to said computing of the values $C_I$ and $C_Q$.

In some embodiments, the device that provides the input signal is a calibration tone generator.

In some embodiments, the device is a transmitter whose local oscillator frequency is (intentionally) offset from the receiver's local oscillator frequency by a non-zero amount. In one such embodiment, the sampled complex signal has been subjected to frequency shifting to remove a difference between the local oscillator frequencies, in which case the gain imbalance g and phase skew φ may be partially dependent on the transmitter's I/Q impairments. In particular, the gain imbalance g and the phase skew ω may represent a composite effect of the transmitter's I/Q impairments, the distortion introduced by the signal path (between the transmitter's I/Q modulator and the receiver's demodulator), and the receiver's I/Q impairments. In another such embodiment, the sampled complex signal is a raw signal from the demodulator that has not been subjected to the above-described frequency shifting, and thus, the gain imbalance g and the phase skew φ may be interpreted as including only impairments introduced by the receiver.

In some embodiments, the method 4700 may also include applying a time-domain window to the sampled complex signal prior to computing the value $C_I$ and computing the value $C_Q$, e.g., as described below.

In some embodiments, the receiver is a vector signal analyzer.

In some embodiments, one or more of the operations 4715 through 4730 may be performed by a programmable hardware element.

In some embodiments, one or more of the operations 4715 through 4730 may be performed in dedicated digital circuitry.

In some embodiments, one or more of the operations 4715 through 4730 may be performed by a processor in response to the execution of program instructions.

Offset LO Calibration Technique

Figure 48:
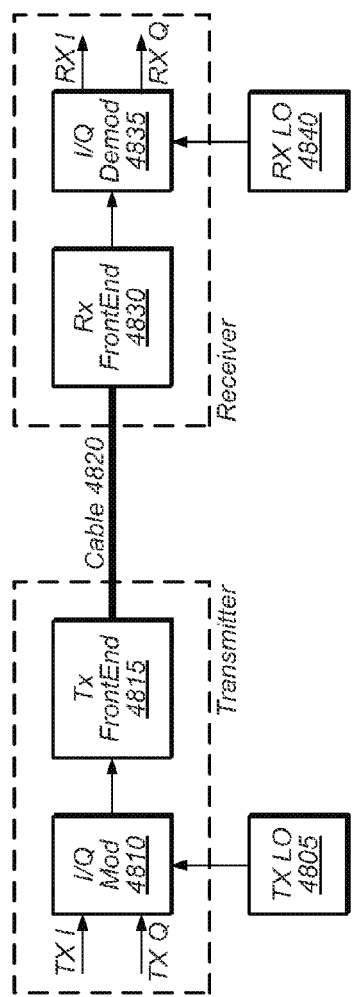
FIG. 48 illustrates one embodiment of a system for measuring transmitter and/or receiver I/Q impairments, where the system includes a transmitter and receiver whose local oscillator frequencies are intentionally offset.

The offset local oscillator (LO) method allows for I/Q impairment measurement and carrier leakage measurement of both the receiver (RX) and the transmitter (TX) simultaneously. This method uses independently tunable LOs for the transmitter and receiver, e.g., as shown in FIG. 48. In some embodiments, the step size of the transmitter LO and/or the step size of the receiver LO can be fractional or integer in nature. In some embodiments, the step size of the transmitter and/or the step size of the receiver LO should be a small percentage of the total instantaneous bandwidth.

The transmitter includes an I/Q modulator 4810 and a front end 4815. A complex exponential tone at non-zero displacement frequency f is provided to the I/Q modulator 4810. The I/O modulator 4810 modulates a carrier signal (also referred to as "local oscillator signal") with the tone to obtain a modulated signal. The carrier signal is provided by the transmitter LO 4805. The modulated signal is transmitted onto a transmission medium (e.g., a cable 4820) by the transmitter front end 4815.

The front end 4830 of the receiver receives the transmitted signal and conditions the received signal to obtain a conditioned signal. The I/Q demodulator 4835 demodulates the conditioned signal using a carrier signal provided by the receiver LO 4840, resulting in a demodulated signal having components denoted as RX I and RX Q.

Figure 49:
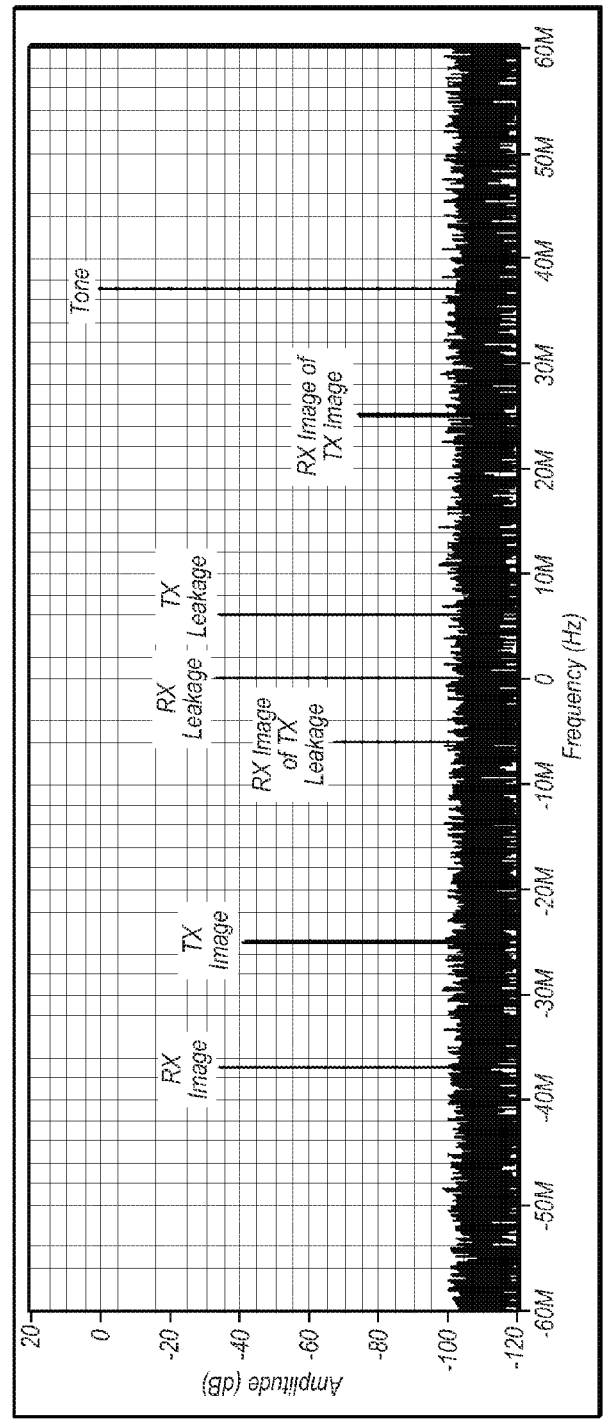
FIG. 49 illustrates the spectrum of the signal received by the receiver in response to the transmitter's transmission of a tone at 31 MHz. The transmitter's local oscillator frequency is 6 MHz higher than the receiver's local oscillator frequency. Thus, the tone appears at 37 MHz in the received spectrum.

As shown in FIG. 49, shifting the RX and TX carriers off of each other causes the tone, the receiver's image of the tone, the transmitter's image of the tone, the transmitter's carrier leakage and the receiver's carrier leakage to appear at different frequencies. The illustrated spectrum is based on the demodulated signal at the receiver. The transmitter produces the tone at 31 MHz. The spectrum includes two different carrier leakages, one due to the transmitter's LO leakage and one due to the receiver's LO leakage. The spectrum also includes two different primary images of the tone, one due to the transmitter's I/Q impairments and one due to the receiver's I/Q impairments. Additionally, the spectrum includes the receiver's image of the transmitter's image, and the receiver's image of the transmitter's carrier leakage, both due to the receiver's I/Q impairments. In this example the receiver's carrier is placed 6 MHz below that of the transmitter's carrier. This makes the tone, the transmitter's image and the transmitter's leakage appear 6 MHz higher in frequency at the receiver than at the transmitter. Then, as a result of the I/Q demodulator's impairments, each of these three signals (tone, TX image, and TX leakage) created by the transmitter has a corresponding image after the I/Q demodulator, in addition to the receiver's leakage.

Knowing the frequency offset between the transmit and receive LOs and the frequency of the tone produced at the transmitter before the modulator, the exact spectral locations of all impairment artifacts can be completely determined. If we let $$FreqOffset = TxCarrierFrequency - RXCarrierFrequency, \quad (1.75)$$

the frequency locations (as seen by the receiver) of the spectral features in the received spectrum are:

$$RxTone = TxTone + FreqOffset \quad (1.76)$$

$$TxLeakage = FreqOffset \quad (1.77)$$

$$TxImage = FreqOffset - TxTone \quad (1.78)$$

$$RxImage = -TxTone - FreqOffset \quad (1.79)$$

$$RxLeakage = 0 \text{ Hz} \quad (1.80)$$

$$RxImageofTxImage = TxTone - FreqOffset = RxTone - 2FreqOffset \quad (1.81)$$

$$RxImageOfTxLeakage = -FreqOffset. \quad (1.82)$$

Figure 50:
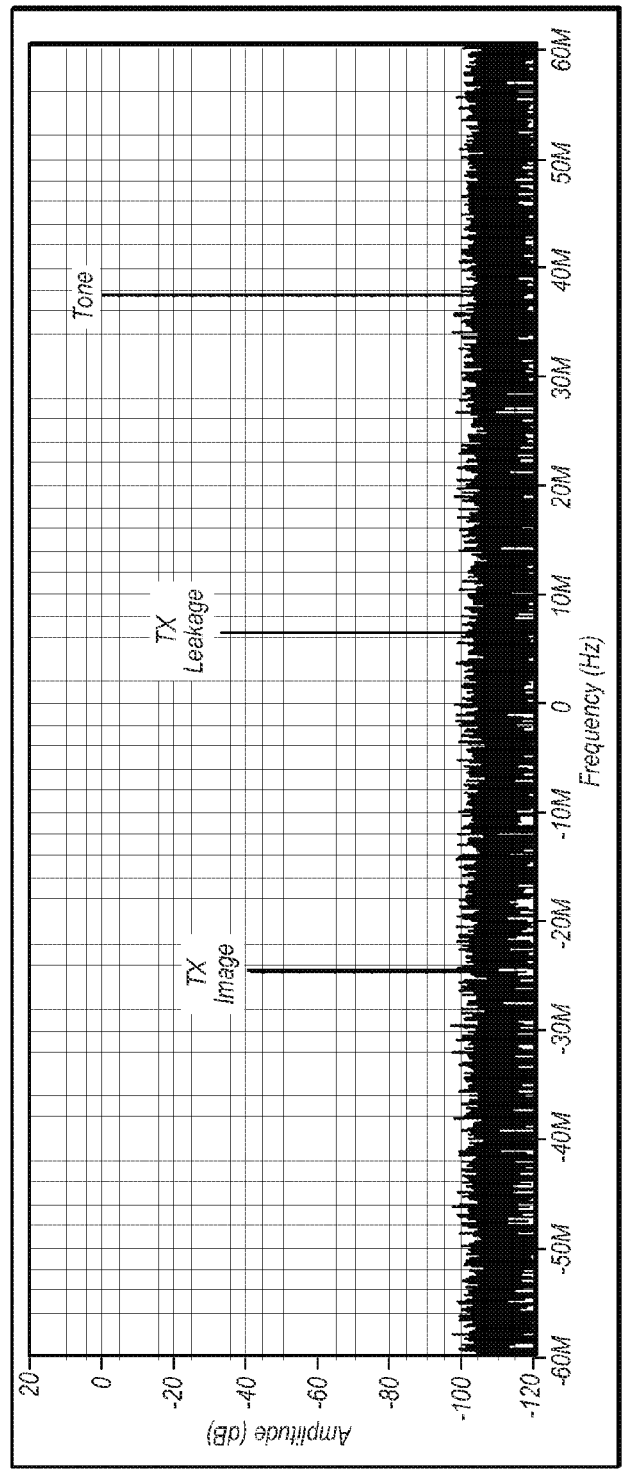
FIG. 50 illustrates the received spectrum after removal of the receiver's I/Q impairments.
Figure 51:
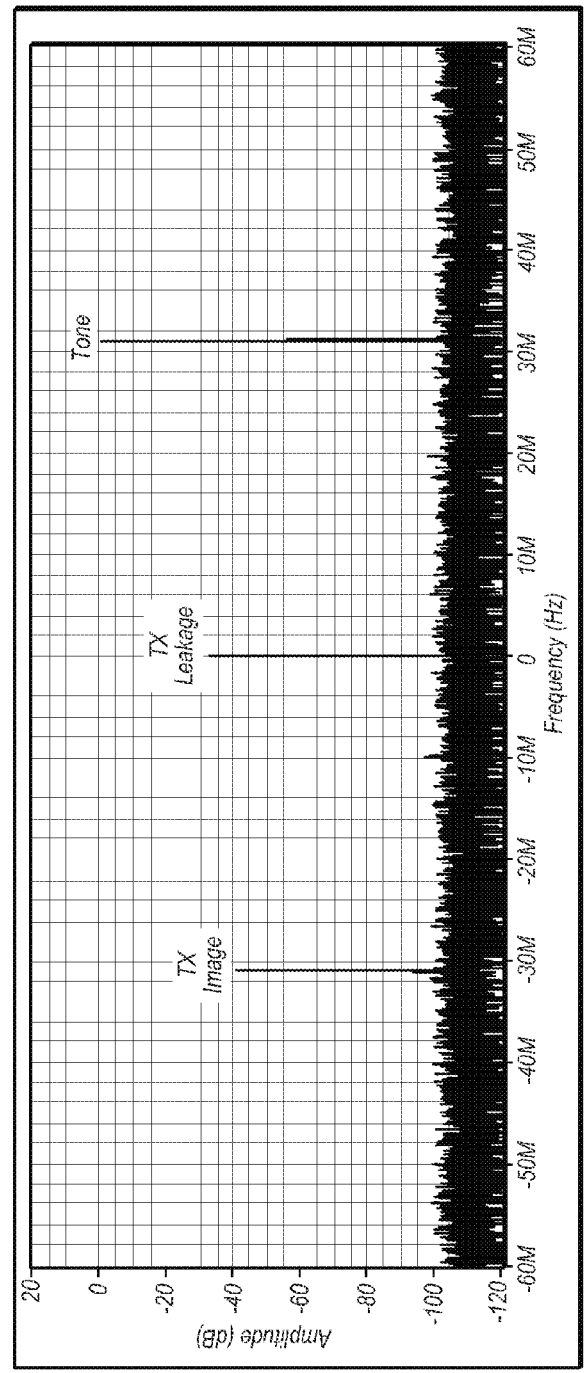
FIG. 51 illustrates the spectrum of FIG. 50 after having been frequency shifted.

Measuring the receiver's I/Q impairments and carrier leakage is performed in the same way as done in the "Precise Measurement Technique" section. However, measuring the transmitter's impairments is generally more involved since there are multiple things to consider. Measuring the transmitter's impairments may involve removing the receiver impairments. FIG. 50 shows the received spectrum after removal of the receiver's I/Q impairments. After that removal, the spectrum may be frequency shifted by −FreqOffset, as shown in FIG. 51. Now the frequency location of the "tone" in the shifted spectrum is the same as the frequency f at which the tone was originally produced at the transmitter. In addition, the transmitter's leakage (TX leakage) and transmitter's image (TX image) are at the correct frequency locations (−f and zero, respectively) to use the algorithm found in the "Precise Measurement Technique" section once the rotation is calculated and removed. (The rotation may be calculated using the method described in the section "Calculating the Mapping Between and RX and TX".) This algorithm will give an estimate for the transmitter's I/Q impairments and the transmitter's LO leakage vector. This method for measuring the transmitter's I/Q impairments will work as long as the signal path (including the transmitter's front end and the receiver's front end) has an even magnitude response and odd phase response. In reality, this is not the case, and even small perturbations in magnitude or phase cause serious problems for the measurements. The iterative algorithm removes this issue. The iterations of the iterative algorithm involve performing pre-correction (e.g., using the method of the section "Calculating True Single Point Vector Calibration Constants) based on the current estimate of the transmitter's impairments, and removing the best available estimate of the signal path from the impairments measured at the receiver (using the method of the section "Altering the Gain Imbalance and Phase Skew Through a Linear System"). The iterative algorithm allows the transmitter impairments to be measured even though there is error in the initial estimate of those impairments.

Figure 52:
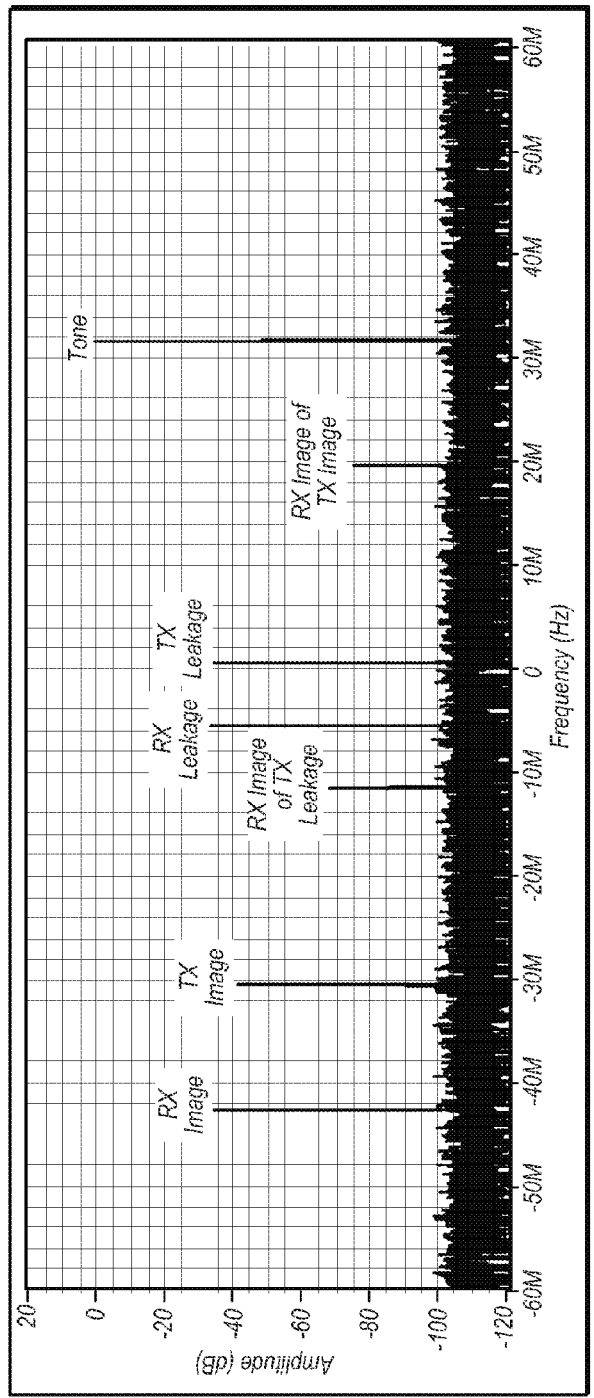
FIG. 52 illustrates the frequency-shifted spectrum without first removing the receiver's impairments.

Measuring the transmitter's impairments can be optimized one further step by doing everything in the method above except removing the receiver's impairments. Shown in FIG. 52 is the frequency-shifted spectrum without first removing the receiver's impairments. By leaving these impairments in the spectrum, the measured impairment values at frequency f (i.e., 31 MHz in this example) are not exactly equal to the transmitter's I/Q impairments since the receiver's impairments have distorted the measurements. However, the same iterative algorithm used to remove distortions of the RF front ends can also remove the distortions due to the receiver's impairments. While ideally it is better to remove the receiver's impairments, in practice this takes extra time during calibration.

Restrictions

While this method is highly desirable in that multiple measurements can be made in parallel, it does come with restrictions. The primary restriction is that is cannot be used to measure amplitude as it measures the combination of receiver amplitude and transmitter amplitude without any way to separate the two without another measurement. However, if either the receiver amplitude or the transmitter amplitude are known, then the two can be separated. In most cases, the amplitude changes slower with respect to frequency than the I/Q impairments. Therefore, a separate measurement procedure can be used to measure either receiver amplitude or transmitter amplitude with a coarser frequency step size than the step size used to determine the I/Q impairments over the instantaneous bandwidth. As a result, the total measurement time including amplitude is still much faster than the alternative.

Another minor problem with the offset LO method is that it places restrictions on the calibration frequency plan. Depending on the value of the LO offset ΔLO, it is possible to get corrupt measurements at various measurement offsets. As shown in FIG. 49, there are seven locations in the frequency spectrum where energy appears in response to the transmission of the tone. In order to correctly measure all of the impairments for both the transmitter and the receiver, all seven of these signals must remain orthogonal, i.e. no two of the signals cannot occur at the same frequency location. For example, if the receiver's LO is set to 2.400 GHz and the transmitter's LO is set to 2.396 GHz, then measurement corruptions will occur when the transmitted baseband tone is: at 4 MHz since this would place the tone at exactly the RX leakage; at −4 MHz since this would place the TX image at the RX leakage; or at 8 MHz since this would place the RX image at the TX leakage. In order to avoid these problems, the transmitted tone (TxTone) cannot be located at the frequencies $$\{N*FreqOffset: N=-3,-2,-1,0,1,2,3\}.$$

In addition, there are bandwidth limitations. The total measureable bandwidth is (TotalBW-LO_StepSize), while the total symmetric measureable bandwidth is (TotalBW-2*LO_StepSize). This is why the LO step size must be a fraction of the total instantaneous bandwidth, preferably a small fraction. For example, if the instantaneous bandwidth is 100 MHz, and the LO step size is only 25 MHz, then 75 MHz of the bandwidth is theoretically measureable. In reality, since we typically desire symmetric bandwidth (i.e. +/−25 MHz rather than −25 MHz-50 MHz), our symmetric measureable bandwidth is only 50 MHz. In addition, there is also less measureable bandwidth due to roll-off effects at band-edges.

Calculating True Single Point Vector Calibration Constants

Figure 53A:
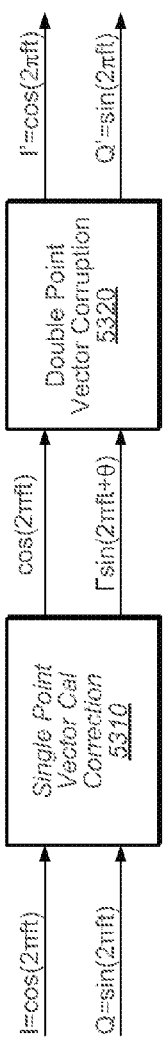
FIG. 53A illustrates a single-point vector calibration correction 5310 followed by a double-point vector corruption model 5320.
Figure 53B:
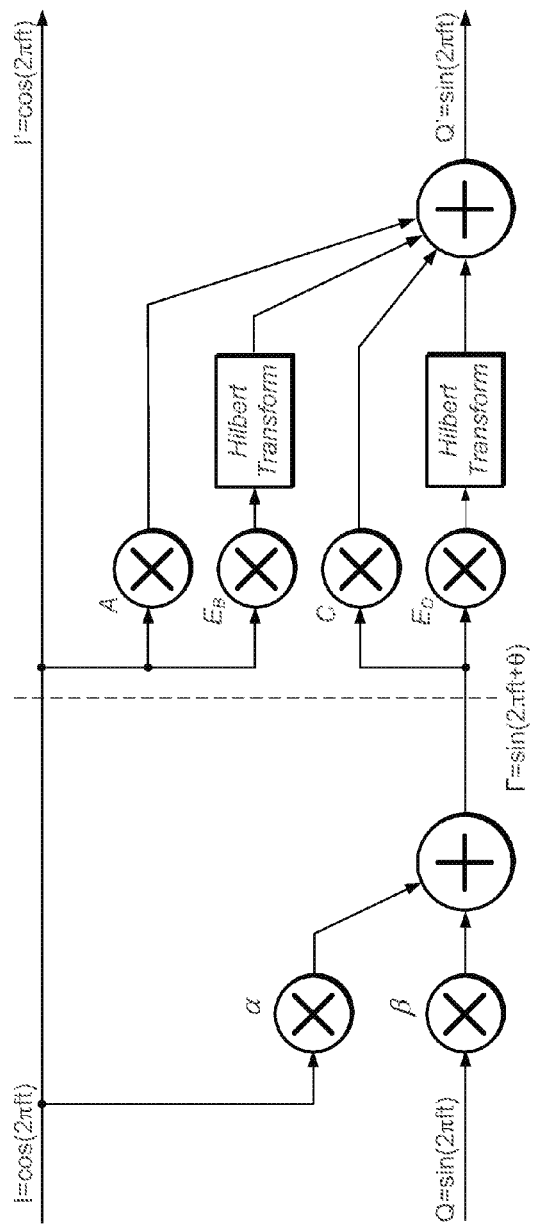
FIG. 53B shows a refinement of FIG. 53A, where the single-point vector calibration correction is determined by constants α and β, and where the double-point vector corruption is determined by constants A, $E_B$, C and $E_D$.

This section shows how to calculate constants for a true single-point calibration that will perfectly pre-correct at a single location (i.e., perfectly pre-compensate for I/Q impairments at a single frequency f) given knowledge of the I/Q impairments at f and −f, as indicated in FIGS. 53A and 53B. The single-point vector calibration correction 5310 precedes a double-point vector corruption model 5320. Thus, a complex exponential tone at frequency f, which is provided as input to the single-point vector calibration correction, is pre-distorted to produce a complex signal $$\cos(2\pi ft) + j\Gamma \sin(2\pi ft + \theta).$$

The pre-distorted signal is further distorted by the corruption model 5320, resulting in a corrected output signal that is equal to the original complex exponential tone.

From the "Corruption I/Q Impairments" section, we know how to develop a 2×2 frequency response matrix H that represents the I/Q impairments of a system. In that section, we found that A(f), $E_B(f)$, C(f) and D(f) are determined by the "double point I/Q impairments", i.e., by the I/Q impairments at f and the I/Q impairments at −f In addition, from the "Adding Constraints" section (i.e., Case 6, where A and C are constants, and $E_B$ and $E_D$ are zero) the structure of the single-point correction is known. Using this information, the true single-point calibration coefficients α and β can be determined.

The goal is to determine the values α and β given the values A(f), $E_B(f)$, C(f) and $E_D(f)$. A(f), $E_B(f)$, C(f) and $E_D(f)$ are known from equations (1.56) through (1.59) given the double-point I/Q impairments, i.e., the gain imbalance values $g_1(f)=g(f)$ and $g_2(f)=g(-f)$ and phase skew values $\phi_1=\phi(f)$ and $\phi_2(f)=\phi(-f)$. The values α and β can be determined from Γ and θ as shown in the following expressions:

$$\alpha = \Gamma \sin(\theta) \quad (1.75)$$

$$\beta = \Gamma \cos(\theta). \quad (1.76)$$

Using the phasor diagram of FIG. 54, sum along the x-axis to obtain equation (1.77), and sum along the y-axis to obtain equation (1.78):

$$C\Gamma \sin(\theta) - E_D \Gamma \cos(\theta) = -A \quad (1.77)$$

$$C\Gamma \cos(\theta) + E_D \Gamma \sin(\theta) = 1 - E_B \quad (1.78)$$

We have relied on the facts that:

$$HT\{\sin(t)\} = -\cos(t),$$

$$HT\{\cos(t)\} = \sin(t),$$

where HT denotes the Hilbert Transform. Equations (1.77) and (1.78) imply:

$$\begin{bmatrix} -E_D & C \\ C & E_D \end{bmatrix} \begin{bmatrix} \Gamma \cos(\theta) \\ \Gamma \sin(\theta) \end{bmatrix} = \begin{bmatrix} -A \\ 1 - E_B \end{bmatrix} \quad (1.79)$$

$$\begin{bmatrix} \Gamma \cos(\theta) \\ \Gamma \sin(\theta) \end{bmatrix} = \frac{1}{C^2 + E_D^2} \begin{bmatrix} -E_D & C \\ C & E_D \end{bmatrix} \begin{bmatrix} -A \\ 1 - E_B \end{bmatrix} \quad (1.80)$$

$$\alpha = \Gamma \sin(\theta) \frac{-AC + E_D(1 - E_B)}{C^2 + E_D^2} \quad (1.81)$$

$$\beta = \Gamma \cos(\theta) = \frac{AE_D + C(1 - E_B)}{C^2 + E_D^2}. \quad (1.82)$$

$$\Gamma = \sqrt{\frac{A^2 + (1 - E_B)^2}{C^2 + E_D^2}} \quad (1.83)$$

$$\theta = \arctan\left(\frac{-AC + E_D(1 - E_B)}{AE_D + C(1 - E_B)}\right). \quad (1.84)$$

While not needed to solve for α and β, solving for Γ and θ tell us the new gain and phase of the waveform needed to exactly cancel the impacts of the I/Q corruption.

It should be noted that the correction coefficients α and β given by (1.81) and (1.82) are generally different from the α and β used in traditional single-point compensation as described in the section "Performing Traditional Impairment Compensation at a Single Frequency". (Thus, the traditional single-point compensation values will generally give less than perfect compensation when used as a pre-compensation, i.e., when used in FIGS. 53A and 53B.) However, there is a special case in which the two coefficient pairs coincide. As explained in the "Corruption I/Q Impairments" section, when the gain imbalance and phase skew functions are even functions, the corruption model values reduce to:

$$A(f) = g(f)\sin(\phi(f))$$

$$E_B(f) = 0$$

$$C(f) = g(f)\cos(\phi(f))$$

$$E_D(f) = 0.$$

Thus, equations (1.81) and (1.82) will specialize to:

$$\alpha = -\tan(\phi(f))$$

$$\beta = 1/\{g(f)\cos(\phi(f))\},$$

which are the same values used by the traditional single-point compensation.

Iterative Technique for Measuring TX Impairments

With reference now to FIG. 55A, the problems of measuring the amplitude response of receive filter 5525 and the I/Q impairments of the receiver is simplified (relative to the corresponding problems for the transmitter) because the I/Q impairments that result from the I/Q demodulator 5530 occur after the distortion effects of the receive filter 5525. For example, if a pure tone is the input signal to the receive path, then the distortion of the receive filter will alter only the magnitude and phase of the single tone. Then this altered pure tone will be distorted by the I/Q demodulator, creating the I/Q impairments. When calibrating the receiver, we can first remove the receiver's I/Q impairments, leaving only the filter's amplitude and phase response effects and then correct for the filter's amplitude and phase distortion in an additional step if desired.

However, this is not the case for the transmitter. Shown in FIG. 55B are is the signal path for the transmitter and receiver in combination. The transmitter includes an I/Q modulator 5510 and a transmit filter 5515. In some embodiments, both the transmit and receive LOs are shared. When the transmitter creates a single tone, the I/Q modulator 5510 introduces transmit I/Q impairments. Then these impairments travel through the transmit signal path, cabling, and the receive signal path before finally reaching the I/Q demodulator. This path between the I/Q modulator output and the I/Q demodulator input corrupt the transmit I/Q impairments measurement taken at the receiver. In addition, the I/Q impairments of the demodulator further corrupt the measurement of the transmitter I/Q impairments taken at the receiver. In alternative embodiments, the receiver may be based on an alternative RF architecture (i.e., other than a direct conversion architecture) such that the I/Q impairments of the receiver are very small, i.e., small enough to neglect.

Shown in FIG. 55C is an example of how the non-flat amplitude response in the signal path corrupts the I/Q impairments seen at the receiver. Coming out of the I/Q modulator are the actual I/Q impairments. Then the transmit signal path corrupts them, followed by a phase rotation due to the electrical delay of the cable, followed by another corruption by the receive signal path. In addition to the amplitude, the phase response (not shown in FIG. 55C) also creates a different but related problem.

Upon initial observation, it would appear that the ideal solution would first characterize the magnitude and phase of the signal path between the I/Q modulator and the I/Q demodulator. Then the effects of the signal path could be removed from the receiver-measured I/Q impairments by using the calculation in the section "Altering Gain Imbalance and Phase Skew through a Filter". However, this is not a reasonable task given the performance requirements for the impairment suppression. In order to achieve image suppression of better than −80 dB, the phase skew would need to be less than 0.01 degrees. Even at lower RF frequencies, this means that the absolute phase must be stable and measureable to better than picosecond accuracy. In addition, the I/Q impairments alter the magnitude and phase of the signal coming out of the modulator as described in the section "Magnitude and Phase Corruption from I/Q Impairments" and expressed in equation (4.9) of FIG. 58A. As a result, the I/Q impairments of the transmitter, the very thing we are trying to measure, would need to be known in order to determine the magnitude and phase response of the signal path.

A better approach to determining the exact I/Q impairments through a signal path is to iterate on the solution. Given a coarse estimate of the amplitude and phase of the signal path and an estimate of the I/Q impairments, the exact I/Q impairments can be determined through enough iterations. (The iterations may be performed using shared LOs or offset LOs, as described in detail below. In the case of shared LOs, the receiver's I/Q impairments need to be known. In the case of offset LOs, the receiver I/Q impairments do not need to be known, although knowing them helps. In both cases, the transmitter's I/Q impairments do not need to be known beforehand. They will be determined as a result of the iterations.) The total number of iterations will depend largely on the initial estimates and the performance criteria. Listed below is a procedure for determining the transmitter's impairments for both shared and offset LOs. This procedure measures all calibration frequency locations within the instantaneous bandwidth and only iterates over these measurements once all measurements for a given instantaneous bandwidth have been completed. Given in the section on Optimizations is a modified procedure that obtains the same result but generally requires fewer iterations.

Iterative Method Steps (Overview):
1. Tune the RX and TX LOs.
2. Measure RX Impairments.
3. Measure the mapping between RX and TX.
4. Apply estimated impairment correction at TX.
5. Generate tone at TX and measure at RX.
6. Remove RX impairments from #5.
7. Remove signal path estimate (e.g., apply the mapping from #3).
8. Combine results from all iterations of #7 to create an updated impairment estimate.
9. If performance metric is acceptable go to #10; else iterate by going to #4.
10. Repeat steps #1 through #9 for each LO frequency.

Iterative Method Steps (Descriptive)
1. Tune the transmit and receive LOs to the first desired LO frequency. If using shared LOs (using the same LO or using two separate LOs that are locked together), the LOs will be at the same frequency. In the case of offset LOs, the LOs are offset from each other by some known exact amount. In either case, ensure that all LOs are phase locked. See the "Restrictions" subsection of the section "Offset LO Method Calibration Method" for more information on selecting a working offset. Also keep in mind the window used in the measurement. If using no window, as is done in the "Rectangle Window Optimization" section, be sure that offset LO value is confined to frequencies given in that section.

2. (Optional when using the offset LO method) Measure the gain imbalance and phase skew of the receiver for each in-band offset frequency at which the transmitter is to be measured. This can be accomplished by using the measurement method prescribed in section "Precise Measurement Technique". Since using offset LOs makes the images appear at different frequencies for receive and transmit, removing the receive impairments is not critical as it is in the case of shared LOs. In all known data sets, this iteration method converges without knowing the receive impairments when the LOs are offset. However, the receive impairments do cause some corruption to the transmit impairments. As a result, if they are too severe they would cause this iteration method to diverge rather than converge even when using offset LOs.

3. Connect the transmitter's output to the receiver's input.

4. (Only for the offset LO method) Frequency shift the receiver's spectrum by an amount equal to the LO offset. For example, if the transmitter's LO is located at 2.400 GHz and the receiver's LO at 2.404 GHz, then shift the spectrum by a positive 4 MHz. The frequency shift must be frequency locked to the LOs or else the rotation estimate made in step 5 will not remain fixed.

5. Determine the rotation and scaling mapping between receive and transmit by using the algorithm in the section "Calculating the Mapping Between and RX and TX". For the best results, apply a tone somewhere in the instantaneous bandwidth as the leakage can be sensitive to in-band power. This mapping should be consistent and repeatable once the LOs are setup. Thus, in at least some embodiments, the LOs are required to be phase locked. The exact LO offset is known when using the offset LO method.

6. If this is the first iteration of #6, do not apply any correction (pass-through) at the transmitter and proceed to #7. Otherwise, apply a correction filter at the transmitter based upon the measurements in #10.

7. Apply a complex exponential tone at the transmitter for each of the desired in-band measurement locations, and determine the raw gain imbalances and phase skews by using the calculation method in the "Precise Measurement Technique" section at each of the frequency offsets.

8. (Optional when using the offset LO method) For each of the measured values in #7, mathematically remove the receiver's gain imbalance and phase skew. This can be done by the calculation described in section "Removing Receiver Impairments from Measured Output Impairments". This places the measurement of the transmitter before the demodulator. In lieu of step #8, another method is to apply a correction filter at the receiver before step #7 by computing the needed correction (from the section "Wideband I/Q Impairment Equalization") and passing the captured waveform through the correction. This method is not as accurate because the correction filter has the potential to not be as accurate as the measurement due to limited filter taps.

9. For each of the calculated values in #8, remove the approximately known rotation, scaling, magnitude, and phase by using the transform described in "Altering the Gain Imbalance and Phase Skew through a Linear System". The rotation and scaling were determined in step #5. After the first iteration, an estimation of the magnitude can also be determined. This places the measurement approximately at the output of the modulator. If the measurement were exactly at the output of the modulator, we would not need this iteration approach. This iterative method is needed because we do not know within the accuracy needed the rotation, scaling, magnitude and phase of the path between the output of the modulator and the input of the demodulator.

10. Combine the results from all iterations of #9 by finding the product of all of the gain imbalances (when using the linear scale) and the sum of all of the phase skews on a per frequency offset and LO combination basis. For example, if measurements were performed at −15 MHz, −5 MHz, 5 MHz, and 15 MHz, then only the measurements taken at −15 MHz are combined together from other iterations. When moving on to another LO in #13, this combination starts over so that the measurements at −15 MHz and LO=2.4 GHz are not combined with measurements at −15 MHz and LO=2.6 GHz)

11. Calculate the image rejection from the gain imbalance and phase skew at each in-band frequency location measured in #9 and calculated by equation 4.15. Determine the worse case image rejection across the band by finding the minimum of all of the image rejection calculations.

12. If the image rejection from #11 meets the required performance metrics, the final gain imbalance and phase skew measurements were those computed in step #10 and no more iterations are required for this LO frequency, otherwise iterate on the solution by going to #6.

13. Repeat steps #1 through #11 for each LO frequency.

In one set of embodiments, the transmitter's I/Q impairments may be estimated according to the method given in Appendix A.

Results

Figure 56A:
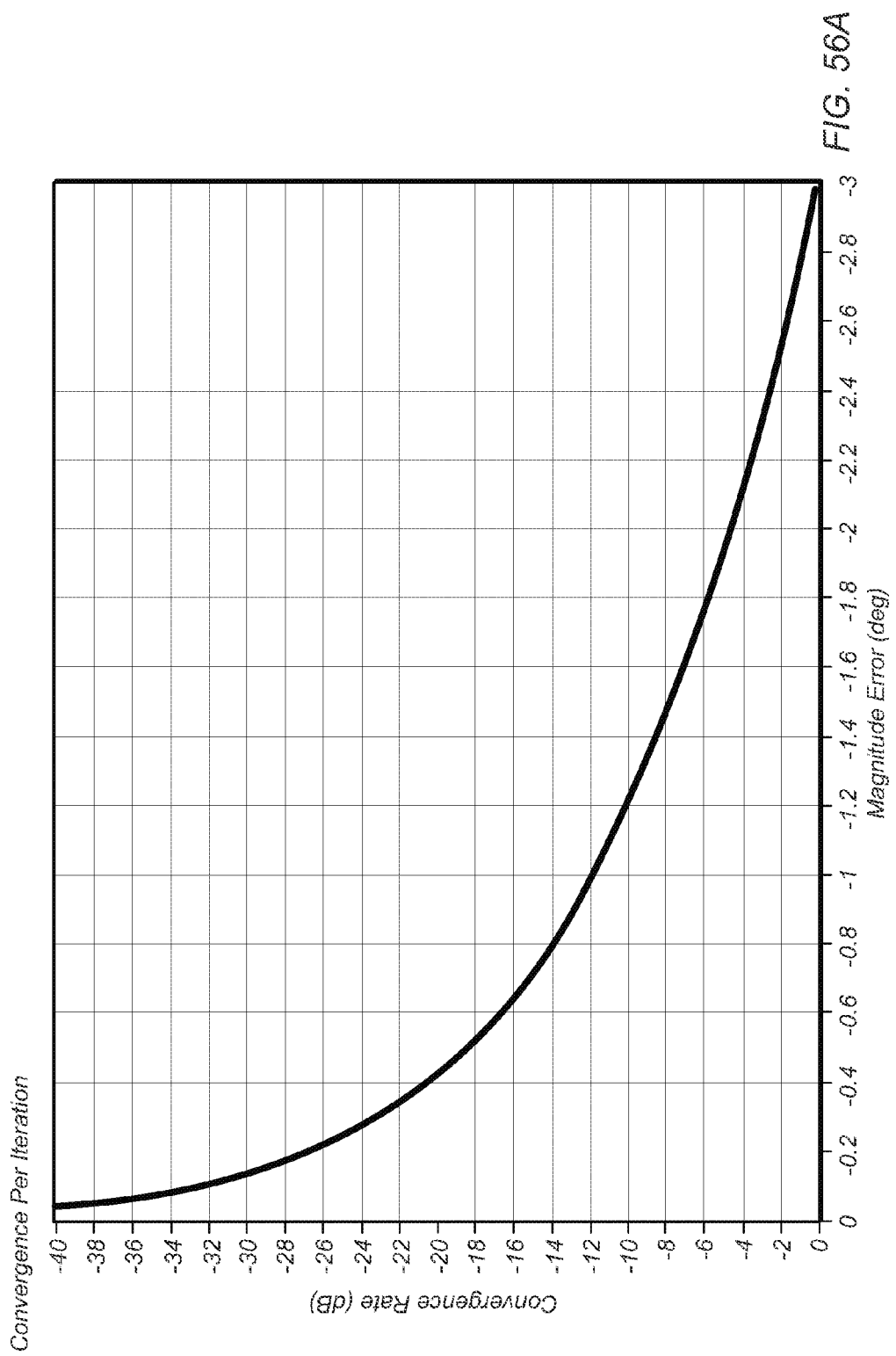
FIG. 56A illustrates convergence rate as a function of magnitude estimation error.
Figure 56B:
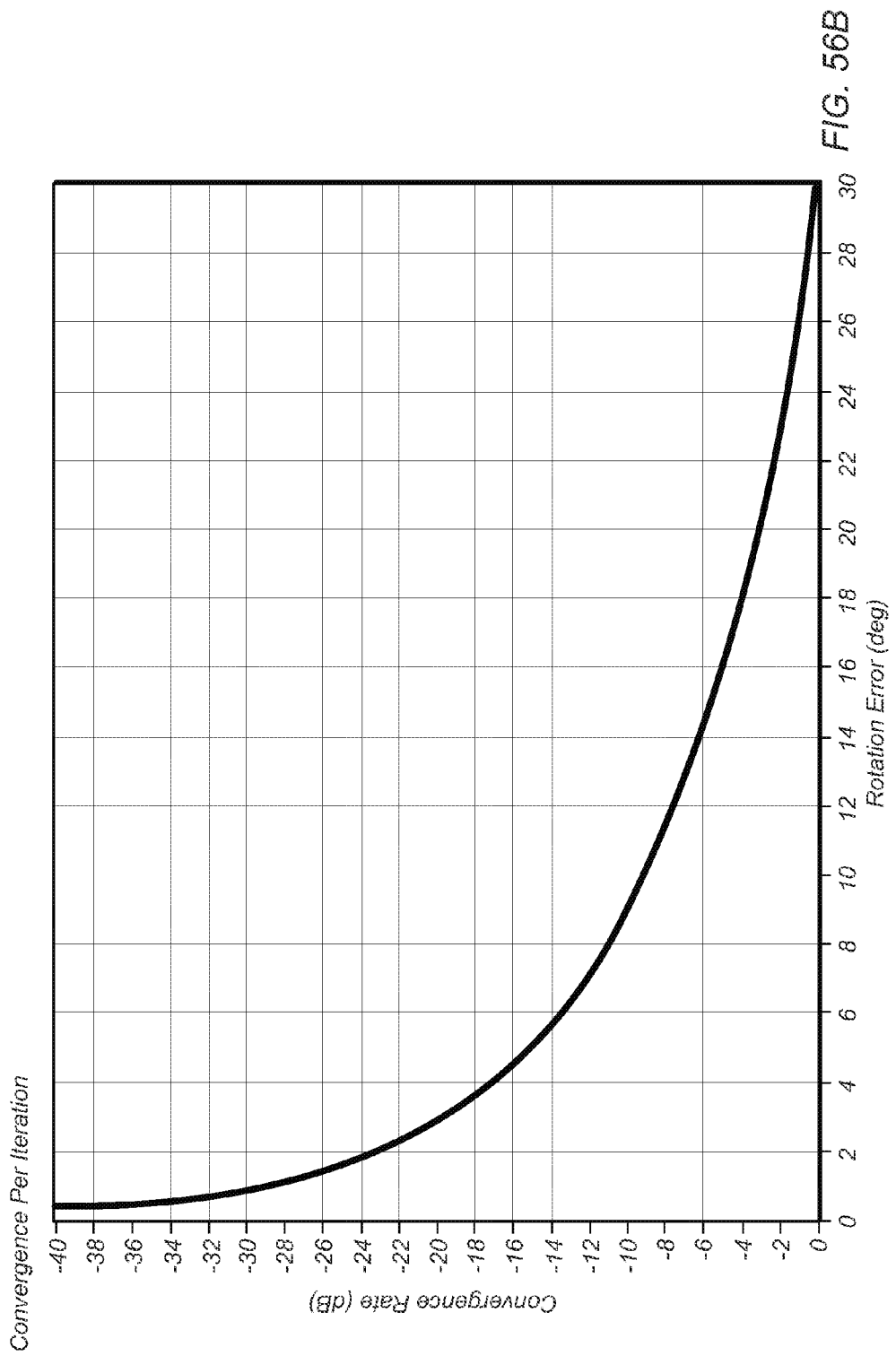
FIG. 56B illustrates convergence rate as a function of rotation (phase) estimation error.

FIGS. 56A and 56B show the improvement (i.e., the rate of convergence) of each iteration according to one embodiment of the iterative method. In at least some embodiments, the iterative method has a convergence interval of [−3 dB, 3 dB] for magnitude and a convergence interval of [−30 degrees, 30 degrees] for phase. In these embodiments, if the magnitude or phase have an error outside of these intervals, the sequence of measurements will diverge. FIGS. 56A and 56B show the convergence per iteration for both a magnitude error and phase error.

Optimizations

This section describes how to optimize the iterative process described above to use less total acquisitions and thus less calibration time. The problem with the iteration process described above is that it takes multiple acquisitions for a single wideband measurement within the instantaneous bandwidth in addition to calculating new filters between iterations. However, the total number of acquisitions can be greatly decreased by using a single point vector calibration to iterate on a single point to determine its actual impairment value. Then by stepping through the band, the previous measurement location of the impairments becomes an estimate for the next measurement location. This works well when the impairments are not changing quickly across the band, thus providing good estimates for actual values nearby.

By adding this optimization, it is advisable to create a frequency plan that is as follows:

$$[\Delta f/2, -\Delta f/2, 2*\Delta f/2, -2*\Delta f/2, 3*\Delta f/2, -3*\Delta f/2, \ldots, N*\Delta f/2, -N*\Delta f/2]$$

for integer N, where $\Delta f$ is the spacing of frequency measurement locations within instantaneous bandwidth. This allows for the maximum benefit of the optimization since it creates the best estimate of the new point to be measured by using its neighbor. Since this method uses a true single-point calibration of the transmitter, it requires information about the impairments at both the tone location and its image. This is the reason for alternating between positive and negative frequencies. This alternating frequency plan is also assumed for the following numbered procedure.

Iterative Method Steps Optimized (Descriptive):

1. Tune the transmit and receive LOs to the first desired LO frequency. If using shared LOs (using the same LO or using two separate LOs that are locked together), the LOs will be at the same frequency. In the case of offset LOs, the LOs are offset from each other by some known exact amount. In either case, ensure that all LOs are phase locked. See the Restrictions section of Offset LO Method Calibration Method for more information on picking a working offset. Also keep in mind the window used in the measurement. If using no window, as is done in the Rectangle Window Optimization section, be sure that offset LO value is confined to frequencies given in that section.

2. (Optional when using the offset LO method) Measure the gain imbalance and phase skew of the receiver for each in-band offset frequency where the transmitter is to be measured. This can be accomplished by using the measurement method prescribed in the section "Precise Measurement Technique". Since using offset LOs makes the images appear at different frequencies for receive and transmit, removing the receive impairments is not critical as it is in the case of shared LOs. In all known data sets, this iteration method converges without knowing the receive impairments when the LOs are offset. However, the receive impairments do cause some corruption to the transmit impairments. As a result, if they are too severe they would cause this iteration method to diverge rather than converge even when using offset LOs.

3. Connect the transmitter's output and receiver's input.

4. (Only for the offset LO method) Frequency shift the receiver's spectrum by an amount equal to the LO offset. For example, if the TX's LO is located at 2.4 GHz and the RX's LO at 2.404 GHz, then shift the spectrum by a positive 4 MHz. The frequency shift is frequency locked to the LOs. (Otherwise, the rotation estimate made in step 5 will not remain fixed.)

5. Determine the rotation and scale mapping between receive and transmit by using the algorithm in "Calculating the Mapping Between and RX and TX". For the best results, apply a tone somewhere in the instantaneous bandwidth as the leakage can be sensitive to in-band power. This mapping should remain consistent and repeatable once the LOs are setup. Thus, in at least some embodiments, the LOs are phase locked. The exact LO offset is known when using the offset LO method.

6. If this is the first iteration of #6 for this particular LO frequency, do not apply any correction at the transmitter (simply pass through) and proceed to #7. Optionally, if this is the first iteration of #6 for this particular LO frequency, apply a tone near 0 Hz in step #5 and use the gain imbalance and phase skew information that was acquired simultaneously with the leakage (0 Hz) information used in the algorithm to create the initial estimate of the impairments for both the tone and image. Otherwise, apply a single point correction at the transmitter based upon the measurements below (assuming the frequency plan provided above) using the calculation found in "Calculating True Single Point Vector Calibration Constants".

a. If this is the first iteration of #6 since #13, the best tone estimate is found in the variable $Previous_Impairments2. Otherwise, the current value of #10 is the best estimate.

b. The best image estimate is found in the variable $Previous_Impairments1.

7. Apply a complex exponential tone at the transmitter for current measurement location, and determine the raw gain imbalance and phase skew by using the calculation method in the section "Precise Measurement Technique" for this particular in-band frequency offset.

8. (Optional when using the offset LO method) For each of the measured values in #7, mathematically remove the receiver's gain imbalance and phase skew. This can be accomplished by the calculation described in the section "Removing Receiver Impairments from Measured Output Impairments". This places the measurement of the transmitter before the demodulator. In lieu of step #8, another method is to apply a correction filter at the receiver before step #7 by computing the needed correction (from section "Wideband I/Q Impairment Equalization") and passing the captured waveform through the correction. This method is not as accurate because the correction filter has the potential to not be as accurate as the measurement due to limited filter taps.

9. Remove the approximately known rotation, scaling, magnitude, and phase from #8 by using the transform described in "Altering the Gain Imbalance and Phase Skew through a Linear System". The rotation and scaling were determined in step #5. A good estimation of the magnitude can be found by using its neighbor's magnitude in the same way that a good estimation of the impairments are found in step #6. This places the measurement approximately at the output of the modulator. If the measurement were exactly at the output of the modulator, we would not need this iteration approach. This iterative method is needed because we do not know within the accuracy needed the rotation, scaling, magnitude and phase of the path between the output of the modulator and the input of the demodulator.

10. Combine the results from all iterations of #9 and the variable $Previous_Impairments2 by finding the product of all of the gain imbalances (when using the linear scale) and the sum of all of the phase skews on a per frequency offset and LO combination basis. For example, if measurements were performed at −15 MHz, −5 MHz, 5 MHz, and 15 MHz, then only the measurements taken at −15 MHz are combined together from other iterations. When moving on to another LO in #13, this combination starts over so that the measurements at −15 MHz and LO=2.4 GHz are not combined with measurements at −15 MHz and LO=2.6 GHz)

11. Calculate the image rejection by using the gain imbalance and phase skew information from #9 and equation 4.15.

12. If the image rejection from #11 meets the required performance metrics, the final gain imbalance and phase skew measurements for the current measurement location are those computed in step #10 and no more iterations are required for this in-band frequency and LO frequency combination. As a result, advance to #13 and save the value in the variable $Previous_Impairments1 into $Previous_Impairments2, and store the current measurements in a variable, $Previous_Impairments1. Otherwise iterate on the solution by going to #6.

13. Repeat steps #6 through #12 for each in-band frequency measurement location.

14. Repeat steps #1 through #13 for each LO frequency and clear all variables.

In some embodiments, the transmitter's I/Q impairments may be estimated using offset LOs as described in Appendix B.

In other embodiments, the transmitter's I/Q impairments may be estimated using shared LOs as described in Appendix C.

Magnitude and Phase Corruption from I/Q Impairments

This section derives various equations useful for understanding how I/Q impairments corrupt the magnitude and phase of a signal. We will see that a signal s(f,t) of the form $$s(f,t)=\cos(2\pi f t)+jg(f)\sin(2\pi f t+\phi(f))$$

includes a tone at frequency f and an image at frequency −f. FIG. 57 provides notation for the amplitudes of the tone and image. The derivation, including equations (4.8) through (4.21), is given in FIGS. 58A and 58B. Equation (4.11) specifies the amplitude of the tone as the result of the I/Q impairments. Notice that if the gain imbalance is equal to one and the phase skew is equal to zero, then there is no change in the tone's amplitude. Additionally, once the impairments are known, the image rejection can be directly calculated by using equation (4.15).

Precise Measurement Technique

This section describes a method for measuring magnitude, phase, leakage, gain imbalance, and phase skew accurately and quickly. In addition to measurement quality and speed, the method also lends itself well to an FPGA implementation for an even greater computational speedup.

This method is a stimulus/response method that injects a known signal at the input and then measures the output. Specifically, the stimulus is a pure complex exponential with a frequency equal to the frequency location for the desired measurements. In some embodiments, this complex exponential is generated by a calibration synthesizer or by the transmitter looped back into the receiver. For each frequency of the complex exponential, the response is digitized and processed in order to determine corresponding measurements. The rest of this section discusses how the digitized response data is processed to give the measurements of interest.

When this processing is thought of in the time domain, the basic idea is to mix each of the signals to DC and then employ averaging to get a precise result. In the frequency domain, this can be thought of as the calculation of a few single-point windowed Discrete-Time Fourier Transforms. This explanation and derivation will assume the use of a rectangle window (with a width equal to the acquisition length) before computing the DTFT. Windowing and its effects are discussed in great detail in the next section, "Rectangle Window Optimization".

Equation 6.1 describes the expected form of the analog response. This form assumes the stimulus is a complex exponential at a known frequency f. Equation 6.3 defines a DTFT that has infinite support, and as a result, is not realizable for actual computations. Equation 6.4 gives the DTFT with finite support by using a rectangle window. The value w represents the normalized digitized frequency on the interval [−π,π]. The conversion from f to w is given by: w=2πf/SampleRate.

Measuring the leakage of the signal does not require shifting and requires just averaging since its spectral components are already located at 0 Hz. In order to measure the magnitude and phase of a given tone, first mix the complex tone down to 0 Hz by multiplying by a complex exponential with a frequency equal and opposite to the tone frequency. Then average the result over the acquisition length. This again is equivalent to taking a single-point DTFT at the frequency of interest for the complex input signal.

$$s(t, f) = I(t, f) + jQ(t, f) = \qquad (6.1)$$
$$m(f)\exp(j\theta(f))\{\cos(2\pi f t) + jg(f)\sin(2\pi f t + \varphi(f))\}$$

-continued $$s[n] = \text{ADC\_Sampling}(s(t, f)) \tag{6.2}$$

$$S(w) = DTFT\{s[n]\} = \sum_{n=-\infty}^{\infty} s[n]\exp(-jwn) \tag{6.3}$$

$$W(w) = DTFT\{\text{Window}(s[n])\} = \frac{1}{N}\sum_{n=0}^{N-1} s[n]\exp(-jwn) \tag{6.4}$$

$$\text{Leakage} = W(0) = \text{Average}\{s[n]\} = \frac{1}{N}\sum_{n=0}^{N-1} s[n] \tag{6.5}$$

$$\text{Magnitude}\{s[w]\} = |W(w)| = \left|\frac{1}{N}\sum_{n=0}^{N-1} s[n]\exp(-jwn)\right| \tag{6.6}$$

$$A_I = \text{Re}(Avg\{s[n]\exp(-jwn)\}) \tag{6.6B}$$

$$A_Q = \text{Im}(Avg\{s[n]\exp(-jwn)\}) \tag{6.6C}$$

$$\text{Magnitude}\{s[w]\} = \sqrt{A_I^2 + A_Q^2} \tag{6.6D}$$

$$\text{Phase}\{s[w]\} = \tan^{-1}\left(\frac{A_Q}{A_I}\right). \tag{6.7}$$

Alternatively, the phase of $\{s[n]\}$ may be computed according to the expression:

$$\text{Phase}\{s[w]\} = \tan^{-1}\frac{\text{Im}\{\text{Sum}(s[n]\exp(-jwn))\}}{\text{Re}\{\text{Sum}(s[n]\exp(-jwn))\}}. \tag{6.7B}$$

Computing the gain imbalance and phase skew involves finding the magnitude and phase of the I and Q signals independently. For example, in FIG. 59, the "Q actual" signal is a 26 MHz signal with a 0.6 gain imbalance and 20 degree phase skew compared to the in-phase signal (i.e., the "I Reference" signal). However, the "Q Desired" trace gives the ideal quadrature signal, which is 90 degrees offset from the in-phase signal. By measuring the magnitude and phase of the in-phase component ("I Reference"), the ideal quadrature signal can be determined by its orthogonality relative to the in-phase component. Then by knowing the actual magnitude and phase of the quadrature signal ("Q Actual"), the difference between ideal quadrature signal and the actual quadrature signal can be determined.

Figure 60:
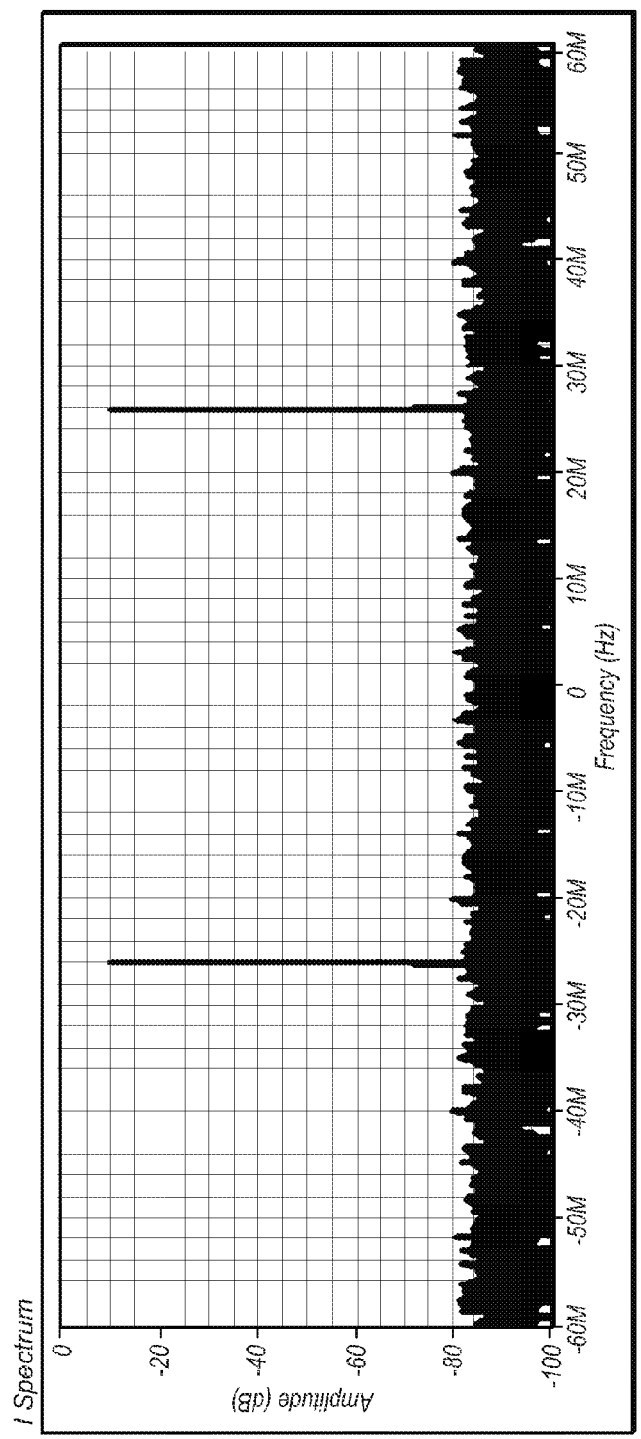
FIGS. 60 and 61 show the magnitude spectra for the in-phase and quadrature signal components, i.e., for the "I Reference" signal and "Q actual" signal of FIG. 59.
Figure 61:
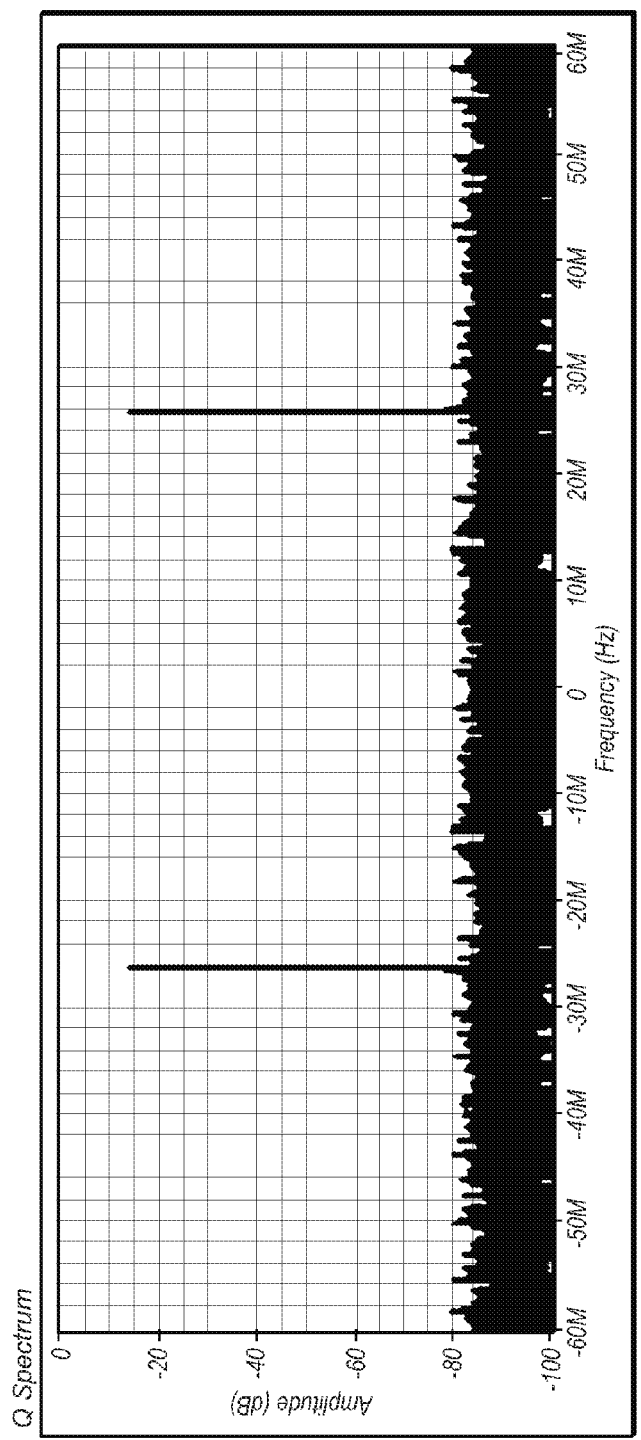

Shown in FIGS. 60 and 61 are the magnitudes for the in-phase and quadrature phase signal components, i.e., for the "I Reference" signal and "Q actual signal" in FIG. 59. Since each component of the complex signal s(t) is a real-valued signal, it is expected to have a symmetric magnitude response. In order to find the gain imbalance g(f), determine the gain of each signal component at the frequency location of the tone, and then divide the Q gain by the I gain as given in equation 6.12.

Equations 6.8 through 6.11 show how to compute the magnitude and phase of each component. Following the convention of assuming the in-phase signal is perfect and the quadrature phase signal contains all of the impairments, the impairments are computed relative to the in-phase signal reference. (Other conventions are possible, as described variously above. For example, the quadrature signal could just as well have been chosen as the reference.) As a result, the magnitude and phase are computed for each of the I signal and the Q signal by finding the single point DTFT. Then these magnitudes and phases are combined together by equations 6.12 and 6.13 in order to determine the gain imbalance and phase skew of the quadrature signal component.

In the equations below, I(n,w) is the sampled version of I(t,w), and Q(n,w) is the sampled version of Q(t,w).

$$\|I(w)\| = |Avg\{I(n, w)\exp(-jwn)\}| \tag{6.8}$$

$$\text{Phase}\{I(w)\} = \tan^{-1}\left(\frac{\text{Im}\{Avg(I(n, w)\exp(-jwn))\}}{\text{Re}\{Avg(I(n, w)\exp(-jwn))\}}\right) \tag{6.9}$$

$$\|Q(w)\| = |Avg\{Q(n, w)\exp(-jwn)\}| \tag{6.10}$$

$$\text{Phase}\{Q(w)\} = \tan^{-1}\left(\frac{\text{Im}\{Avg(Q(n, w)\exp(-jwn))\}}{\text{Re}\{Avg(Q(n, w)\exp(-jwn))\}}\right) \tag{6.11}$$

$$g(w) = \frac{\|Q(w)\|}{\|I(w)\|} \tag{6.12}$$

$$\varphi(w) = \text{Phase}\{Q(w)\} - \text{Phase}\{I(w)\} + \pi/2. \tag{6.13}$$

In an alternative embodiment, $\|I(w)\|$, Phase $\{I(w)\}$, $\|Q(w)\|$ and Phase $\{Q(w)\}$ may be calculated as follows:

$$\|I(w)\| = |\text{Sum}\{I(n, w)\exp(-jwn)\}|/N. \tag{6.8}$$

$$\text{Phase}\{I(w)\} = \tan^{-1}\left(\frac{\text{Im}\{\text{Sum}(I(n, w)\exp(-jwn))\}}{\text{Re}\{\text{Sum}(I(n, w)\exp(-jwn))\}}\right) \tag{6.9}$$

$$\|Q(w)\| = |\text{Sum}\{Q(n, W)\exp(-jwn)\}|/N \tag{6.10}$$

$$\text{Phase}\{Q(w)\} = \tan^{-1}\left(\frac{\text{Im}\{\text{sum}(Q(n, w)\exp(-jwn))\}}{\text{Re}\{\text{Sum}(Q(n, w)\exp(-jwn))\}}\right), \tag{6.11}$$

where N is the acquisition size.

Figure 62:
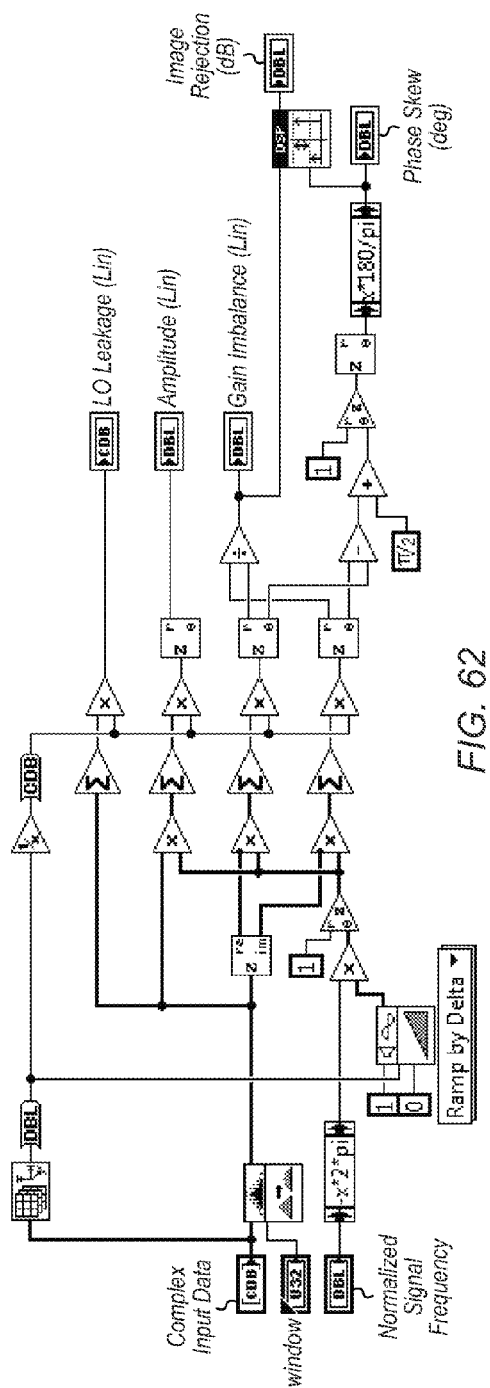
FIG. 62 illustrates a LabVIEW graphical program for computing local oscillator leakage, signal amplitude, gain imbalance, image rejection and phase skew, according to one embodiment.

FIG. 62 illustrates a software embodiment (written in the LabVIEW graphical programming language) for calculating LO Leakage, Amplitude, Gain Imbalance, Image Rejection and Phase Skew.

In some embodiments, the computations of $$\text{Sum}\{Re(Q(n,w)\exp(-jwn))\}$$

$$\text{Sum}\{Im(Q(n,w)\exp(-jwn))\}$$

$$\text{Sum}\{Re(s[n])\}$$

$$\text{Sum}\{Im(s[n])\}$$

are performed by a programmable hardware element (e.g., an FPGA of the receiver).

Figure 63:
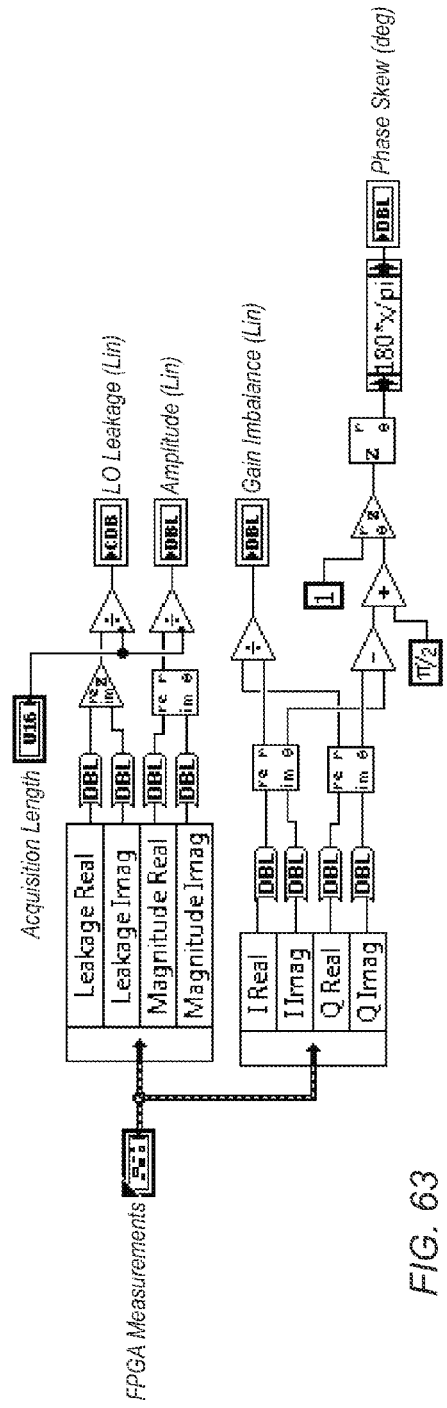
FIG. 63 illustrates shows a LabVIEW graphical program (VI) that receives data computed by a programmable hardware element (e.g., an FPGA of a receiver), and computes LO Leakage, amplitude gain imbalance and phase skew from that data.

FIG. 63 shows a LabVIEW graphical program (VI) that receives the summation values computed by the FPGA, and computes LO Leakage, amplitude, gain imbalance and phase skew based on those summation values and the acquisition length. (Any of the various computer systems described herein may include software infrastructure for executing computer programs including, e.g., LabVIEW graphical programs.)

Rectangle Window Optimization

In some embodiments, a non-rectangular window may be applied to the complex digital signal $\{s[n]\}$. Any of various standard window types may be used. In other embodiments, no window is explicitly applied to the complex digital signal. However, by performing computations only over a finite acquisition interval, a rectangle window is implicitly being applied. If we place frequency-planning restrictions on the placement of tones in the spectrum or judge the calculated measurement error to be acceptable, no window needs to be explicitly applied to the complex digital signal. (Thus, we can avoid the memory required for storing the window values, minimizing the hardware utilization.) Otherwise, a window should be used to make the measurements. This section will discuss the derivation for the frequency plan restrictions and the measurement error that results if the restricted frequency plan is not used when using no window.

The following is the derivation for a rectangular window (i.e., no explicit window). Just for reference, equation 5.9 is the equation for the standard DTFT and equation 5.12 gives the closed form solution for a finite geometric series. A rectangle window is defined as unity over a finite interval and zero elsewhere. As a result, its DTFT is given by 5.11. Using the geometric identity of equation 5.12, the DTFT of the window can be simplified to equation 5.13. Finally, since the first term of the final expression of 5.13 has unit magnitude, the log magnitude is given by equation 5.14.

$$X(w) = DTFT\{x[n]\} = \sum_{n=-\infty}^{\infty} x[n]\exp(-jwn) \quad (5.9)$$

$$rect[n] = \begin{cases} 1 & \text{if } 0 \le n \le M-1 \\ 0 & \text{otherwise} \end{cases} \quad (5.10)$$

$$RECT(w) = \sum_{n=0}^{M-1} \exp(-jwn) \quad (5.11)$$

$$\sum_{n=0}^{M-1} a^n = \frac{1-a^M}{1-a} \text{ for } a \ne 1 \quad (5.12)$$

$$RECT(w) = \quad (5.13)$$
$$\sum_{n=0}^{M-1} \exp(-jwn) = \frac{1-\exp(-jwM)}{1-\exp(-jw)} = \left[\frac{\exp(-jwM/2)}{\exp(-jw/2)}\right]\left[\frac{\sin(wM/2)}{\sin(w/2)}\right]$$

$$|RECT(w)| = 20\log\left(\frac{\sin(wM/2)}{\sin(w/2)}\right) \quad (5.14)$$

Note that for a pure tone, the nulls in the spectrum of the windowed tone will occur at

*Ftone+/−N\*SampleRate/AcqLength,*

Ftone is the tone frequency, and AcqLength is the number of samples in the acquisition of the complex digital signal, and SampleRate is the rate at which the samples of the complex digital signal are acquired. Also note that for the image rejection calculation, if we make sure that all generated tones exist only at multiples of SampleRate/AcqLength, then there won't be any spectral leakage effects in the measurement.

Figure 64:
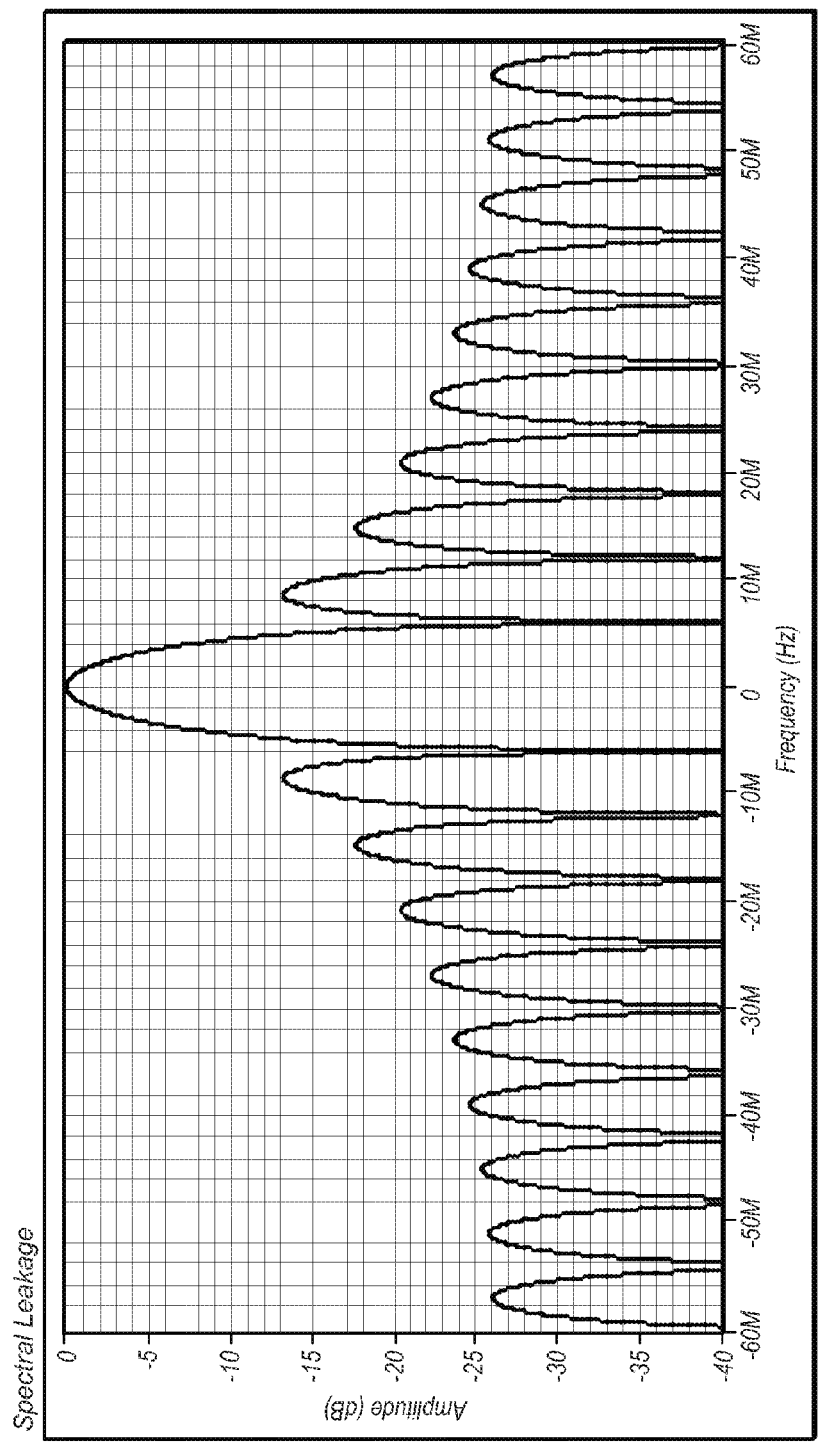
FIGS. 64 and 65 show plots of the amplitude spectrum of a rectangular window function with different acquisition lengths and with a common sample rate of 120 MHz.
Figure 65:
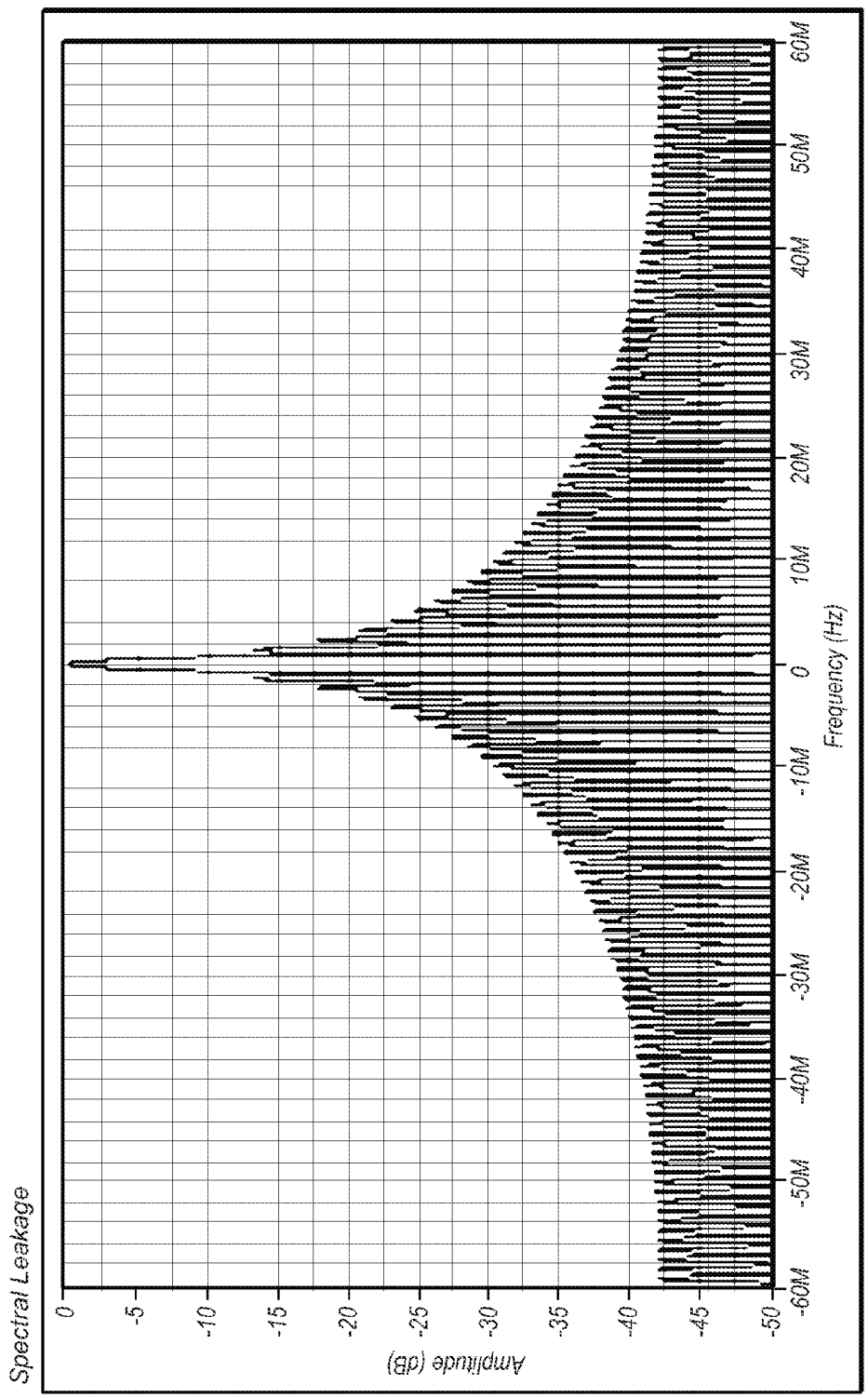

FIGS. 64-65 show two respective plots of the amplitude spectrum |RECT(w)| with a common sample rate of 120 MHz and with different acquisition lengths. The first plot (FIG. 64) corresponds to an acquisition length of 20. The second plot (FIG. 65) corresponds to an acquisition length of 128.

Generalized Derivation

Given the system model of FIG. 66, we can derive the function forms for frequency responses $U(\omega)$ and $V(\omega)$ from the input I/Q impairments $g_{in}(\omega)$ and $\phi_{in}(\omega)$ and the output I/Q impairments $g_{out}(\omega)$ and $\omega_{out}(\omega)$. Furthermore, we can derive the output impairments from the frequency responses $U(\omega)$ and $V(\omega)$ and the input I/Q impairments. Both derivations rely on the following preliminaries. The system model implies:

$$u(t)*\cos(\omega t)-v(t)*g_{in}(\omega)\sin(\omega t+\phi_{in}(\omega))=g_{out}(\omega)\sin(\omega t+\phi_{out}(\omega)), \quad (7.5)$$

where u(t) and v(t) are the impulses responses corresponding to $U(\omega)$ and $V(\omega)$ respectively.

Using standard identities for the cosine and sine functions, we obtain:

$$U(\omega)\exp(j\omega t)/2 + U(-\omega)\exp(-j\omega t)/2 + \quad (7.6)$$
$$V(\omega)g_{in}(\omega)\exp\{j(\omega t + \varphi_{in}(\omega))\}/2j -$$
$$V(-\omega)g_{in}(\omega)\exp\{-j(\omega t + \varphi_{in}(\omega))\}/2j =$$
$$g_{out}(\omega)\exp\{j(\omega t + \varphi_{out}(\omega))\}/2j - g_{out}(\omega)\exp\{-j(\omega t + \varphi_{out}(\omega))\}/2j.$$

Collecting the coefficients of terms in exp(j wt) and separately the coefficients of the terms in exp(−jωt) gives the following two equations:

$$jU(\omega)+V(\omega)g_{in}(\omega)\exp(j\phi_{in}(\omega))=g_{out}(\omega)\exp(j\phi_{out}(\omega)) \quad (7.7)$$

$$jU(-\omega)-V(-\omega)g_{is}(\omega)\exp(-j\phi_{in}(\omega))=-g_{out}(\omega)\exp(-j\phi_{out}(\omega)). \quad (7.8a)$$

However, equation (7.8a) applies for all ω. So we can substitute −ω for ω, and obtain:

$$jU(\omega)-V(\omega)g_{in}(-\omega)\exp(-j\phi_{in}(-\omega))=-g_{out}(-\omega)\exp(j\phi_{out}(-\omega)). \quad (7.8b)$$

Equations (7.7) and (7.8b) define a 2×2 matrix equation in vector unknown $[U(\omega),V(\omega)]^T$, whose solution is given by equations (7.9) and (7.10) in FIG. 67.

Now, given the input impairments and the frequency response of the filters $U(\omega)$ and $V(\omega)$, we derive the output impairments. It may appear from equations (7.7) and (7.8a) that calculating the output impairments is not possible because the problem is over determined. However, since $U(\omega)$ and $V(\omega)$ are both real-valued filters, there is a direct relationship between their positive and negative frequency responses, i.e., $U(-f)=U^*(f)$ and $V(-f)=V^*(f)$. Therefore, $$g_{out}(\omega)=\text{Magnitude}\{jU(\omega)+V(\omega)g_{in}(\omega)\exp(j\phi_{in}(\omega))\} \quad (7.11)$$

$$\phi_{out}(\omega)=\text{Phase}\{jU(\omega)+V(\omega)g_{in}(\omega)\exp(j\phi_{in}(\omega))\}. \quad (7.12)$$

Removing Receiver Impairments from Measured Output Impairments

In this section, we derive a method for computing the input impairments $g_{in}(f)$ and $\phi_{in}(f)$ of a system given the output impairments $g_{out}(f)$ and $\phi_{out}(f)$ and the system-intrinsic impairments $g_{sys}(f)$ and $\phi_{sys}(f)$. This method may be applied to remove the receiver-intrinsic impairments from the measured impairments at the output of the receiver (e.g., the output of the I/Q demodulator) in order to determine the impairments at the input of the receiver (e.g., the input of the I/Q demodulator). Given the frequency responses U(f) and V(f) and the output impairments $g_{out}(f)$ and $\phi_{out}(f)$ for the system model of FIG. 66, we can compute the input impairments $g_{in}(f)$ and $\phi_{out}(f)$ starting from equation (7.7), which is copied here in terms of frequency f instead of ω:

$$jU(f)+V(f)g_{in}(f)\exp(j\phi_{in}(f))=g_{out}(f)\exp(j\phi_{out}(f)) \quad (7.13)$$

$$g_{in}(f)\exp(j\phi_{in}(f))=\{-jU(f)+g_{out}(f)\exp(j\phi_{out}(f))\}/V(f). \quad (7.14)$$

If we define $$Z_{in}(f)=g_{in}(f)\exp(j\phi_{in}(f)) \text{ and} \quad (7.15)$$

$$Z_{out}(f)=g_{out}(f)\exp(j\phi_{out}(f)), \quad (7.16)$$

equation (7.14) can be more compactly expressed as:

$$Z_{in}(f)=\{-jU(f)+Z_{out}(f)\}/V(f). \quad (7.17)$$

We can determine U(f) and V(f) from equations (7.9) and (7.10) of FIG. 67 by using the special assumptions that $g_{in}(f)$ is identically equal one, $\phi_{in}(f)$ is identically equal to zero, $g_{out}(f)$ equals the gain imbalance $g_{sys}(f)$ of the system, and $\phi_{out}(f)$ equals the phase skew $\phi_{sys}(f)$ of the system. Under these special assumptions, equations (7.9) and (7.10) specialize to:

$$U(f)=(j/2)\{g_{sys}(-f)\exp(-j\phi_{sys}(-f))-g_{sys}(f)\exp(j\phi_{sys}(f))\} \quad (7.18)$$

$$V(f)=(\tfrac{1}{2})\{g_{sys}(f)\exp(j\phi_{sys}(f))+g_{sys}(-f)\exp(-j\phi_{sys}(-f))\}. \quad (7.19)$$

If we define $$Z_{sys}(f)=g_{sys}(f)\exp(j\phi_{sys}(f)), \quad (7.20)$$

equations (7.15) and (7.16) can be expressed as:

$$U(f)=(j/2)\{Z_{sys}(-f)^*-Z_{sys}(f)\} \quad (7.21)$$

$$V(f)=(\tfrac{1}{2})\{Z_{sys}(f)+Z_{sys}(-f)^*\}. \quad (7.22)$$

By substituting these expressions into equation (7.17), we obtain:

$$Z_{in}(f) = \frac{2Z_{out}(f) + Z^*_{sys}(-f) - Z_{sys}(f)}{Z_{sys}(f) + Z^*_{sys}(-f)}. \quad (7.23)$$

$$g_{in}(f) = \left|\frac{2Z_{out}(f) + Z^*_{sys}(-f) - Z_{sys}(f)}{Z_{sys}(f) + Z^*_{sys}(-f)}\right|. \quad (7.24)$$

$$\varphi_{in}(f) = \text{Phase}\left\{\frac{2Z_{out}(f) + Z^*_{sys}(-f) - Z_{sys}(f)}{Z_{sys}(f) + Z^*_{sys}(-f)}\right\}. \quad (7.25)$$

This calculation method specified by equations (7.23) through (7.25) may be applied to remove the receiver-intrinsic impairments $g_{RX}(f)$ and $\phi_{RX}(f)$ from the measured impairments $g_M(f)$ and $\phi_M(f)$ at the output of the receiver (e.g., the output of the I/Q demodulator) in order to obtain the impairments $g_{in}(f)$ and $\phi_{in}(f)$ at the input of the receiver (e.g., the input of the I/Q demodulator) as follows:

$$Z_{in}(f) = \frac{2Z_M(f) + Z^*_{RX}(-f) - Z_{RX}(f)}{Z_{RX}(f) + Z^*_{RX}(-f)}. \quad (7.26)$$

$$g_{in}(f) = \left|\frac{2Z_M(f) + Z^*_{RX}(-f) - Z_{RX}(f)}{Z_{RX}(f) + Z^*_{RX}(-f)}\right|. \quad (7.27)$$

$$\varphi_{in}(f) = \text{Phase}\left\{\frac{2Z_M(f) + Z^*_{RX}(-f) - Z_{RX}(f)}{Z_{RX}(f) + Z^*_{RX}(-f)}\right\}. \quad (7.28)$$

Additional embodiments are disclosed in the following numbered paragraphs.

1. A method for operating a receiver, the method comprising:

receiving an analog input signal from a communication medium;

performing I/Q demodulation on the analog input signal to produce an analog inphase signal and an analog quadrature signal;

digitizing the analog inphase signal and the analog quadrature signal to produce respectively a digital inphase signal I(n) and a digital quadrature signal Q(n);

transforming the digital inphase signal I(n) and the digital quadrature signal Q(n) to produce a resultant digital inphase signal $I_R(n)$ and a resultant digital quadrature signal $Q_R(n)$ in accordance with the expressions:

$$I_R(n)=I(n),$$

$$Q_R(n)=a*I(n)+HT\{b*I(n)\}+c*Q(n)+HT\{d*Q(n)\},$$

where HT denotes the Hilbert Transform, where the coefficients a, b, c and d are computed to achieve at least partial compensation for I/Q impairments of the receiver at a frequency f and at frequency −f, where each of the coefficients is computed based on measured I/Q impairments of the receiver at frequency f and measured I/Q impairments of the receiver at frequency −f.

1B. The method of paragraph 1, where, as an alternative to the expressions given above, the resultant digital inphase signal IR(n) and the resultant digital quadrature signal QR(n) are transformed in accordance with the expressions:

$$I_R(n)=a*I(n)+HT\{b*I(n)\}+c*Q(n)+HT\{d*Q(n)\},$$

$$Q_R(n)=Q(n).$$

2. The method of paragraph 1, where the analog input signal is a pure tone.

3. The method of paragraph 1, where the analog input signal is a communication signal that carries a stream of binary information.

4. A receiver comprising:

an I/Q demodulator configured to receive an analog input signal, and perform I/Q demodulation on the analog input signal to produce an analog inphase signal and an analog quadrature signal;

a digitization unit configure to digitize the analog inphase signal and the analog quadrature signal to produce respectively a digital inphase signal I(n) and a digital quadrature signal Q(n);

a digital circuit configured to transform the digital inphase signal I(n) and the digital quadrature signal Q(n) to produce a resultant digital inphase signal $I_R(n)$ and a resultant digital quadrature signal $Q_R(n)$ in accordance with the expressions:

$$I_R(n)=I(n),$$

$$Q_R(n)=a*I(n)+HT\{b*I(n)\}+c*Q(n)+HT\{d*Q(n)\},$$

where HT denotes the Hilbert Transform, where the coefficients a, b, c and d are computed to at least partially compensate for I/Q impairments of the receiver at a frequency f and at frequency −f, where each of the coefficients is computed based on measured I/Q impairments of the receiver at frequency f and measured I/Q impairments of the receiver at frequency −f.

4B. The receiver of paragraph 4, where, as an alternative to the expressions given above, the resultant digital inphase signal $I_R(n)$ and the resultant digital quadrature signal $Q_R(n)$ are transformed in accordance with the expressions:

$$I_R(n)=a*I(n)+HT\{b*I(n)\}+c*Q(n)+HT\{d*Q(n)\},$$

$$Q_R(n)=Q(n).$$

5. The receiver of paragraph 4, where the analog input signal is a pure tone.

6. The receiver of paragraph 4, where the analog input signal is a communication signal that carries a stream of binary information.

7. A method for operating a transmitter, the method comprising:

receiving a digital inphase signal I(n) and a digital quadrature signal Q(n);

transforming the digital inphase signal I(n) and the digital quadrature signal Q(n) to obtain a resultant digital inphase signal $I_R(n)$ and a resultant digital quadrature signal $Q_R(n)$ in accordance the expressions:

$$I_R(n)=I(n),$$

$$Q_R(n)=a*I(n)+HT\{b*I(n)\}+c*Q(n)+HT\{d*Q(n)\},$$

where HT denotes the Hilbert Transform, where the coefficients a, b, c and d are computed to at least partially precompensate for I/Q impairments of the transmitter at frequency f and frequency −f, where each of the coefficients is computed based on an estimate of the I/Q impairments of the transmitter at frequency f and an estimate of the I/Q impairments of the transmitter at frequency −f.

converting the resultant digital inphase signal $I_R(n)$ and the resultant digital quadrature signal QR(n) to analog form in order to obtain respectively an analog I signal and an analog Q signal;

performing I/Q modulation on the analog I and Q signals to produce a modulated analog signal.

7B. The method of paragraph 7, where, as an alternative to the expressions given above, the resultant digital inphase signal $I_R(n)$ and the resultant digital quadrature signal $Q_R(n)$ are transformed in accordance with the expressions:

$$I_R(n)=a*I(n)+HT\{b*I(n)\}+c*Q(n)+HT\{d*Q(n)\},$$

$$Q_R(n)=Q(n).$$

8. The method of paragraph 7, where the digital inphase signal and the digital quadrature signal represent a complex exponential tone at frequency f.

9. The method of paragraph 7, where the digital inphase signal and the digital quadrature signal carry respective streams of binary information.

10. A transmitter comprising:

a digital circuit configured to receive a digital inphase signal I(n) and a digital quadrature signal Q(n), and transform the digital inphase signal I(n) and the digital quadrature signal Q(n) to obtain a resultant digital inphase signal $I_R(n)$ and a resultant digital quadrature signal $Q_R(n)$ in accordance with the expressions:

$$I_R(n)=I(n),$$

$$Q_R(n)=a*I(n)+HT\{b*I(n)\}+c*Q(n)+HT\{d*Q(n)\},$$

where HT denotes the Hilbert Transform, where the coefficients a, b, c and d are computed to at least partially precompensate for I/Q impairments of the transmitter at frequency f and frequency −f, where each of the coefficients is computed based on an estimate of the I/Q impairments of the transmitter at frequency f and an estimate of the I/Q impairments of the transmitter at frequency −f;

a digital-to-analog conversion (DAC) unit configured to convert the resultant digital inphase signal and the resultant digital quadrature signal to analog form in order to obtain respectively an analog I signal and an analog Q signal;

an I/Q modulator configured to perform I/Q modulation on the analog I and Q signals to produce a modulated analog signal.

10B. The transmitter of paragraph 10, where, as an alternative to the expressions given above, the resultant digital inphase signal $I_R(n)$ and the resultant digital quadrature signal $Q_R(n)$ are transformed in accordance with the expressions:

$$I_R(n)=a*I(n)+HT\{b*I(n)\}+c*Q(n)+HT\{d*Q(n)\},$$

$$Q_R(n)=Q(n).$$

11. The transmitter of paragraph 10, where the digital inphase signal and the digital quadrature signal represent a complex exponential tone at frequency f.

12. The transmitter of paragraph 10, where the digital inphase signal and the digital quadrature signal carry respective streams of binary information.

Yet additional embodiments are disclosed in the following numbered paragraphs.

1. A method for correcting for I/Q impairments in a received transmission signal, the method comprising: receiving the transmission signal over a communication medium; performing I/Q demodulation on the received transmission signal to produce analog I (in-phase) and Q (quadrature) signals; performing analog to digital conversion of each of the analog I and Q signals to produce digital I and Q signals; and performing wideband I/Q impairment correction on the digital I and Q signals, where said wideband I/Q impairment correction compensates for frequency-dependent variations of gain imbalance and phase imbalance in the digital I and Q signals.

2. The method of paragraph 1, where said wideband I/Q impairment correction compensates for frequency-dependent variations of gain imbalance and phase imbalance in the digital I and Q signals caused by one or more of the I/Q demodulation or the analog to digital conversion of the analog I and Q signals.

3. The method of paragraph 1, where the method is implemented by a receiver device, where said wideband I/Q impairment correction compensates for gain imbalances and phase imbalances in the digital I and Q signals at a plurality of frequency offsets across an instantaneous bandwidth of the receiver device.

4. The method of paragraph 1, where performing the wideband I/Q impairment correction on the digital I and Q signals comprises filtering one or more of the digital I signal or the digital Q signal.

5. The method of paragraph 4, where performing the wideband I/Q impairment correction on the digital I and Q signals comprises filtering the digital Q signal and leaving the digital I signal unchanged.

6. The method of paragraph 4, where performing the wideband I/Q impairment correction on the digital I and Q signals comprises filtering the digital I signal and leaving the digital Q signal unchanged.

7. The method of paragraph 4, where performing the wideband I/Q impairment correction on the digital I and Q signals comprises filtering both the digital I signal and the digital Q signal.

8. The method of paragraph 1, where the method is implemented by a receiver device, where the method further comprises determining correction information by providing a plurality of known test signals to the receiver device and measuring I/Q impairments introduced by the receiver device in response to the known test signals, where said wideband I/Q impairment correction utilizes the correction information to compensate for the frequency-dependent variations of gain imbalance and phase imbalance in the digital I and Q signals.

9. The method of paragraph 8, where providing the plurality of known test signals to the receiver device comprises providing one or more of: a plurality of sine waves at different frequencies; or a plurality of cosine waves at different frequencies.

10. The method of paragraph 1, where receiving the transmission signal over the communication medium comprises receiving the transmission signal over one or more of: a wireless communication medium; or a cable.

11. The method of paragraph 1, where the received transmission signal is a radio frequency (RF) signal.

12. A receiver device configured to: receive a transmission signal over a communication medium; perform I/Q demodulation on the received transmission signal to produce analog I (in-phase) and Q (quadrature) signals; perform analog to digital conversion of each of the analog I and Q signals to produce digital I and Q signals; and perform wideband I/Q impairment correction on the digital I and Q signals, where said wideband I/Q impairment correction compensates for frequency-dependent variations of gain imbalance and phase imbalance in the digital I and Q signals.

13. The receiver device of paragraph 12, where the receiver device includes: one or more input ports for receiving the transmission signal; one or more output ports for outputting one or more of a corrected digital I signal or a corrected digital Q signal; and a programmable hardware element configured to perform the wideband I/Q impairment correction.

14. The receiver device of paragraph 13, where the programmable hardware element comprises a FPGA (field-programmable gate array).

19. A method for correcting for I/Q impairments, the method comprising: receiving digital I (in-phase) and Q (quadrature) signals to be transmitted; performing wideband I/Q impairment pre-correction on the digital I and Q signals, where performing the wideband I/Q impairment pre-correction filters one or more of the digital I and Q signals to produce one or more pre-corrected digital signals to pre-compensate for frequency-dependent variations of gain imbalance and phase imbalance that will be subsequently introduced during synthesis of a transmission signal; and synthesizing the transmission signal using the one or more pre-corrected digital signals.

20. The method of paragraph 19, where performing the wideband I/Q impairment pre-correction filters the digital Q signal to produce a pre-corrected digital Q signal and leaves the digital I signal unchanged; where the transmission signal is synthesized from the pre-corrected digital Q signal and the unchanged digital I signal.

21. The method of paragraph 19, where performing the wideband I/Q impairment pre-correction filters the digital I signal to produce a pre-corrected digital I signal and leaves the digital Q signal unchanged; where the transmission signal is synthesized from the pre-corrected digital I signal and the unchanged digital Q signal.

22. The method of paragraph 19, where performing the wideband I/Q impairment pre-correction filters the digital I signal to produce a pre-corrected digital I signal and filters the digital Q signal to produce a pre-corrected digital Q signal; where the transmission signal is synthesized from the pre-corrected digital I signal and the pre-corrected digital Q signal.

23. The method of paragraph 19, where synthesizing the transmission signal comprises: performing digital to analog conversion of the one or more pre-corrected digital signals to produce one or more of an analog I signal or an analog Q signal; and performing I/Q modulation to produce the transmission signal using the one or more of the analog I signal or the analog Q signal; where the one or more pre-corrected digital signals pre-compensate for frequency-dependent variations of gain imbalance and phase imbalance caused by one or more of the digital to analog conversion or the I/Q modulation.

24. The method of paragraph 23, where performing the digital to analog conversion of the one or more pre-corrected digital signals produces an analog Q signal; where the method further comprises performing digital to analog conversion of the digital I signal to produce an analog I signal; where performing the I/Q modulation to produce the transmission signal uses the analog Q signal and the analog I signal.

25. The method of paragraph 19, where the method is implemented by a transmitter device; where said wideband I/Q impairment pre-correction pre-compensates for gain imbalances and phase imbalances at a plurality of frequency offsets across an instantaneous bandwidth of the transmitter device.

26. The method of paragraph 19, where the method is implemented by a transmitter device; where the method further comprises determining correction information by providing a plurality of known test signals to the transmitter device and measuring I/Q impairments introduced by the transmitter device in response to the known test signals; where said wideband I/Q impairment pre-correction utilizes the correction information to produce the one or more pre-corrected digital signals.

27. The method of paragraph 26, where providing the plurality of known test signals to the transmitter device comprises providing one or more of: a plurality of sine waves at different frequencies; or a plurality of cosine waves at different frequencies.

28. The method of paragraph 19, further comprising transmitting the transmission signal over one or more of: a wireless communication medium; or a cable.

29. The method of paragraph 19, where the transmission signal is a radio frequency (RF) signal.

30. A transmitter device configured to: receive digital I (in-phase) and Q (quadrature) signals to be transmitted; perform wideband I/Q impairment pre-correction on the digital I and Q signals, where performing the wideband I/Q impairment pre-correction filters one or more of the digital I and Q signals to produce one or more pre-corrected digital signals to pre-compensate for frequency-dependent variations of gain imbalance and phase imbalance that will be subsequently introduced during synthesis of a transmission signal; and synthesize the transmission signal using the one or more pre-corrected digital signals.

31. The transmitter device of paragraph 30, where the transmitter device includes: one or more input ports for receiving the digital I and Q signals; one or more output ports for outputting the transmission signal; and a programmable hardware element configured to perform the wideband I/Q impairment pre-correction on the digital I and Q signals.

32. The transmitter device of paragraph 31, where the programmable hardware element comprises a FPGA (field-programmable gate array).

34. A measurement system including: a receiver device; and a device under test; where the receiver device is configured to: receive a transmission signal including measurement data acquired from the device under test; perform I/Q demodulation on the received transmission signal to produce analog I (in-phase) and Q (quadrature) signals; perform analog to digital conversion of each of the analog I and Q signals to produce digital I and Q signals; and perform wideband I/Q impairment correction on the digital I and Q signals, where said wideband I/Q impairment correction compensates for frequency-dependent variations of gain imbalance and phase imbalance in the digital I and Q signals.

35. The measurement system of paragraph 34, further comprising: a transmitter device, where the transmitter device is configured to: receive digital I and Q signals to be transmitted, where the digital I and Q signals specify information to be transmitted to the device under test; perform wideband I/Q impairment pre-correction on the digital I and Q signals, where performing the wideband I/Q impairment pre-correction filters one or more of the digital I and Q signals to produce one or more pre-corrected digital signals to pre-compensate for frequency-dependent variations of gain imbalance and phase imbalance that will be subsequently introduced during synthesis of a transmission signal; synthesize the transmission signal using the one or more pre-corrected digital signals; and transmit the transmission signal to the device under test.

36. The measurement system of paragraph 35, where the transmission signal comprises a control signal for controlling the device under test.

37. The measurement system of paragraph 34, further comprising: a chassis; where the receiver device is implemented as a first module installed in the chassis; where the transmitter device is implemented as a second module installed in the chassis.

38. The measurement system of paragraph 37, where the chassis is a PXI (PCI eXtensions for Instrumentation) chassis.

Figure 68:
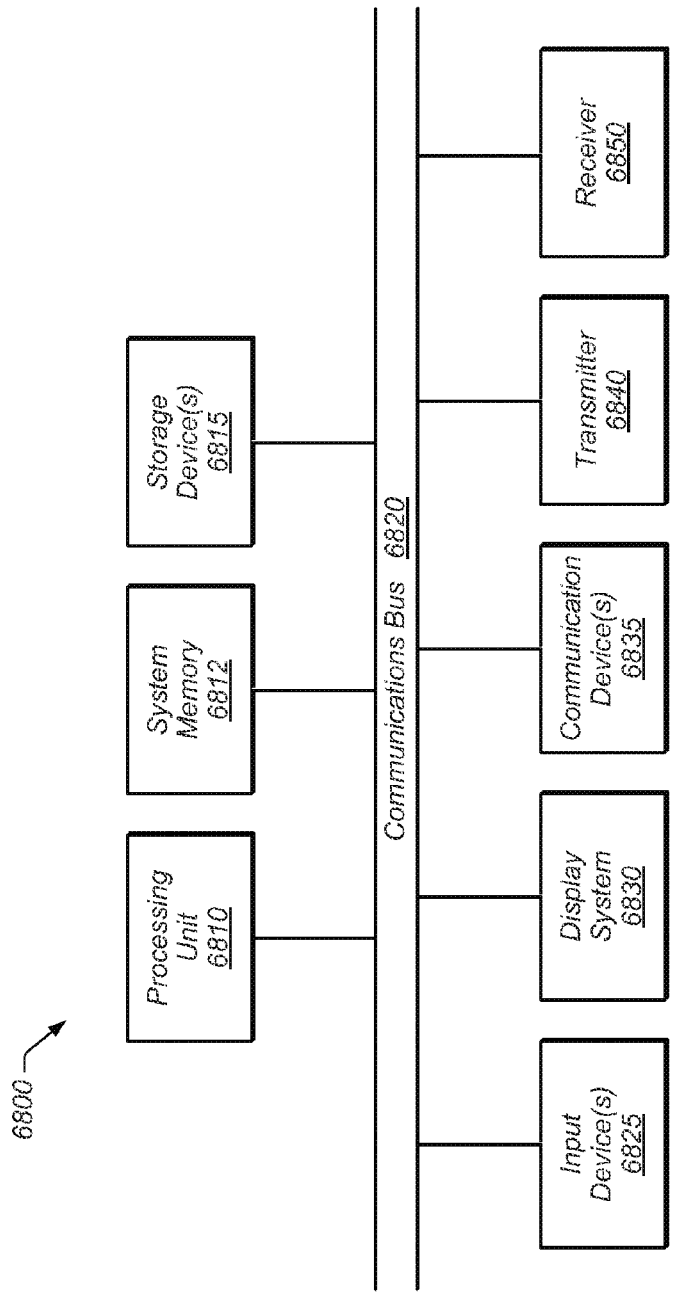
FIG. 68 illustrates one embodiment of a computer system 6800 that may be used to perform any of the method embodiments described herein.

FIG. 68 illustrates one embodiment of a computer system 6800 that may be used to perform any of the method embodiments described herein, or, any combination of the method embodiments described herein, or any subset of any of the method embodiments described herein, or, any combination of such subsets.

Computer system 6800 may include a processing unit 6810, a system memory 6812, a set 6815 of one or more storage devices, a communication bus 6820, a set 6825 of input devices, and a display system 6830.

System memory 6812 may include a set of semiconductor devices such as RAM devices (and perhaps also a set of ROM devices).

Storage devices 6815 may include any of various storage devices such as one or more memory media and/or memory access devices. For example, storage devices 6815 may include devices such as a CD/DVD-ROM drive, a hard disk, a magnetic disk drive, magnetic tape drives, etc.

Processing unit 6810 is configured to read and execute program instructions, e.g., program instructions stored in system memory 6812 and/or on one or more of the storage devices 6815. Processing unit 6810 may couple to system memory 6812 through communication bus 6820 (or through a system of interconnected busses, or through a network). The program instructions configure the computer system 6800 to implement a method, e.g., any of the method embodiments described herein, or, any combination of the method embodiments described herein, or, any subset of any of the method embodiments described herein, or any combination of such subsets.

Processing unit 6810 may include one or more processors (e.g., microprocessors).

One or more users may supply input to the computer system 6800 through the input devices 6825. Input devices 6825 may include devices such as a keyboard, a mouse, a touch-sensitive pad, a touch-sensitive screen, a drawing pad, a track ball, a light pen, a data glove, eye orientation and/or head orientation sensors, a microphone (or set of microphones), or any combination thereof.

The display system 6830 may include any of a wide variety of display devices representing any of a wide variety of display technologies. For example, the display system may be a computer monitor, a head-mounted display, a projector system, a volumetric display, or a combination thereof. In some embodiments, the display system may include a plurality of display devices. In one embodiment, the display system may include a printer and/or a plotter.

In some embodiments, the computer system 6800 may include other devices, e.g., devices such as one or more graphics accelerators, one or more speakers, a sound card, a video camera and a video card, a data acquisition system.

In some embodiments, computer system 6800 may include one or more communication devices 6835, e.g., a network interface card for interfacing with a computer network. As another example, the communication device 6835 may include a specialized interface for communication via any of a variety of established communication standards or protocols (e.g., USB, Firewire, PCI, PCI Express, PXI).

The computer system may be configured with a software infrastructure including an operating system, and perhaps also, one or more graphics APIs (such as OpenGL®, Direct3D, Java 3D™). In some embodiments, the software infrastructure may include National Instruments LabVIEW™ software, and/or, LabVIEW™ FPGA.

In some embodiments, the computer system 6800 may be configured to interface with transmitter 6840. The transmitter may be configured to transmit signals (onto a communication channel) as variously described herein. The transmitter may operate under the control of software executing on processor 6810 and/or software executing on the transmitter itself.

In some embodiments, the computer system 6800 may be configured to interface with a receiver 6850. The receiver may be configured to receive signals (from a communication channel) as variously described herein. The receiver may operate under the control of software executing on processor 6810 and/or software executing on the receiver itself.

In some embodiments, the transmitter and/or the receiver may include one or more programmable hardware elements and/or one or more microprocessors for performing digital processing on digital data (e.g., on digital baseband signals or digital IF signals) as variously described herein.

Although the embodiments above have been described in considerable detail, numerous variations and modifications will become apparent to those skilled in the art once the above disclosure is fully appreciated. It is intended that the following claims be interpreted to embrace all such variations and modifications.

APPENDIX A

Iterative Method for Estimating Transmitter I/Q Impairments Using Shared LOs

1. Measure the gain imbalance gR and phase skew ϕR of the receiver for each in-band offset frequency f at which the transmitter's gain imbalance gT and phase skew ϕT are to be measured. (In some embodiments, the set of frequency offsets is symmetric about zero, i.e., for each frequency offset f in the set, the frequency offset −f is also in the set.) For each f, direct a tone generator to generate a tone at frequency $v=f_{LO}+f$, where $f_{LO}$ is the LO frequency, apply the tone to the receiver's input, and capture the complex baseband sequence z(n) at the output of the receiver's I/Q demodulator. The gain imbalance gR and phase skew ϕR are computed based on the complex baseband sequence z(n) as described in the "Precise Measurement Technique" section.

2. Configure the receiver and transmitter so that they use the same LO frequency $f_{LO}$. If the receiver and transmitter use two different LO circuits, tune the transmitter so that its LO is phase locked to the same reference. Therefore, the frequency of the transmitter and the frequency of the receiver are both $f_{LO}$.

3. Connect the transmitter's output to the receiver's input, e.g., via a cable or a wireless connection.

4. Estimate the DC scaling m(0) and DC rotation θ(0) of the signal path between transmitter's I/Q modulator and the receiver's I/Q demodulator by using the algorithm in the section "Calculating the Mapping Between and RX and TX". For the best results, apply a tone K to the transmitter's I/Q modulator in addition to the DC test vector. The tone K is applied because the leakage can be sensitive to in-band power. The tone K is applied at some frequency in the instantaneous bandwidth other than DC. (As part of the estimation of the DC scaling and DC rotation, the method of the "Precise Measurement Technique" section is applied to sampled complex data. If the sampled complex data is not windowed, then there are restrictions on the frequency placement of the tone K.)

5. Iteration index k←0

Do while (quality measure Q is smaller than threshold)

For each frequency offset f:

Set $gT(f,0)$←1 and $\phi T(f,0)$←0.

6A. If k=0:

Apply no pre-correction at the transmitter, i.e., configure the transmitter's pre-correction circuitry to use the values $\alpha=0$ and $\beta=1$.

Else (k>0)

Compute pre-correction coefficients $\alpha$ and $\beta$ for frequency offset f based on: current transmitter gain imbalance estimate $gT(f,k)$; current transmitter phase skew estimate $\phi T(f,k)$; current transmitter gain imbalance estimate $gT(-f,k)$; current transmitter phase skew estimate $\phi T(-f,k)$. (If the frequency offset set is not symmetric about zero, select the frequency closest to −f for $gT(-f,k)$ and $\phi T(-f,k)$.) Alternatively, one could create transmitter pre-correction filters.

Endif

Configure the pre-correction circuitry to use the computed values $\alpha$ and $\beta$ (or the pre-correction filters).

7A. Apply a complex exponential signal $u(n)=\exp(j2\pi fn)$ to the inputs of the pre-correction circuitry.

7B. Measure complex baseband signal $z(n)$ at the output of the receiver's I/Q demodulator.

7C. Determine raw gain imbalance $gz(f)$ and raw phase skew $\phi z(f)$ based on the complex baseband signal $z(n)$ using the calculation method in "Precise Measurement Technique".

8. Remove the receiver's gain imbalance $gR(f)$ and phase skew $\phi R(f)$ from the raw gain imbalance $gz(f)$ and raw phase skew $\phi z(f)$ to obtain pre-demodulation gain imbalance $gPD(f)$ and pre-demodulation phase skew $\phi PD(f)$. (There are at least two methods for performing this removal: a direct-transformation method and a filtering method. The direct-transformation method may be of higher quality than the filtering method. The direct-transformation method is discussed in the section entitled "Removing Receiver Impairments from Measured Output Impairments". The filtering method involves applying a 2×2 matrix of digital filters to the complex baseband signal $z(n)=(I(n),Q(n))$ to obtain a partially-corrected signal $PCS(n)$. The 2×2 matrix of digital filters may be computed as described above in connection with FIGS. 2A, 2B and 3 and in the section "Wideband I/Q Impairment Equalization".

9. Remove the best current estimate of the signal path between the transmitter's I/Q modulator and the receiver's I/Q demodulator. $m(0)$ and $\theta(0)$ will provide a basic estimate. Better estimates will increase the rate of convergence. For example, step 9 may be implemented as follows.

If k=0

Remove the estimated DC scaling $m(0)$ and DC rotation $\theta(0)$ from the gain imbalance $gPD$ and the phase skew $\phi PD$ to obtain post-modulation gain imbalance $gPM$ and post-modulation phase skew $\phi PM$ using the transform described in "Altering the Gain Imbalance and Phase Skew through a Linear System". Set $H(f)$ and $H(-f)$ equal to $H(0)=\exp(-j\theta(0))/m(0)$.

Else (k>0)

Compute scaling $m(f)$ at frequency offset f based on the complex baseband signal $z(n)$. The scaling $m(f)$ may be determined by computing the magnitude of the frequency component at frequency f in the complex signal $z(n)$, as explained in the "Precise Measurement Technique" section, especially in equation 6.6.

Remove the estimated linear signal path from the gain imbalance $gPD(f)$ and the phase skew $\phi PD(f)$ to obtain post-modulation gain imbalance $gPM(f)$ and post-modulation phase skew $\phi PM(f)$ by using the transform described in "Altering the Gain Imbalance and Phase Skew through a Linear System", with $H(f)=\exp(-j\theta(0))/m(f)$ and $H(-f)=\exp(-j\theta(0))/m(-f)$.

Note: If −f has not yet been visited by the frequency offset loop, use the $m(-f)$ computed in the previous quality iteration k−1.

10. Generate update for transmitter gain imbalance $gT$ and transmitter phase skew $\phi T$ according to:

$$gT(f,k+1) \leftarrow gT(f,k)*gPM(f) \text{ and}$$

$$\phi T(f,k+1) \leftarrow \phi T(f,k)+(\phi PM(f)).$$

11. Calculate the image rejection $IR(f)$ from the post-modulation gain imbalance $gPM(f)$ and post-modulation phase skew $\phi PM(f)$ based on equation (4.15)

Endfor k←k+1

Calculate quality measure Q=maximum of $-IR(f)$ over all values of f. (A more negative value of $IR(f)$ corresponds to higher quality. Thus, the negative of $IR(f)$ corresponds to quality at frequency f. Q is the maximum of quality over the frequency band.)

End While

APPENDIX B

Iterative Estimation of Transmitter Impairments Using Offset LOs—Optimized

1. Configure the receiver and transmitter so that the difference between the receiver's local oscillator frequency $LO_{RX}$ and the transmitter's local oscillator frequency $LO_{TX}$ is equal to a selected value $\Delta LO$:

$$LO_{RX}-LO_{TX}=\Delta LO.$$

The selected value is a non-zero fraction (e.g., a small fraction) of the instantaneous bandwidth of the transmitter. The two local oscillators are phase locked.

2. Connect the transmitter's output to the receiver's input.

3. Estimate the DC scaling $m(0)$ and DC rotation $\theta(0)$ of the signal path between transmitter's I/Q modulator and the receiver's I/Q demodulator using the algorithm in the section "Calculating the Mapping Between and RX and TX". This estimation involves the following steps.

3A. Apply a zero stimulus signal as input to the transmitter's I/Q modulator.

3B. Capture the response signal $z_A(n)$ at the output of the receiver's I/Q demodulator.

3C. Frequency shift the response signal $z_A(n)$ by amount $\Delta LO$ to obtain a frequency-shifted signal $FSz_A(n)$.

3D. Apply a DC test vector as input to the I/Q modulator.

3E. Capture the response signal $z_C(n)$ at the output of the I/Q demodulator.

3F. Frequency shift the response signal $z_B(n)$ by amount $\Delta LO$ to obtain a frequency-shifted signal $FSz_B(n)$.

3G. Compute the DC scaling m(0) and the DC rotation θ(0) based on the frequency shifted signal $FSz_A(n)$, the frequency shifted signal $FSz_B(n)$ and the DC test vector as described in the section "Calculating the Mapping between the RX and TX".

For the best results, apply a tone K to the transmitter's I/Q modulator in addition to the DC test vector. The tone K is applied because the leakage can be sensitive to in-band power. The tone K is applied at some frequency in the instantaneous bandwidth other than DC.

Note: The frequency-shifting operations may be performed using a signal FS(n) whose phase is continuous in time and runs at rate $\Delta LO$. For example, FS(n) may have the form:

$$FS(n) = \exp\{j2\pi(\Delta LO/ADC\_SampleRate)n\}.$$

The frequency shift operation may be implemented according to the relation:

$$FSz(n) = z(n)FS(n),$$

where z(n) is a signal to be frequency shifted.

In one embodiment, the frequency shift operation may be implemented in an FPGA of the receiver. The frequency shifting operation may execute at the sample rate of the receiver's ADC, i.e., may generate a new output value FSz(n) for each new ADC data vector z(n). Thus, the ADC sample clock may be provided as an input to the FPGA. The phase-continuity of the signal FS would then be guaranteed by the phase continuity of the ADC sample clock. The ADC sample clock is phase locked to the local oscillators.

In an alternative embodiment, the frequency shift operation may be performed in software. The present iterative method involves repeated acquisitions of the signal z(n) from the I/Q demodulator. Thus, to implement the phase-continuity of the signal FS, software is supplied with information regarding the time difference between the start of the present acquisition and the start of the first acquisition (or the start of the previous acquisition). For example, software may be supplied with the time of the first sample z(0) of the present acquisition relative to the time of the first sample z(0) of the first acquisition. Let m be defined as a continuously-running sample count and n be the sample count of the present acquisition. Thus, m=0 corresponds to n=0 for the first acquisition of z(n). Then the phase-continuous frequency shift signal FS(m) can be represented as:

$$FS(m) = \exp\{j2\pi(\Delta LO/ADC\_SampleRate)m\}.$$

Let k be defined by the sample distance between the current acquisition and the first acquisition for the first sample z(0). Then $$FS(m) = FS(k+n) = \exp\{j2\pi(\Delta LO/ADC\_SampleRate)(k+n)\}.$$

Now FSz(n) can computed from the expression $$FSz(n) = FS(k+n)z(n) = FS(n)z(n)FSOffset,$$

where $$FS(n) = \exp\{j2\pi(\Delta LO/ADC\_SampleRate)n\}$$

$$FSOffset = FS(k) = \exp\{j2\pi(\Delta LO/ADC\_SampleRate)k\}.$$

Note that k will only change from one acquisition to the next.

For each positive tone frequency offset f=Δf to NΔf step Δf, subject to restrictions described in the "Restrictions" section.

k←0

For S element of {1,−1}

Do while (−Image_Rejection for tone frequency offset v=S*f is smaller than threshold):

4. Compute α and β coefficients for pre-correction circuitry based at least on the best available estimate for transmitter impairments at frequency v, as follows:

If f=Δf
  If k=0
    if S=1:
      Set gT(v,0) 1 and φT(v,0)←0.
      Set pre-correction coefficients α and β to implement the identity map (i.e., straight pass-through): α←0 and β←1.
    if S=−1:
      gT(v,0) gT(−v,∞).
      φT(v,0)←φT(−v,∞).
      In general, the notation gT(x,∞) and φT(x,∞) represent respectively the converged estimates of gT and φT resulting from the final k iteration at previously-visited frequency x.
      Compute α and β for a traditional single-point compensation based on gT(v,0) and φT(v,0).
  Else k>0
    if S=1: Compute α and β for a traditional single-point compensation based on gT(v,k) and φT(v,k).
    if S=−1: Compute α and β for true single-point correction based on gT(v,k) and φT(v, k), gT(−v,∞) and φT(−v,∞).
  End If
Else (f>Δf)
  If k=0
    gT(v,0)←gT(v−S*Δf,∞)
    φT(v,0)←φT(v−S*Δf,∞)
    Compute α and β for true single-point correction based on the best available estimate of the transmitter impairments at v and −v, e.g., as follows.
    if S=1: compute α and β for true single-point correction based on gT(v−Δf, ∞), φT(v−Δf, ∞), gT(−v+Δf, ∞), φT(−v+Δf, ∞)
    if S=−1: compute α and β for true single-point correction based on gT(v+Δf, ∞), φT(v+Δf, ∞), gT(−v, ∞), φT(−v, ∞)
  Else k>0
    if S=1, compute α and β for true single-point correction based on gT(v, k), φT(v, k), gT(−v+Δf, ∞), φT(−v+Δf, ∞)
    if S=−1, compute α and β for true single-point correction based on gT(v, k), φT(v, k), gT(−v,∞), φT(−v, ∞)
End If 5. Configure the pre-correction circuitry to use the computed values α and β.

6. Apply a complex exponential signal $u(n) = \exp(j2\pi vn)$ to the inputs of the pre-correction circuitry.

7A. Measure complex baseband signal z(n) at the output of the receiver's I/Q demodulator.

7B. This step is optional.

Remove the receiver's I/Q impairments from the complex baseband signal z(n) to obtain a modified complex signal. For example, this removal may involve filtering the complex baseband signal with a 2×2 matrix of digital filters, or, multiplying the complex baseband signal by a 2×2 constant matrix, as described above in the section "Determination of Transmitter I/Q Impairments with Offset LOs".

7C. Apply a frequency shift equal to ΔLO that is phase continuous (as described above) to the signal z(n) in order to obtain frequency-shifted signal FSz(n). If step 7B has been performed, the frequency shift is applied to the modified complex signal.

8. Determine raw gain imbalance gFSz(v) and raw phase skew φFSz(v) at frequency v based on the complex baseband signal FSz(n) using the calculation method described in the "Precise Measurement Technique" section.

9. Remove the best current estimate of the signal path (between the transmitter's I/Q modulator and the receiver's I/Q demodulator) from the raw gain imbalance gFSz(v) and the raw phase skew φFSz(v) to obtain estimated post-modulation gain imbalance gPM(v) and post-modulation phase skew φPM(v). m(0) and θ(0) will provide a basic estimate of the signal path. Better estimates will increase the rate of convergence. For example, step 9 may be implemented as follows.

If f=Δf
  Remove the estimated DC scaling m(0) and DC rotation θ(0) from the raw gain imbalance gFSz(v) and the raw phase skew φFSz(v) to obtain the estimated post-modulation gain imbalance gPM(v) and post-modulation phase skew φPM(v) using the transform described in "Altering the Gain Imbalance and Phase Skew through a Linear System", with H(v)=exp(−jθ(0))/m(0) and H(−v)=exp(−jθ(0))/m(0).
Else f>Δf
  Compute scaling m(v) at tone frequency v based on the signal FSz(n) of step 7C. The scaling m(v) may be determined by computing the magnitude of the frequency component at frequency v in the complex signal FSz(n), as explained in the "Precise Measurement Technique" section, especially in equation 6.6.
  (Note: In an alternative embodiment, the measurement of z(n) is synchronized with the generation of the tone u(n), e.g., by using a trigger signal that is shared between the transmitter and receiver, e.g., a trigger generated by a controller device. In this case, rotation θ(v) may be measured in addition to scaling m(v).)
  Remove the estimated linear signal path from the raw gain imbalance gFSz(v) and the raw phase skew φFSz(v) to obtain the estimated post-modulation gain imbalance gPM(v) and post-modulation phase skew φPM(v) by using the transform described in "Altering the Gain Imbalance and Phase Skew through a Linear System" with H(v)=exp(−jθ(0))/m(v) and H(−v)=exp(−jθ(0))/$m_{BAE}$(−v), where $m_{BAE}$(−v) is the best available estimate for scaling m(−v).
  If S=1: $m_{BAE}$(−v)=m(−v+Δf, ∞)
  If S=−1: $m_{BAE}$(−v)=m(−v,∞).
  In general, the notation m(x,∞) denotes the scaling m(x) computed in the final k iteration of previously-visited frequency x.

10. Generate update for transmitter gain imbalance gT and transmitter phase skew φT according to:

$$gT(v,k+1) \leftarrow gT(v,k)*gPM(v) \text{ and}$$

$$\phi T(v,k+1) \leftarrow \phi T(v,k)+\phi PM(v).$$

11. Calculate the image rejection IR(v) from the post-modulation gain imbalance gPM(v) and post-modulation phase skew φPM(v) based on equation 4.15
k←k+1
EndDo
EndFor S element of {1,−1}
Endfor

APPENDIX C

Iterative Estimation of Transmitter Impairment Using Shared LO-Optimized

1. Measure the gain imbalance gR and phase skew φR of the receiver for each in-band offset frequency f at which the transmitter's gain imbalance gT and phase skew φT are to be measured. For each f, direct a tone generator to generate a tone at frequency v=$f_{LO}$+f, where $f_{LO}$ is the LO frequency, apply the tone to the receiver's input, and capture the complex baseband sequence z(n) at the output of the receiver's I/Q demodulator. The gain imbalance gR and phase skew φR are computed as described in the "Precise Measurement Technique" section.

2. Configure the receiver and transmitter so that they use the same LO frequency $f_{LO}$. If the receiver and transmitter use two different LO circuits, tune the transmitter so that its LO is phase locked to the same reference. Therefore, the frequency of the transmitter and the frequency of the receiver are both $f_{LO}$.

3. Connect the transmitter's output to the receiver's input.

4. Estimate the DC scaling m(0) and DC rotation θ(0) of the signal path between transmitter's I/Q modulator and the receiver's I/Q demodulator by using the algorithm in the section "Calculating the Mapping Between and RX and TX". For the best results, apply a tone K to the transmitter's I/Q modulator in addition to the DC test vector.

```
For each positive frequency offset f = Δf to NΔf step Δf.
  For S element of {1,−1}
    k ← 0
    Do while ( −Image_Rejection for frequency offset v=S*f is smaller
    than threshold):
      5A. Compute α and β coefficients for pre-correction circuitry based
      at least on the best available estimate for transmitter impairments
      at frequency v.
        If f = Δf
          If k=0
            if S=1:
              Set gT(v,0)←1 and φT(v,0)←0, and set pre-correction
              coefficients α and β to implement the identity map (i.e.,
              straight pass-through): α←0 and β←1.
            if S=−1:
              Set gT(v,0)← gT(−v,∞), φT(v,0)← φT(−v,∞), and
              compute α and β for a traditional single-point
              compensation based on gT(v,0) and φT(v,0).
          Else k>0
            if S=1: Compute α and β for a traditional single-point compensation
            based on gT(v,k) and φT(v,k)
            if S=−1: Compute α and β for true single-point compensation
            based on gT(v,k) and φT(v, k), gT(−v,∞) and φT(−v,∞)
          End If
        Else (f > Δf)
          If k=0
            gT(v,0)← gT(v−S*Δf, ∞) and φT(v,0)← φT(v−S*Δf, ∞)
            Compute α and β for true single-point correction based on the best
            available estimate of the transmitter impairments at v and −v, e.g.,
            as follows.
            if S=1:
              compute α and β for true single-point correction based on
              gT(v−Δf, ∞), φT(v−Δf, ∞), gT(−v+Δf, ∞), φT(−v+Δf, ∞)
```

```
        if S=-1:
            compute α and β for true single-point correction based on
            gT(v+Δf, ∞), φT(v+Δf, ∞), gT(-v, ∞), φT(-v, ∞)
    Else k>0
        if S=1:
            compute α and β for true single-point correction based on
            gT(v, k), φT(v, k), gT(-v+Δf, ∞), φT(-v+Δf, ∞)
        if S=-1:
            compute α and β for true single-point correction based on
            gT(v, k), φT(v, k), gT(-v,∞), φT(-v, ∞)
    End If
End If
```

5B. Configure the pre-correction circuitry to use the computed values α and β.

6. Apply a complex exponential signal $u(n)=\exp(j2\pi vn)$ to the inputs of the pre-correction circuitry.

7A. Measure complex baseband signal $z(n)$ at the output of the receiver's I/Q demodulator.

7B. Determine raw gain imbalance $gz(v)$ and raw phase skew $\phi z(v)$ based on the complex baseband signal $z(n)$ using the calculation method in the section "Precise Measurement Technique".

8. Remove the receiver's gain imbalance $gR(v)$ and phase skew $\phi R(v)$ from the raw gain imbalance $gz(v)$ and raw phase skew $\phi z(v)$ to obtain pre-demodulation gain imbalance $gPD(v)$ and pre-demodulation phase skew $\phi PD(v)$. There are a number of ways to accomplish this removal, including a mathematical transformation method and a filtering method, as described above in connection with method 4400. The mathematical transformation method is described in the section "Removing Receiver Impairments from Measured Output Impairments".

9. Remove the best current estimate of the signal path between the transmitter's I/Q modulator and the receiver's I/Q demodulator. $m(0)$ and $\theta(0)$ will provide a basic estimate. Better estimates will increase the rate of convergence. For example, step 9 may be implemented as follows.

If $f=\Delta f$:
Remove the estimated DC scaling $m(0)$ and DC rotation $\theta(0)$ from the gain imbalance $gPD(v)$ and the phase skew $\phi PD(v)$ to obtain the estimated post-modulation gain imbalance $gPM(v)$ and post-modulation phase skew $\phi PM(v)$ using the transform described in "Altering the Gain Imbalance and Phase Skew through a Linear System" with $H(v)$ and $H(-v)$ set equal to $$\exp(-j\theta(0))/m(0).$$

Else $f>\Delta f$
Compute scaling $m(v)$ at tone frequency $v$ based on the complex baseband signal $z(n)$ of step 7A. The scaling $m(v)$ may be determined by computing the magnitude of the frequency component at frequency $v$ in the complex signal $z(n)$, as explained in the "Precise Measurement Technique" section, especially in equation 6.6.

(Note: In an alternative embodiment, the measurement of $z(n)$ is synchronized with the generation of the tone $u(n)$, e.g., by using a trigger signal that is shared between the transmitter and receiver, e.g., a trigger generated by a controller device. In this case, rotation $\theta(v)$ may be measured in addition to scaling $m(v)$.)

Remove the estimated linear signal path from the gain imbalance $gPD(v)$ and the phase skew $\phi PD(v)$ to obtain the estimated post-modulation gain imbalance $gPM(v)$ and post-modulation phase skew $\phi PM(v)$ by using the transform described in "Altering the Gain Imbalance and Phase Skew through a Linear System" with $H(v)=\exp(-j\theta(0))/m(v)$ and $H(-v)=\exp(-j\theta(0))/m_{BAE}(-v)$, where $m_{BAE}(-v)$ is the best available estimate for scaling $m(-v)$.

If $S=1$: $m_{BAE}(-v)=m(-v+\Delta f, \infty)$
If $S=-1$: $m_{BAE}(-v)=m(-v,\infty)$.
In general, the notation $m(x,\infty)$ denotes the scaling $m(x)$ computed in the final k iteration at previously-visited frequency x.

10. Generate update for transmitter gain imbalance gT and transmitter phase skew $\phi T$ according to:

$$gT(v,k+1) \leftarrow gT(v,k)*gPM(v) \text{ and}$$

$$\phi T(v,k+1) \leftarrow \phi T(v,k)+\phi PM(v).$$

11. Calculate the image rejection IR(v) from the post-modulation gain imbalance gPM(v) and post-modulation phase skew $\phi$PM(v) based on equation 4.15
k←k+1
EndDo
EndFor S element of {1,-1}
Endfor

What is claimed is:

1. A computer-implemented method for estimating a DC scaling of a signal path between an I/Q modulator of a transmitter and a demodulator of a receiver, the method comprising:
   directing the transmitter to supply a zero signal as input to the I/Q modulator;
   receive a first response signal that has been captured from the I/Q demodulator in response to said supplying the zero signal;
   directing the transmitter to supply a stimulus signal as input to the I/Q modulator, wherein the stimulus signal comprises a constant signal equal to a non-zero complex constant;
   receive a second response signal that has been captured from the demodulator in response to said supplying the constant signal;
   averaging the first response signal to obtain a first average and averaging the second response signal to obtain a second average;
   computing a difference between the second average and the first average;
   computing the DC scaling based on the difference and the non-zero complex constant; and
   storing the DC scaling in a memory.

2. The method of claim 1, further comprising:
   computing a DC rotation of the signal path based on a phase of the difference and a phase of the non-zero complex constant.

3. The method of claim 2, wherein the DC scaling and DC rotation are usable to remove an effect of the signal path from measured I/Q impairments at the receiver in order to obtain estimates of the I/Q impairments of the transmitter.

4. The method of claim 1, wherein the signal path includes a cable coupling between the transmitter and the receiver.

5. The method of claim 1, wherein the signal path includes a wireless channel between the transmitter and the receiver.

6. The method of claim 1, wherein the stimulus signal comprises a superposition of the constant signal and a tone with non-zero baseband frequency.

7. The method of claim 1, wherein said averaging, said computing a difference and said computing the DC scaling are performed in a programmable hardware element.

8. The method of claim 1, wherein the imaginary component of the non-zero complex constant is zero.

9. A computer system for estimating a DC scaling of a signal path between an I/Q modulator of a transmitter and an I/Q demodulator of a receiver, the computer system comprising:
- a processor; and
- memory storing program instructions, wherein the program instructions, when executed by the processor, cause the processor to:
  - direct the transmitter to supply a zero signal as input to the I/Q modulator;
  - receive a first response signal that has been captured from the I/Q demodulator in response to said supplying the zero signal;
  - direct the transmitter to supply a stimulus signal as input to the I/Q modulator, wherein the stimulus signal comprises a constant signal equal to a non-zero complex constant;
  - receive a second response signal that has been captured from the I/Q demodulator in response to said supplying the constant signal;
  - average the first response signal to obtain a first average and averaging the second response signal to obtain a second average;
  - compute a difference between the second average and the first average;
  - compute the DC scaling based on the difference and the non-zero complex constant.

10. The computer system of claim 9, wherein the program instructions, when executed by the processor, further cause the processor to:
- compute a DC rotation of the signal path based on a phase of the difference and a phase of the non-zero complex constant.

11. The computer system of claim 10, wherein the DC scaling and DC rotation are usable to remove an effect of the signal path from measured I/Q impairments at the receiver in order to obtain estimates of the I/Q impairments of the transmitter.

12. The computer system of claim 9, wherein the signal path includes a cable coupling between the transmitter and the receiver.

13. The computer system of claim 9, wherein the signal path includes a wireless channel between the transmitter and the receiver.

14. The computer system of claim 9, wherein the stimulus signal comprises a superposition of the constant signal and a tone with non-zero baseband frequency.

15. The computer system of claim 9, wherein the imaginary component of the non-zero complex constant is zero.

16. A non-transitory computer-accessible memory medium for estimating a DC scaling of a signal path between an I/Q modulator of a transmitter and a demodulator of a receiver, wherein the memory medium stores program instructions, wherein the program instructions, when executed by a computer system, cause the computer system to:
- direct the transmitter to supply a zero signal as input to the I/Q modulator;
- receive a first response signal that has been captured from the I/Q demodulator in response to said supplying the zero signal;
- direct the transmitter to supply a stimulus signal as input to the I/Q modulator, wherein the stimulus signal comprises a constant signal equal to a non-zero complex constant;
- receive a second response signal that has been captured from the demodulator in response to said supplying the constant signal;
- average the first response signal to obtain a first average and averaging the second response signal to obtain a second average;
- compute a difference between the second average and the first average;
- compute the DC scaling based on the difference and the non-zero complex constant; and
- store the DC scaling in a memory.

17. The memory medium of claim 16, wherein the program instructions, when executed by the computer system, further cause the computer system to:
- compute a DC rotation of the signal path based on a phase of the difference and a phase of the non-zero complex constant.

18. The memory medium of claim 17, wherein the DC scaling and DC rotation are usable to remove an effect of the signal path from measured I/Q impairments at the receiver in order to obtain estimates of the I/Q impairments of the transmitter.

19. The memory medium of claim 16, wherein the signal path includes a cable coupling between the transmitter and the receiver.

20. The memory medium of claim 16, wherein the stimulus signal comprises a superposition of the constant signal and a tone with non-zero baseband frequency.

* * * * *